United States Patent [19]

Spence

[11] Patent Number: 5,255,085

[45] Date of Patent: Oct. 19, 1993

[54] ADAPTIVE TECHNIQUE FOR PROVIDING ACCURATE TONE REPRODUCTION CONTROL IN AN IMAGING SYSTEM

[75] Inventor: John P. Spence, Webster, N.Y.

[73] Assignee: Eastman Kodak Company, Rochester, N.Y.

[21] Appl. No.: 872,258

[22] Filed: Apr. 22, 1992

Related U.S. Application Data

[63] Continuation-in-part of Ser. No. 782,940, Oct. 25, 1991.

[51] Int. Cl.[5] .......................... H04N 1/40; H04N 1/46
[52] U.S. Cl. .................................... 358/527; 358/406; 358/455
[58] Field of Search ...................... 358/75, 76, 80, 455, 358/406, 298, 458, 448, 463

[56] References Cited

U.S. PATENT DOCUMENTS

| | | | |
|---|---|---|---|
| 4,657,831 | 4/1987 | Ambro et al. | |
| 4,708,459 | 11/1987 | Cowan et al. | |
| 4,816,863 | 3/1989 | Lee | |
| 4,962,421 | 10/1990 | Murai | 358/76 |

OTHER PUBLICATIONS

F. N. Fritsch et al., "Monotone Piecewise Cubic Interpolation", *SIAM Journal of Numerical Analysis*, vol. 17, No. 2, Apr. 1980, pp. 238-246.

J. A. C. Yule, *Principles of Color Reproduction* (1967: John Wiley & Sons Inc., New York), specifically pp. 205–216 of Chapter 8 "Additivity and Proportionality of Densities".

*Primary Examiner*—Edward L. Coles, Sr.
*Assistant Examiner*—Scott A. Rogers
*Attorney, Agent, or Firm*—Robert L. Randall

[57] ABSTRACT

Apparatus and associated methods employed therewith for accurately providing a desired ("Aim") tone reproduction characteristic in an output image through a DDCP (direct digital color proofing) imaging chain (such as that implemented by a raster image processor (200), particularly a screening process (660) occurring therein, and a marking engine (130)) and for significantly reducing the number of test proof images that need to be produced and measured to achieve this result. Specifically, "Benchmark" operating conditions and intrinsic performance (i.e. "Benchmark" entry point data) of the DDCP imaging chain thereat are first defined. Then, based upon differences (such as in screen ruling and solid area density) between a desired operating condition and an appropriate "Benchmark" condition, "Benchmark" values associated with the latter are adapted, through use of a pre-defined model and associated sensitivity coefficients that collectively predict the performance of the DDCP imaging chain, to determine corresponding "Adapted" values that accurately specify the intrinsic process tone reproduction characteristic of the imaging chain at the desired operating condition. Thereafter, in response to both "Aim" (400) and the "Adapted" values for the desired operating condition, a look-up table is fabricated to contain, for all possible input dot areas, the "Aim" dot gain modified by the inverse of this expected intrinsic process tone reproduction characteristic applied to the desired tone reproduction characteristic. Incoming dot area values (i.e. contone values) for a corresponding separation are then routed through this table, prior to screening and writing, in order to intentionally vary the tone reproduction value of each such value so that the resulting dots in the proof image will accuratel exhibit the desired "Aim" tone reproduction characteristic substantially free from corruption due to the native tone reproduction characteristic of the imaging chain.

32 Claims, 30 Drawing Sheets

FIG. 3A

| | | |
|---|---|---|
| POINTER TO NEXT ENTRY | POINTER TO PRQE | — 305 |
| IMAGE FILE DESCRIPTION | DATA STRUCTURE | — 310 |
| OUTPUT COLOR ORDER | STRING | — 325 |
| SCREEN RULING | FLOAT | — 330 |
| DOT FONT | BYTE | — 335 |
| DESCRIPTION | STRING | — 340 |
| NUMBER OF COPIES | BYTE | — 345 |
| UPPER LEFT HAND CORNER X | INTEGER | — 350 |
| UPPER LEFT HAND CORNER Y | INTEGER | — 355 |
| SCATTER PROOF ENABLE | BOOLEAN | — 360 |
| PRIORITY | BYTE | — 365 |
| EXTRA SEPARATION NAMES [2] | STRING | — 370 |
| RECIPE COLOR NUMBER [2] | STRING | — 375 |
| PASS PARAMETERS [5] | DATA STRUCTURE | — 380 |

PROOF REQUEST 300

FIG. 3B

IMAGE FILE DESCRIPTION

| | | |
|---|---|---|
| CEPS DEVICE NAME | STRING | — 311 |
| JOB NAME | STRING | — 312 |
| PAGE NAME | STRING | — 313 |
| IMAGE NAME | STRING | — 314 |
| CT RESOLUTION | INTEGER | — 315 |
| LW RESOLUTION | INTEGER | — 316 |
| IMAGE HEIGHT | INTEGER | — 317 |
| IMAGE WIDTH | INTEGER | — 318 |
| IMAGE PROCESSING FLAGS | BYTE | — 319 |

PASS PARAMETERS — 381

| | |
|---|---|
| SCREEN ANGLE | FLOAT |
| DOT GAIN TABLE | STRING |
| SOLID AREA DENSITY | SIGNED BYTE |

IMAGE PROCESSING FLAGS | BYTE | — 319

FLAGS TO ENABLE/DISABLE: SCALE TO FIT
ROTATE IMAGE
MIRROR IMAGE
CONTROL STRIP ENABLE
DATA LEGEND ENABLE

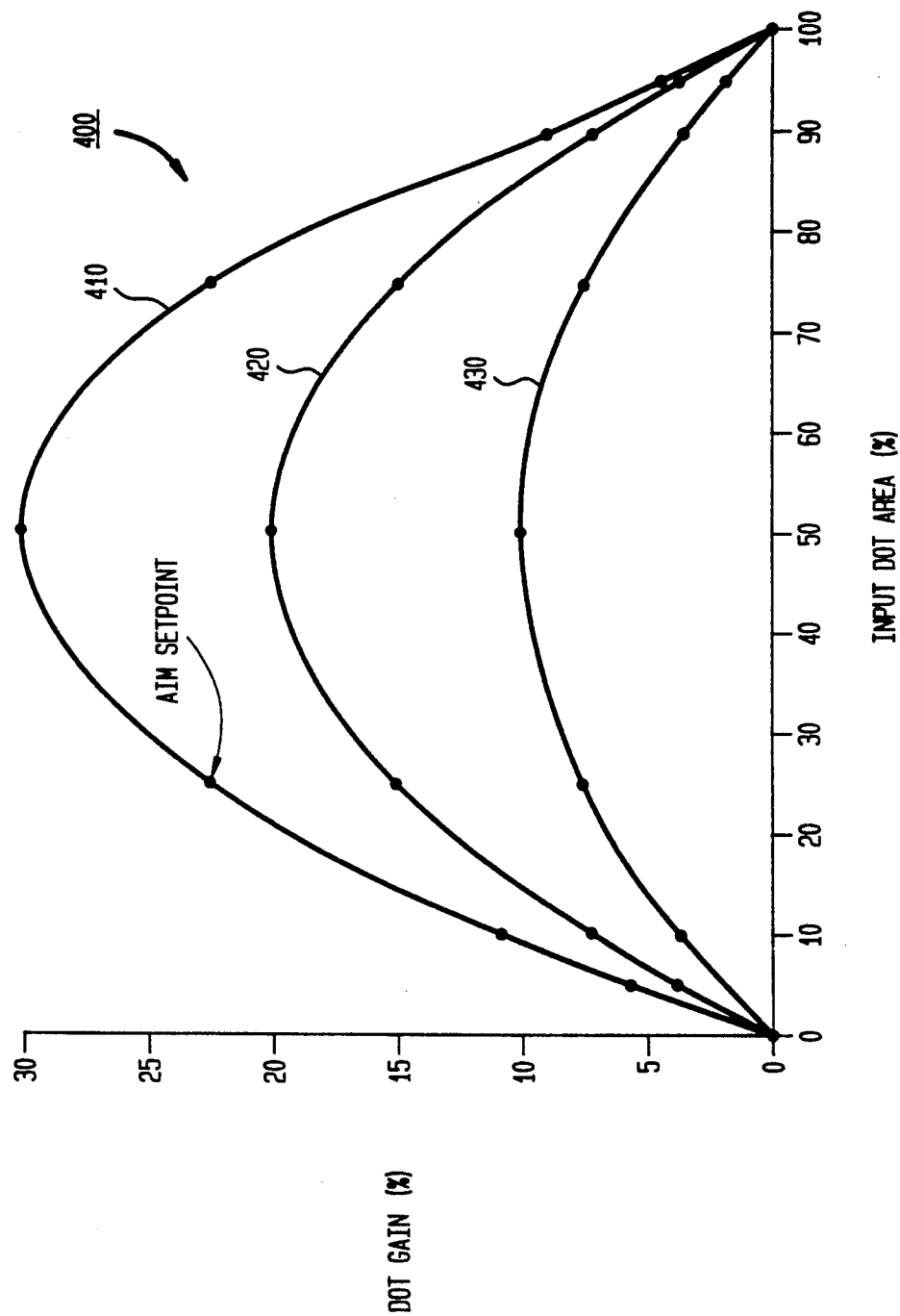

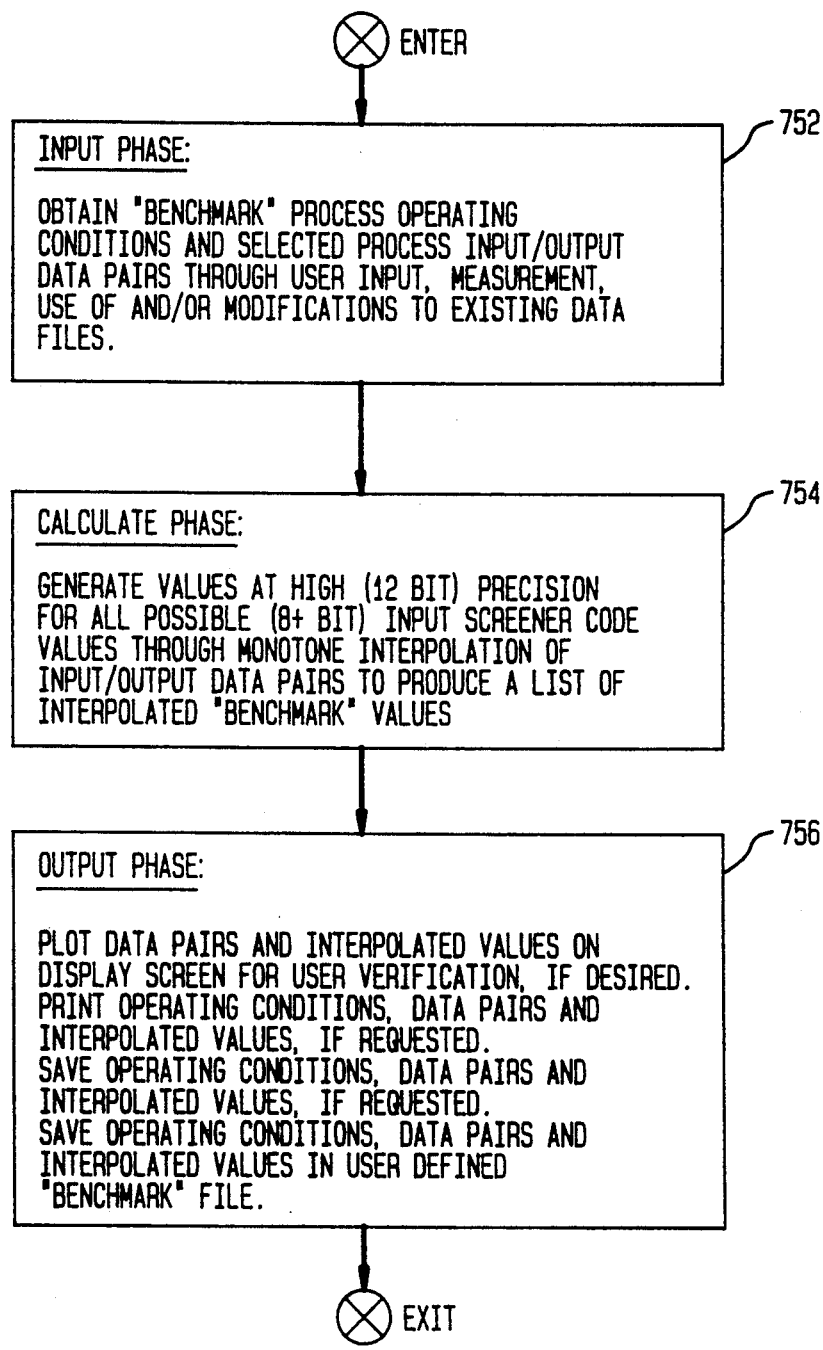

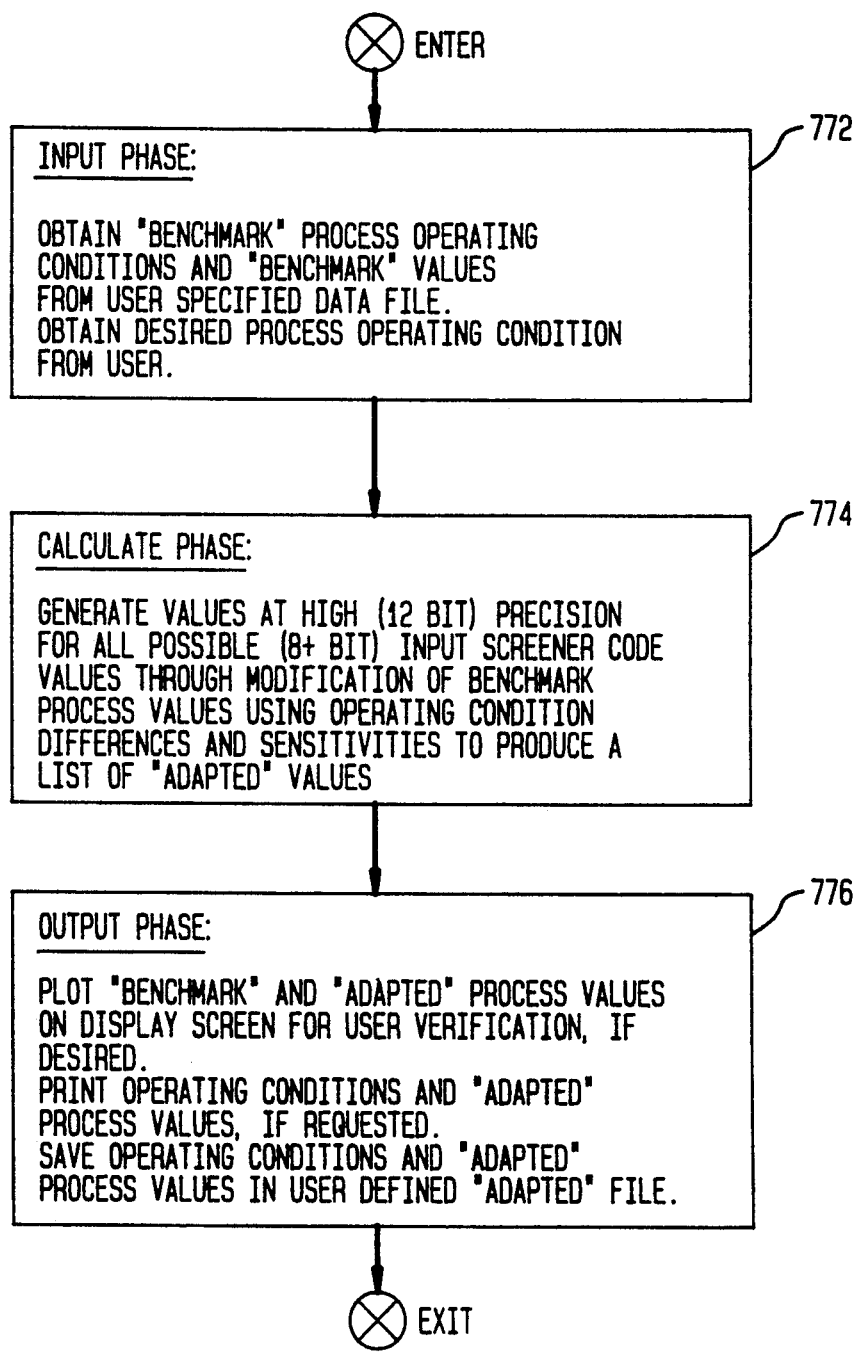

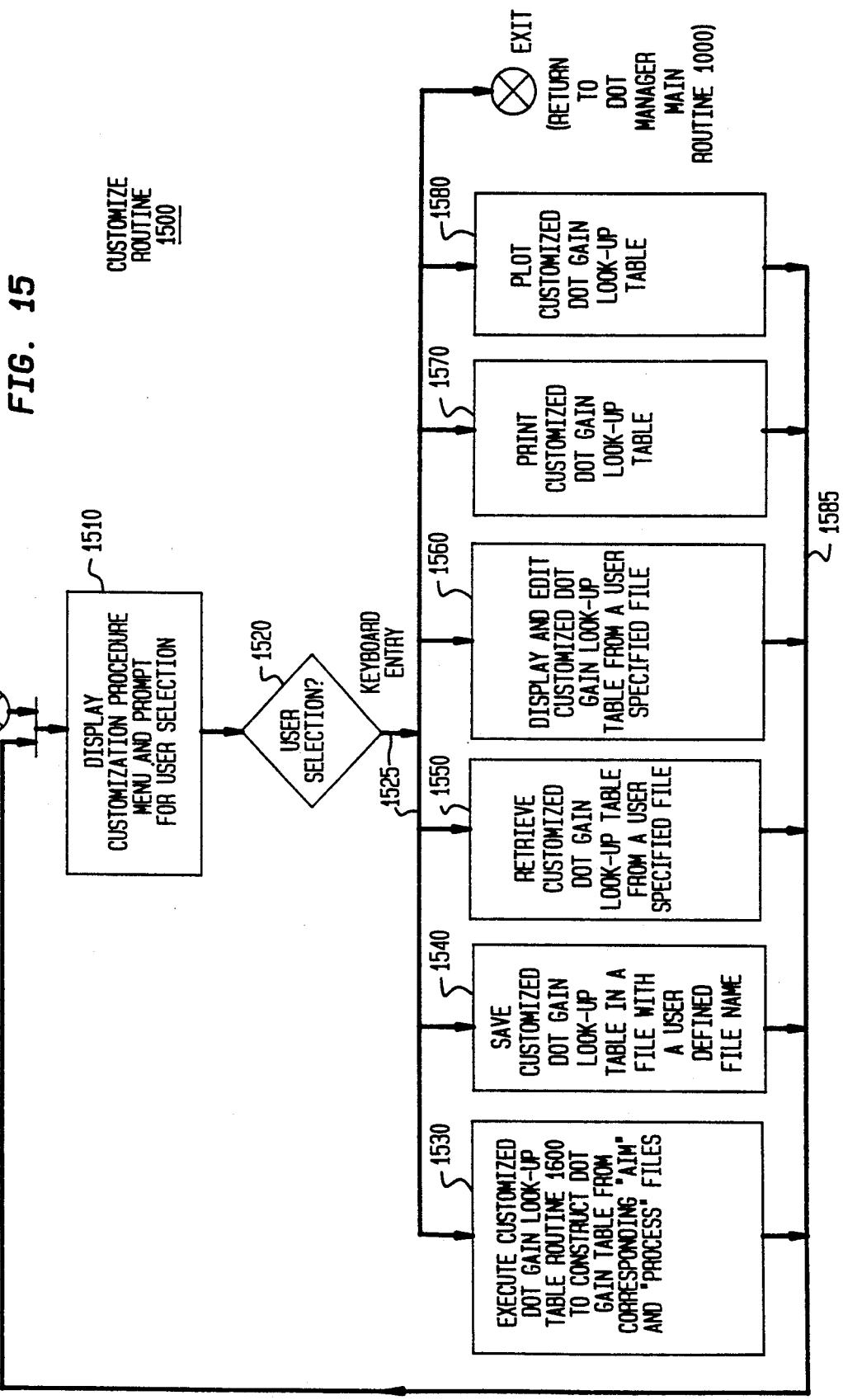

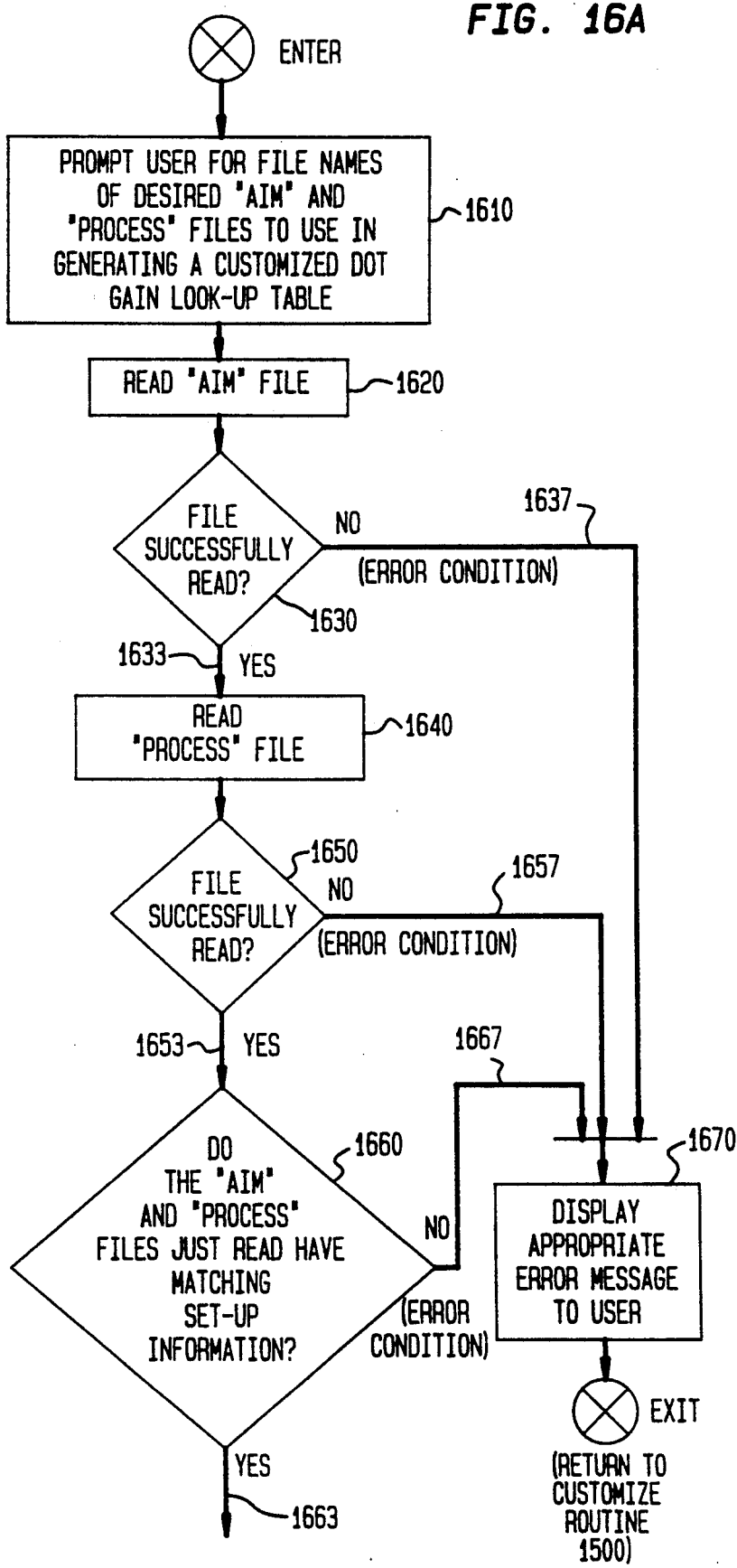

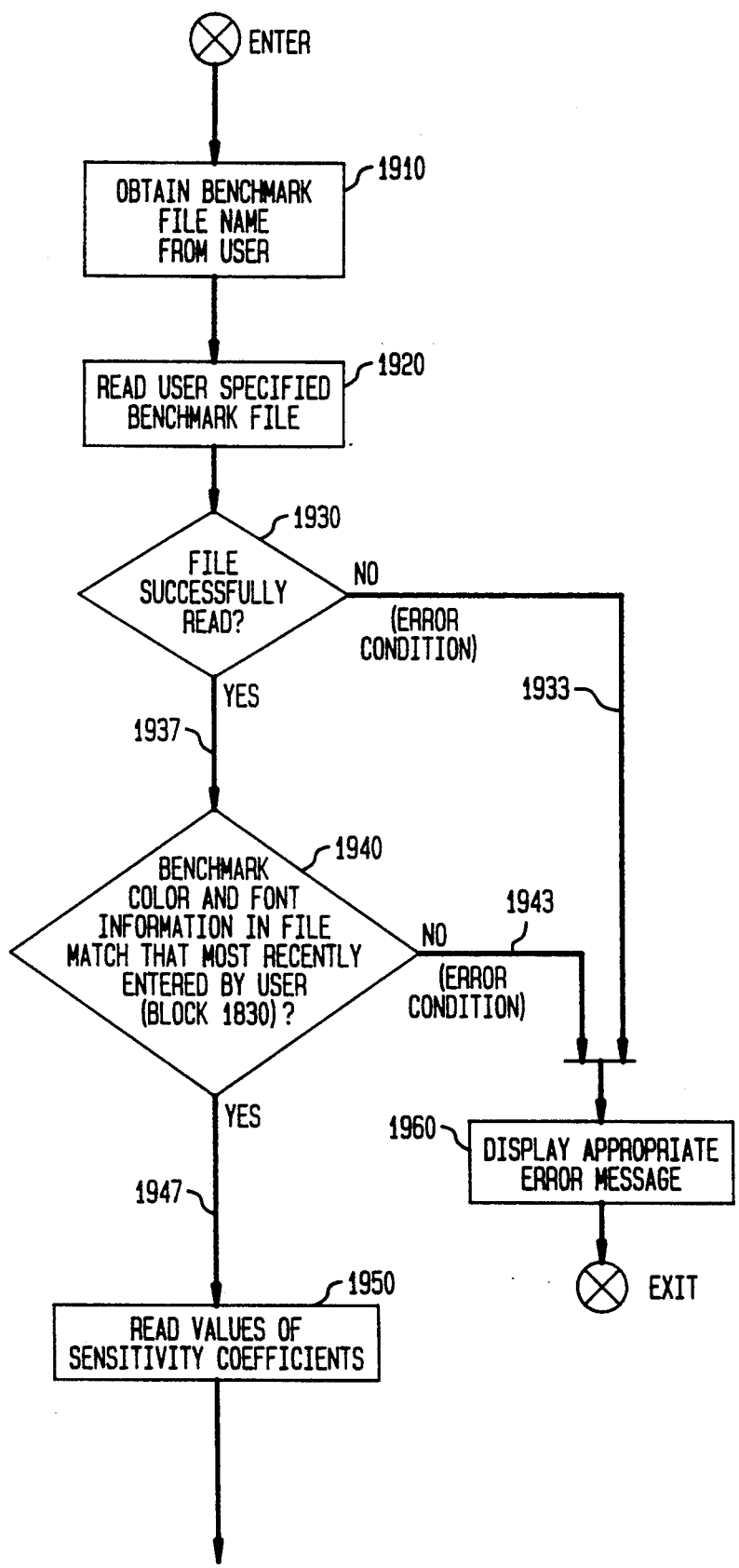

ADAPTIVE TECHNIQUE FOR PROVIDING ACCURATE TONE REPRODUCTION CONTROL IN AN IMAGING SYSTEM

CROSS-REFERENCE TO RELATED APPLICATION

This application is a continuation-in-part of my co-pending United States patent application entitled "A TECHNIQUE FOR USE IN CONJUNCTION WITH AN IMAGING SYSTEM FOR PROVIDING ACCURATE TONE REPRODUCTION IN AN OUTPUT IMAGE" filed Oct. 25, 1991, U.S. patent application Ser. No. 07/782,940 and which has been assigned to the present assignee hereof.

TECHNICAL FIELD OF THE INVENTION

The invention relates to a technique, specifically apparatus and associated methods employed therewith, for accurately providing desired tone reproduction in an output image through an imaging system, such as an imaging chain used in a direct digital color proofing system, while significantly reducing the number of test proof images that would otherwise need to be made and measured.

BACKGROUND ART

Graphic arts applications frequently require the accurate reproduction of a high resolution color image (commonly referred to as an "artwork"), such as a color photograph, a color drawing, a color layout and the like. A typical application might involve printing a high resolution color image or a series of such images on a page of a periodical, such as a magazine, or a corporate annual report.

Images are oftentimes generated either photographically, on suitable film, or electronically, on video tape or other suitable electronic media. When generated, images share a basic characteristic: they are recorded on a continuous tone (hereinafter referred to as "contone") basis. As such, the color existing at any point in the image is represented by a plurality of continuous amplitude values, oftentimes discretized as eight-bit values ranging from "0" to "255".

Color reproduction equipment takes advantage of the principle that the vast majority of colors can be separated into a specific linear combination of four primary subtractive colors (cyan, yellow, magenta and black—C, Y, M and K) in which the amount of each primary color is set to a predetermined amount. In the case of printed reproductions of an image, use of primary color printing obviates the need to use a differently colored ink for each different color in the image. As such, each image is converted into a succession of three or four color separations, in which each separation is essentially a negative (or positive) transparency with an altered tone reproducing characteristic that carries the color information for only one of the primary colors.

Modern offset printing presses do not possess the capability of applying differential amounts of ink to any location in an image being printed. Rather, these presses are only designed to either apply or not apply a single amount of ink to any given location on a page. Therefore, an offset printing press is unable to directly print a contone separation. To successfully circumvent this problem, halftone separations are used instead. An image formed from any single color halftone separation encodes the density information inherent in a color image from amplitude modulated form into a spatial (area) modulated form, in terms of dot size, which is subsequently integrated by the human eye into a desired color. By smoothly changing halftone dot sizes (dot areas), smooth corresponding tone variations will be generated in the reproduced image. Given this, the art has taught for some time that a full color image can be formed by properly overlaying single color halftone reproductions for all of the primary subtractive colors, where each reproduction is formed from a halftone dot separation that contains dots of appropriate sizes and in one of these primary colors. Clearly, as size of the dots decreases, an increasing amount of detail can be encoded in a dot pattern and hence in the reproduced image. For that reason, in graphic arts applications, a halftone separation utilizes very small dots to yield a relatively high dot pitch (resolution).

With this in mind, one might first think that printing a color image for graphic arts use should be a fairly simple process. Specifically, a color image could first be converted into corresponding continuous tone separations. Each of these contone separations could then be converted into a corresponding halftone separation. A printing plate could then be manufactured from each halftone separation and subsequently mounted to a printing press. Thereafter, paper or other similar media could be run through the press in such a fashion so as to produce properly registered superimposed halftone images for all the subtractive primary colors thereby generating a full color reproduction of the original image.

In practice, accurately printing a color image is oftentimes a very tedious, problematic and time consuming manual process that requires a substantial level of skill. First, the conventional manual photographic process of converting a contone separation into a halftone separation, this process commonly being referred to as "screening", is a time and resource consuming process in and of itself. Second, various phenomena, each of which disadvantageously degrades an image, often occur in a reproduced halftone color image. Moreover, the complete extent to which each of these phenomena is present in the reproduced image is often known only at a rather late point in the printing process thereby necessitating the use of tedious and time and resource consuming iterative trial and error experimentation to adequately eliminate these phenomena.

Specifically, to verify the accuracy of the color printing process and to enable appropriate adjustments to be made at various stages in the printing process in order to correct image defects and improve reproduction accuracy, a test image, frequently referred to as a "proof" is generated from the halftone separations once they are made. After a proof is generated, it is presented as being representative of the reproduced image which will be produced by a printing press in order to determine the accuracy of the printed image. Oftentimes, the proof contains unexpected and unsightly Moire patterns that arise from the interaction of pattern(s) in the image itself with that introduced by use of angled halftone screens that are used to photographically generate the halftone separations. Frequently, these Moire patterns can be rendered invisible by rotation of one or more of the screens to a different screen angle. Unfortunately, the exact change in the screen angle is frequently very hard to discern from the resulting Moire pattern itself and instead must be determined through trial and error experimentation. Many other unexpected artifacts can also exist in the proof thereby necessitating that various changes must be made to one or more of the separations. As such, this requires that one or more new halftone separations must be generated or at least changed, a new proof must be produced and then analyzed, with this "proofing" process being iteratively repeated until the objectionable Moire patterns and all objectionable artifacts are eliminated from the proof. Now, once an acceptable proof is made, thereby indicating that a printed image based on the separations will likely present a desired depiction of the original artwork, a separate printing plate is then made for each halftone separation. At this point, a full color print, commonly referred to as a "press sheet", is produced from these plates onto a sheet of actual paper stock that is to be used to carry the reproduced image. The press sheet is then examined to discern all imperfections that exist in the image reproduced therein. Owing to, e.g., unexpected tone reproduction shifts, the existence of any artifacts in the press sheet and tone variations occurring between the press sheet and the desired image of the original artwork, further adjustments in the coloration or screen angle of the separations may need to be made with the entire process, i.e. generation or modification of halftone separations and printing plates, being repeated until an acceptable press sheet is produced. With experience gained over several years, a skilled color technician can reduce the number of times that this entire process needs to be repeated in order to produce a set of color halftone separations that yields an acceptable press sheet.

As one can now readily appreciate, the iterative manual process of producing an acceptable set of halftone separations, due to the inherent variability of the process, can be very tedious and inordinately time consuming. Unfortunately, in the graphic arts industry, publication deadlines are often extremely tight and afford very little, if any, leeway. Consequently, the available time in a graphic arts production environment allotted to a color technician to generate a set of halftone separations to meet a particular publication deadline, for example, is often insufficient to allow the technician adequate time, due to the trial and error nature of iterative process, to generate that set of separations which produces a very high quality halftone color image. As such, the technician is often constrained by time pressures to produce a set of separations that produces a visually acceptable and hence satisfactory, though not necessarily a very high quality, image.

In addition, the manual process can be disadvantageously quite expensive. Inasmuch as the manual process, even for a skilled color technician, involves a certain amount of trial and error experimentation, a number of separate proofs is often made with changed or new separations being generated as a result. Each new separation requires another piece of film. Film and associated developing chemicals are expensive. In addition, if an unacceptable press sheet is produced, then additional separations may need to be made along with new printing plates, which further lengthens the process and increases its expense.

In an effort to reduce the time required and expense associated with conventional manual photographic based color reproduction processes, the art has turned away from use of these manual processes in high volume graphic art applications to the use of intermediate off-press proofing technologies, such as electro-photographic techniques. In this regard, U.S. Pat. No. 4,708,459 (issued to C. Cowan et al on Nov. 24, 1987, assigned to the present assignee hereof and hereinafter referred to as the '459 Cowan et al patent) discloses an electro-photographic color proofing system. While this system generally produces an excellent quality proof, it does not permit a user to precisely specify a tone reproduction curve shape which, in turn, restricts the ability of this system to provide accurate tone reproduction over the entire operating space of the system.

Specifically, tone reproduction, as it relates to a digital separation, essentially defines an input/output relationship between measured optical reflection densities and corresponding, e.g. eight-bit, contone values. To provide accurate tone reproduction, the measured densities should properly track the contone values. Each contone value represents a corresponding area of a halftone dot. As will be seen, tone reproduction entails consideration of two phenomena: dot gain and solid area density.

As to dot gain, it has been known in the art for quite some time that the effective area of a halftone dot, as printed and as perceived by a viewer, frequently diverges from that of its associated contone value. This is generally caused by a number of factors, some of which are strictly physical in nature, such as for example media absorbency and ink spreading, while others are optical in nature, such as an amount of light that is reflected from or absorbed into a dot. As the actual dot areas that form an image diverge from the corresponding contone values these areas are intended to depict, that image exhibits increasingly poor tone reproduction. For ease of reference and convenience, optical reflectance densities for halftone images are generally viewed, in the art, in terms of equivalent halftone dot areas which permits tone reproduction to be considered in terms of dot gain.

Dot gain, as that term is known in the art, is simply defined as the difference, expressed as a percent and referenced to a full sized (100%) halftone dot, between the size of an output halftone dot (i.e. "dot out") that is produced for a given sized input halftone dot (i.e. "dot in"), specifically dot gain=dot out−dot in. When graphically depicted over a full range of input dot areas, i.e. from 0–100%, output dot area typically does not equal input dot area on a 1:1 basis. While 0% and 100% sized input dots must correspondingly produce 0% and 100% output dots, i.e. zero dot gain must occur at both of these limit points, dot gain is frequently non-zero and positive between these limits thereby defining a non-zero tone reproduction curve. If output dot area were to equal input dot area on a 1:1 basis throughout the entire range, then this would define a 45° line (for null dot gain) that emanates from an origin on a dot in vs. dot out curve. Corresponding numerical values for dot gain are frequently specified at 25%, 50% and 75% sized input dots, and occasionally for input dots sized at 90% (for shadow areas) and 10% (for highlight areas). A simple dot gain curve may take the shape of an inverted parabola that has zero dot gain for a 0% input dot, increases on a non-linear basis through 10% and 25%, reaches a maximum at 50%, and thereafter non-linearly decreases through 75% and 90% and finally once again reaches zero at a 100% input dot. The shape of the dot gain curve for any halftone separation effectively provides the shape of the tone reproduction curve of that separation.

Solid area density, frequently stated as $D_{max}$, simply defines the optical reflection density of a solid area that is to be produced by a halftone separation for the maximum contone value associated therewith, e.g. "255" for eight-bit contone values. The value of $D_{max}$ effectively scales the tone reproduction curve of the image formed by that particular separation.

It has been known for some time in the art, that maximum solid area density and dot size are physically linked. In this regard, even as the physical area (i.e. the actual coverage) of a halftone dot remains constant, the apparent size of this dot (i.e. that perceived by a viewer and owing to the optical effects of light reflectance and absorbance between the dot and the media on which that dot is printed) varies with changes in solid area density. Furthermore, the optical effects of tone reproduction will often be exacerbated by various physical effects, such as media absorbency or ink spreading as noted above, that are associated with actually printing these dots. Specifically, by virtue of these physical effects, a larger or smaller dot may actually be printed than that which was intended.

With the above in mind, if a color proof image is to match the tone reproduction inherent in a press sheet, then that proof image needs to accurately reproduce both a desired solid area density and a dot gain curve shape that are expected to result in the press sheet for each primary color separation in the proof.

To effectuate some control over dot gain, the electrophotographic proofing system described in the '459 Cowan et al patent, permits an operator to specifically vary dot size of the halftone dots at a 50% input dot size for any separation. However, this system does not permit the operator to precisely specify a desired dot gain curve shape to be used to generate a primary color halftone image from that separation. By only providing such dot size control, this system, in effect, merely allows an operator to select any one dot gain curve from a family of pre-defined and similarly shaped dot gain curves that only vary amongst each other by scale. However, mere selection among a family of pre-defined dot gain curves oftentimes does not result in a proper dot gain curve shape that accurately reflects the dot gain inherent in a color printing process which the proof image is to represent. Consequently, the proof will not accurately exhibit the dot gain curve shape inherent in that process. As such, the very limited control over dot gain provided by electro-photographic proofing systems has tended to unduly limit the tone reproduction capability of these systems and hence has often prevented these systems from accurately reproducing various subtleties in a color proof image that would appear in a press sheet.

For a variety of reasons, such as for example, increased flexibility, control and throughput over that provided by optical (including electro-photographic) proofing systems, the art is currently turning towards the use of so-called direct digital color proofing (DDCP) systems. These systems directly generate a halftone color proof image from a set of digitized contone separations and particularly the digitized contone values therefor. Specifically, DDCP systems manipulate the separations in digital form to electronically generate appropriate halftone separations, including, inter alia, electronic screening and tone reproduction compensation, and then directly write the proof image using an appropriate high resolution binary marking engine. Furthermore, inasmuch as these systems completely eliminate photographic film based processes, these systems are expected to be very economical to operate.

By virtue of providing dot gain compensation in a completely digital fashion, these DDCP systems will permit far better control over image subtleties and hence tone reproduction than that available through optical proofing systems known in the art.

In that regard, I have previously developed a technique for inclusion in, illustratively, a DDCP system that allows an operator to completely specify and readily change a desired dot gain curve shape that, within the physical limits of the system, is to be reproduced in the proof and then have the system produce a proof image that exhibits the desired dot gain curve shape. That technique is fully described in my co-pending United States patent application "A TECHNIQUE FOR USE IN CONJUNCTION WITH AN IMAGING SYSTEM FOR PROVIDING ACCURATE TONE REPRODUCTION IN AN OUTPUT IMAGE" filed Oct. 25, 1991, U.S. patent application Ser. No. 07/782,940 and which has been assigned to the present assignee hereof.

Very broadly speaking, this technique relies on intentionally varying the value of each incoming contone value by an amount consistent with both the actual tone reproduction characteristic of a DDCP imaging chain (i.e. a so-called "Process" dot gain) and a desired (so-called "Aim") dot gain to yield an output dot of an appropriate area that provides the desired density in the proof image. In this context, the DDCP imaging chain is illustratively formed of a raster image processor (RIP), which implements a screening process, and a marking engine connected thereto such as a sublimation dye transfer laser writer. To readily accomplish this variation, all the incoming contone values are appropriately modified through illustratively a table look-up into correspondingly modified values which, when subsequently rendered into halftone patterns on the proof image by the marking engine cause the proof to accurately exhibit the desired "Aim" tone reproduction curve. The look-up table contains values which represent the "Aim" tone reproduction curve modified by an inverse of the "Process" tone reproduction curve.

While this technique yields excellent results, it requires that the "Process" tone reproduction curve be accurately specified at the specific operating condition at which the DDCP imaging chain is to operate. In that regard, it is well known that the response of a halftone imaging chain will vary based upon a number of factors, including, though not limited to, variations in, illustratively, screen ruling, color, dot font and solid area density.

I have observed that, owing to thresholding inherent in a sublimation dye transfer DDCP system, particularly involving dye transfer response to exposures from the writing lasers used therein, the size of a halftone dot, at any screen ruling, exhibits an approximately linear variation with changes in solid area density of that dot. For example, for a 50% input dot written at a screen ruling of 150 lines/inch (1 pi) (approximately 60 dots/cm), a change in solid area density of 0.8 (from a low to a high density as measured in "Status T" units) causes an apparent 10% increase in dot size. At screen rulings of 200 1 pi (approximately 79 dots/cm) and 120 1 pi (approximately 47 dots/cm), the dot size variation for the same 50% input dot amounted to 14% and 6%, respectively. Furthermore, at any solid area density, dot size, being primarily a cumulative perimeter effect over all the dots in a region of the image, exhibits an approximately linear variation with corresponding changes in screen ruling. For a 50% input dot, a change in screen ruling from 150 to 200 1 pi, or 150 to 100 1 pi appears to respectively cause a 2% increase or 2% decrease in tone reproduction. While screen ruling induced tone reproduction variations are significantly smaller than solid area density induced variations, both variations in tone reproduction are noticeable, objectionable and best avoided.

To fully account for such performance variations, my prior inventive technique required that once an operating condition was completely specified, a test proof image had to be made, typically using a null dot gain look-up table, at that particular condition and then densitometrically measured. The measurements yielded the "Process" tone reproduction curve which was then used in conjunction with the desired "Aim" tone reproduction curve to construct appropriate values for the look-up table.

As one can readily appreciate, each time the operating condition changed by an amount which would lead to an objectionable tone reproduction change, unfortunately a new test proof had to be made and measurements taken thereof. In the case of density changes at 200 1 pi, an objectionable change could result from as little as a 0.1 change in output density. Not only does a proof image consume imaging media, which is fairly expensive, but more importantly, it consumes time both of a DDCP system and its operator. Typically, while a proof image may require upwards of approximately 15 minutes of machine time to produce, it may consume upwards of 30 minutes for a skilled operator to properly measure.

Since, as noted, publication deadlines in the graphics arts industry often afford very little, and often no appreciable, leeway in time, an operator generally does not have the available time to make and properly measure a test proof whenever he changes the operating condition of the DDCP imaging system. Thus, if he were to use my prior inventive technique, as described above, but not make a test proof, he would be constrained to either operate the DDCP system at only known operating conditions, for which test proofs have been previously made and measured, or vary the operating condition as desired but accept the ensuing performance variations in tone reproduction with a potentially adverse effect on resulting image quality—i.e. the proof image may not accurately represent an image that would be depicted on a resulting press sheet.

Thus, a need now exists in the art for a technique, which can be used in conjunction with a DDCP system, that can significantly reduce the number of test proof images that needs to be made in order to produce a "Process" tone reproduction curve that accurately characterizes the native response of an associated DDCP imaging chain for any change in the operating conditions, e.g., in solid area density and screen ruling, throughout the entire operating space of this chain. Specifically, such a technique should not require that a separate test proof be made and measured for each change in the operating condition.

DISCLOSURE OF THE INVENTION

Accordingly, an object of the present invention is to provide a technique, specifically apparatus and associated methods, for use in illustratively a direct digital color proofing (DDCP) system, for significantly reducing the number of test proof images that heretofore needed to be made whenever the operating condition, particularly screen ruling and/or solid area density, of a DDCP imaging chain is changed throughout its entire operating space.

A specific object is to provide such a technique that eliminates a need to produce and measure a separate test proof image for each specific change in the operating condition, e.g., in either screen ruling or solid area density.

These and other objects are accomplished in accordance with the teachings of my present invention by, in essence, defining "Benchmark" operating conditions and intrinsic (native) performance (i.e. "Benchmark" process performance data values) of the DDCP imaging chain thereat; and then, based upon differences (such as in screen ruling and solid area density) between a desired operating condition and an appropriate "Benchmark" operating condition, adapting "Benchmark" values associated with the latter, through use of a predefined model and associated sensitivity coefficients that collectively predict the performance of the DDCP imaging chain, to determine corresponding predicted process performance values (i.e., "Adapted" process values) that accurately specify the intrinsic process tone reproduction characteristic of the imaging chain that is expected to occur at the desired operating condition. Thereafter, in response to both "Aim" and either "Benchmark" or Adapted" process performance values for the desired operating condition, a look-up table is fabricated to contain, for all possible input dot areas, the "Aim" tone reproduction characteristic modified by the inverse of this expected intrinsic process tone reproduction characteristic. Incoming dot area values (i.e. contone values) for a corresponding separation are then routed through this table, prior to screening and writing, in order to intentionally vary the size of each corresponding output halftone dot so that the resulting dot in the proof image accurately depicts that specified by the "Aim" tone reproduction characteristic. Advantageously, as a result, the output dots, when subsequently written by a marking engine in the DDCP imaging chain, will accurately exhibit the desired "Aim" tone reproduction characteristic.

In spite of the variability of intrinsic process tone reproduction to changes in the operating condition of the DDCP imaging chain, such as illustratively in screen ruling and/or solid area density, use of my present invention significantly reduces the number of test proof images that needs to be produced and measured in order to accurately determine, such as within approximately a $\pm 1\%$ dot area tone reproduction variation, the intrinsic process tone reproduction characteristic at a desired operating condition. In this regard, rather than requiring a separate test proof to be produced and measured for each and every different change that was to be made to the operating condition of the DDCP imaging chain, only a very small number of test proof images, each at a known pre-defined operating (a so-called "Benchmark") condition, needs to be produced. Thereafter, the intrinsic process tone reproduction characteristic that would be expected to occur at a desired operating condition would be adaptively determined given the changes in operating space of the DDCP imaging chain between the desired operating condition and the appropriate "Benchmark" condition.

In particular, each "Benchmark" condition defines a particular operating condition situated within the operating space of the DDCP imaging chain. For a sublimation dye transfer DDCP imaging chain, each "Benchmark" condition would be associated with generally a relatively large rectangularly shaped area (or region) of the entire operating space and within which the DDCP imaging chain is to be used. A "Benchmark" would be defined for each such region, though its location therein may vary depending upon color and font and associated prediction accuracy.

Once a "Benchmark" condition is chosen, a test proof would be made, using a null tone reproduction curve, at that specific condition and then measured. These measurements would define the "Benchmark" process tone reproduction curve at that specific operating condition. Thereafter, an expected process tone reproduction curve (i.e. an "Adapted" tone reproduction curve) would be adaptively determined through use of both empirically based, illustratively bi-linear, mathematical model which relates the performance of this chain to changes in its operating condition, e.g. in screen ruling and/or solid area density and interactions therebetween, and pre-defined stored sensitivity coefficient values for this particular "Benchmark" condition. I have found that the specific model I that use for the sublimation dye transfer DDCP imaging chain, specifically a bi-linear model, provides a very accurate prediction, for changes such as in screen ruling and solid area density, over a relatively wide region of the operating area using a single "Benchmark" operating condition located in that area and appropriate sensitivity coefficients. Additionally, I have found that, with a suitably placed Benchmark, a single set of standard sensitivity coefficients for each color, in association with the bi-linear model, provides very accurate adaptation results. Consequently, only a very small number of "Benchmark" conditions, generally two or three and often just one, depending upon the size of the area(s) of the operating space over which the imaging chain is to actually operate, is advantageously required to fully, accurately and adaptively predict the expected process tone reproduction that will occur at any desired user specified operating condition. A test proof needs to be made only at each of the "Benchmark" conditions. Hence, a test proof no longer needs to be generated for each and every change in the operating condition, thereby providing significant savings in cost, time and material to a DDCP user.

BRIEF DESCRIPTION OF THE DRAWINGS

The teachings of the present invention may be readily understood by considering the following detailed description in conjunction with the accompanying drawings, in which:

FIG. 3A depicts the data structure of a proof request;

FIG. 3B depicts the structure of image file description field 310 situated within proof request (queue element) 300 shown in FIG. 3A;

FIG. 3C depicts image processing flags field 319 that forms part of image file description field 310 shown in FIG. 3A;

FIG. 3D depicts the structure of each one of pass parameter fields 380 situated within proof request 300 shown in FIG. 3A;

FIG. 4 graphically depicts a set of three typical "Aim" dot gain curves;

FIG. 7B depicts a high level flowchart of "Benchmark" Data Manipulation process 750 which manipulates process data in accordance with my inventive teachings;

FIG. 7C depicts a high level flowchart of "Adaptation" Data Manipulation process 770 which manipulates process data in accordance with my inventive teachings;

FIG. 15 depicts a flowchart of Customize Routine 1500 that is executed within Dot Manager Main Routine 1000 shown in FIG. 10;

FIGS. 16A and 16B collectively depict a flowchart of Customized Tone Reproduction Look-up Table Routine 1600 that is executed within Customize Ton Reproduction Routine 1500 shown in FIG. 15;

FIGS. 19A and 19B collectively depict a flowchart of Compute Adaptation Routine 1900 that is executed within Adaptation Routine 1800 shown in FIG. 18;

To facilitate understanding, identical reference numerals have been used, where possible, to denote identical elements that are common to various figures.

MODES OF CARRYING OUT THE INVENTION

After reading the following description, those skilled in the art will readily appreciate that my present invention can be used in a wide variety of different imaging applications to produce, through an imaging process, an output image that exhibits a desired tone reproduction characteristic, such as dot gain, and is substantially free of any corruption due to a native tone reproduction characteristic of that process. Such an image may illustratively include color halftone images, four-bit black and white images, or eight-bit contone images, or even video images. Inasmuch as my present invention is particularly (though by no means exclusively) suited for use in a direct digital color proofing (DDCP) system with a DDCP imaging chain formed of a screening process, which is illustratively provided through a raster image processor (RIP), and a binary marking engine used to generate a color proof image formed of properly superimposed images of cyan, magenta, yellow and black (C, Y, M and K) halftone separations in which each separation is to exhibit a desired dot gain curve and hence a desired dot gain, then, to simplify the following discussion, the invention will be specifically discussed in that context.

Tone reproduction, as it relates to a digital separation, essentially defines an input/output relationship between measured optical reflection densities and corresponding, e.g. eight-bit, continuous tone ("contone") values. Ideally, to provide accurate tone reproduction, the measured densities should properly track the contone values. Each contone value represents a corresponding area of a halftone dot. For ease of reference and convenience, optical reflectance densities for halftone images are generally viewed in terms of equivalent halftone dot areas which permits tone reproduction to be considered in terms of dot gain. In this regard, equation (6), shown and discussed below, is used to compute dot area from corresponding density values. Tone reproduction entails consideration of two phenomena: dot gain and solid area density.

Figure 1A:
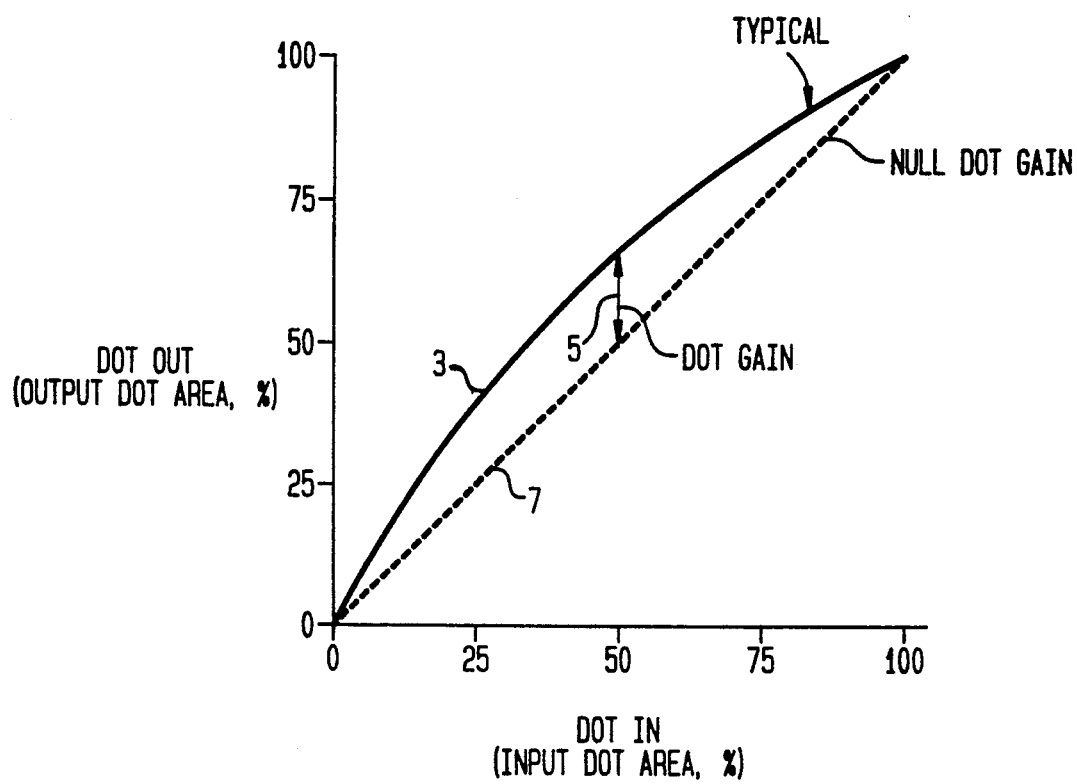
FIG. 1A graphically depicts typical dot in—dot out curve 3 and curve 7, the latter having null dot gain, as they are known in the art.

As to dot gain, the area of a halftone dot, as printed and as perceived by a viewer, frequently diverges from its associated contone value, as shown by curve 3 in FIG. 1A. For purposes of this invention, input dot area is defined to be an equivalent area that is proportional to a digitized value in a contone image file. For an 8-bit (i.e. "0" to "255") digitized positive image, the equivalent input dot area is typically defined by equation (1) as follows:

$$\% \ DotArea = 100\% \ \frac{CTV}{255} \quad (1)$$

where: CTV is a digitized contone value.

The divergence between corresponding input and output dot areas is generally caused by a number of factors, some of which are strictly physical in nature, such as, for example, media absorbency and ink spreading, while others are optical in nature, such as an amount of light that is reflected from or absorbed into a dot. As the actual dot areas that form an image diverge from the corresponding contone values these areas are intended to depict, that image exhibits increasingly poor tone reproduction.

Dot gain is simply defined, with respect to dot gain, as the difference, illustratively shown by distance 5 in FIG. 1A, expressed as a percent and referenced to a full sized (100%) halftone dot, between the size of an output halftone dot (i.e. "dot out") that is produced for a given sized input halftone dot (i.e. "dot in"), specifically dot gain=dot out−dot in. If output dot area were to equal input dot area on a 1:1 basis throughout an entire range of 0–100% input dot area, then this would define 45° line 7, as shown in FIG. 1A, that emanates from an origin on a dot in vs. dot out curve. Such a line defines a so-called null dot gain curve. While 0% and 100% sized input dots must correspondingly produce 0% and 100% output dots, i.e. zero dot gain must occur at both of these limit points, dot gain is frequently non-zero and typically positive dot gain between these limits thereby defining a non-zero dot gain curve, such as curve 3. Corresponding numerical values for dot gain are frequently specified at 25%, 50% and 75% sized input dots, and occasionally for input dots sized at 90% (for shadow areas) and 10% (for highlight areas).

Figure 1B:
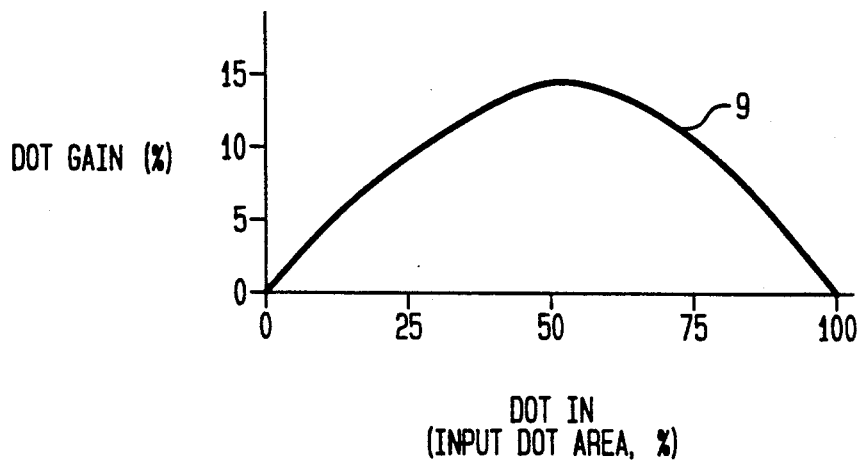
FIG. 1B graphically depicts dot gain curve 9 associated with dot in—dot out curve 3 shown in FIG. 1A

FIG. 1B graphically depicts dot gain curve 9 associated with dot in−dot out curve 3 shown in FIG. 1A. As such, curve 9 has the shape of illustratively an inverted parabola that has zero dot gain for a 0% input dot, increases on a non-linear basis through 10% and 25%, reaches a maximum at 50%, and thereafter non-linearly decreases through 75% and 90% and finally once again reaches zero at a 100% input dot. The shape of the dot gain curve for any halftone separation effectively provides the shape of the tone reproduction curve of that separation.

Color halftone reproduction equipment, specifically a raster image processor (RIP) and a marking engine connected thereto which collectively form a DDCP imaging chain (also hereinafter referred to as a "RIP/-marking engine imaging chain") used in a DDCP system, possesses a native non-zero tone reproduction (i.e., dot gain) characteristic which generally varies based upon the operating condition at which that equipment is operated. These variations are attributable to changes in, for example: solid area density, screen ruling, color (C, M, Y or K) being written, and dot font shape used (e.g. square, round, elliptical or diamond), the last effect being particularly noticeable at approximately 50% dot areas, as well as to changes in media and other physical factors. This native (intrinsic) tone reproduction is not constant but often varies from one operating condition to the next. In this regard, I have observed that the native dot gain characteristic generally appears, at any screen ruling, to be linearly related to corresponding changes in density and, at any density, linearly related to corresponding changes in screen ruling. As a result of this apparently variable native dot gain characteristic, if an image of a halftone separation were to be written by a DDCP system without consideration of the native dot gain characteristic of the DDCP imaging chain, and particularly at the specific operating condition at which this chain is to be operated, the dot gain inherent in the resulting image would be corrupted by the then occurring native dot gain characteristic of the imaging chain. As such, a resulting proof image would not accurately depict the dot gain inherent in the reproduction equipment and hence would not accurately represent a resulting proof or press sheet to be formed thereby.

However, through use of my invention, resulting halftone dots will be produced in corresponding locations in an image formed from a halftone color separation by a DDCP imaging chain that, when printed at a given operating condition, will advantageously provide a corresponding density value that will accurately match the density value which is to appear at each of these locations. Specifically, the value of each input dot area (i.e. incoming contone value) is intentionally varied, in an amount consistent with both the native dot gain characteristic of the DDCP imaging chain (i.e., the "Process" dot gain) that is expected to occur at the specific operating condition at which the imaging chain is to operate and a desired (i.e. "Aim") dot gain curve, to yield a resulting code value that, when subsequently printed by the marking engine, provides the desired density in the proof image. To readily accomplish this, all the incoming contone values are appropriately modified, through illustratively a table look-up operation, into corresponding code values which, when subsequently applied, by way of the RIP, to the marking engine and printed on the proof image, cause the proof to accurately exhibit the desired "Aim" dot gain curve.

Specifically, my invention relies on first defining "Benchmark" operating conditions and intrinsic tone reproduction performance (i.e. "Benchmark" values) of the DDCP imaging chain thereat; and then, based upon differences (such as in screen ruling and solid area density) between a desired operating condition and an appropriate "Benchmark" condition, adapting "Benchmark" values associated with the latter, through use of a pre-defined model and associated sensitivity coefficients that collectively predict the performance of the DDC imaging chain, to determine corresponding predicted process performance values (i.e., "Adapted" values) that accurately specify the intrinsic process tone reproduction characteristic of the imaging chain that is expected to occur at that desired operating condition.

Thereafter, in response to both "Aim" values and either "Benchmark" or "Adapted" values (hereinafter collectively referred to as "Process" values when either can be used) for the desired operating condition, a dot gain look-up table is fabricated to contain, for all possible input dot areas, the "Aim" tone reproduction characteristic modified by the inverse of this expected intrinsic process tone reproduction characteristic. Incoming dot area values (i.e. contone values) for a corresponding separation are then routed through this table, prior to screening and writing, in order to intentionally vary the size of each corresponding output dot so that the resulting dot in the proof image accurately depicts that specified by the "Aim" dot gain curve. Advantageously, as a result, the output dots, when subsequently written by a marking engine in the DDCP imaging chain, will accurately exhibit the desired "Aim" dot gain and the desired tone reproduction characteristic associated therewith.

Given the variability of the intrinsic process tone reproduction to changes in the operating condition of the DDCP imaging chain, such as illustratively in screen ruling and/or solid area density, use of my present invention significantly reduces the number of test proof images that needs to be produced and measured in order to accurately, such as within approximately a±1% tone reproduction variation, determine the intrinsic (native) process tone reproduction characteristic at a desired operating condition. In this regard, rather than requiring a separate test proof to be produced and measured for each and every different change that was to be made to the operating condition of the DDCP imaging chain—as was required with the DDCP system described in my co-pending application "A TECHNIQUE FOR USE IN CONJUNCTION WITH AN IMAGING SYSTEM FOR PROVIDING ACCURATE TONE REPRODUCTION IN AN OUTPUT IMAGE" filed Oct. 25, 1991, U.S. patent application Ser. No. 07/782,940 and which has been assigned to the present assignee hereof, my present invention relies on establishing a very small number of test proof images each at a corresponding "Benchmark" operating condition and adaptively determining the process tone reproduction characteristic that would be expected to occur at a desired operating condition given the process tone reproduction characteristic at an appropriate Benchmark condition and the changes in between the desired operating condition and the appropriate "Benchmark" condition.

In particular, each "Benchmark" condition defines a particular operating condition situated within the operating space of the DDCP imaging chain. For the sublimation dye transfer DDCP imaging chain utilized in DDCP system 100 (see FIGS. 2A and 2B and as described in detail below), each "Benchmark" condition would be associated with generally a relatively large rectangularly shaped area (or region), of the entire operating space, within which the DDCP imaging chain is to be used. In this regard, one such area, for use with "coarse" printing such as newsprint applications, may extend throughout the entire density range and for screen rulings from 85-120 1 pi (approximately 33-47 lines/cm). Another such area extending between screen rulings from 175-200 1 pi (approximately 69-79 lines/cm) and at relatively high solid area density values may be defined for high quality printing applications, such as annual reports and the like. Another, i.e. a third, area may be defined as encompassing the remainder of the operating space and be associated with medium quality printing. A "Benchmark" would be defined for each such region, though the location of the "Benchmark" therein may vary depending upon color and font and associated prediction accuracy, as discussed in detail below.

Specifically, once a "Benchmark" operating condition is selected, a test proof would be made, using a null dot gain look-up table, at that specific operating condition and then measured with a reflection densitometer. The output densities, typically taken from only a small number of input dot areas, are then converted to corresponding output dot areas using equation (6), which is described below. Since these measurements are not made for all possible input values, these output dot area values are monotonically interpolated, e.g., using monotone piecewise cubic interpolation, to fully define the "Benchmark" tone reproduction curve at that specified condition. Thereafter, an expected process tone reproduction curve (i.e. an "Adapted" tone reproduction curve) would be adaptively determined through use of an empirically based mathematical model which relates the performance of this chain to changes in its operating condition, e.g. in screen ruling and/or solid area density and interactions therebetween, and the use of pre-defined stored sensitivity coefficient values for this particular "Benchmark" condition. I have found that the specific model that I use for the sublimation dye transfer imaging chain in DDCP system 100, specifically a bi-linear model, provides a very accurate prediction over a relatively wide area of the operating space using a single "Benchmark" operating condition located in that space and a single set of input color and area dependent sensitivity coefficients. Consequently, only a very small number of "Benchmark" conditions, generally two or three and often just one, depending upon the size of the area(s) of the operating space over which the imaging chain is to actually operate, is advantageously required to fully, accurately and adaptively predict the expected process tone reproduction that will occur at any desired user specified operating condition. A test proof needs to be made only at each of the "Benchmark" operating conditions. Consequently, a test proof no longer needs to be generated for each and every change in the operating condition, thereby providing significant savings in cost, time and material to a DDCP user.

Similarly to the "Benchmark" tone reproduction curve, an "Aim" output tone reproduction curve is specified first at a small number of input dot areas (i.e., to form setpoint values). Subsequently, these setpoint values are monotonically interpolated at all possible input values, e.g., using monotone piecewise cubic interpolation, to fully define the "Aim" tone reproduction curve.

Figures 2, 2A:
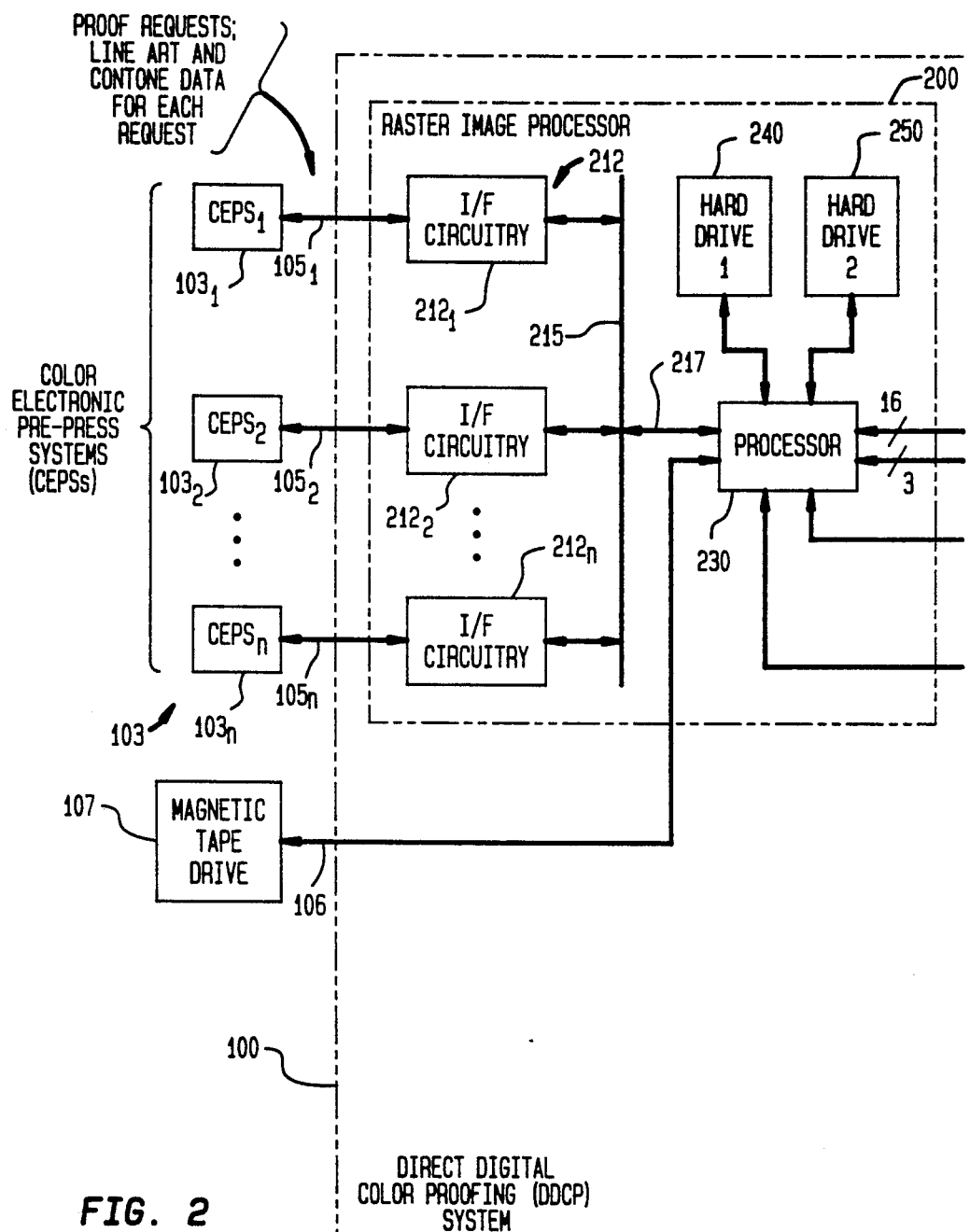
FIG. 2 depicts the correct alignment of the drawing sheets for FIGS. 2A and 2B.
FIGS. 2A and 2B collectively depict a high level block diagram of Direct Digital Color Proofing (DDCP) system 100 that embodies the teachings of my present invention.

At this point then, the "Aim" and "Process" tone reproduction curves, which specify the desired and uncompensated process performance at a particular operating position respectively, each comprise a list of outputs for "all possible" inputs. These output values are then combined to yield a customized dot gain look-up table that, for the specific desired condition at which the DDCP imaging chain is to run, reflects the "Aim" tone reproduction curve modified by the inverse of the "Process" tone reproduction curve, i.e. the latter accurately reflecting the native tone reproduction characteristic of the DDCP imaging chain which is expected to occur at that desired condition. By obtaining and then interpolating appropriate "Aim" and "Benchmark" data, adapting the "Benchmark" values for operating condition differences to obtain "Adapted" values and then constructing a look-up table therefrom, the DDCP imaging chain can produce a proof image that, within physical limits occurring at that desired operating condition, will accurately exhibit only the desired "Aim" tone reproduction curve and hence the desired tone reproduction characteristic associated therewith. Generally speaking, if the desired operating condition and/or "Aim" tone reproduction curve changes, then advantageously only the values for the look-up table need to be re-computed and stored, without any further test proof images being made or measured FIGS. 2A and 2B collectively depict a high level block diagram of DDCP system 100 that incorporates the teachings of my present invention; the correct alignment of the drawing sheets for these figures is depicted in FIG. 2.

Specifically, as shown, DDCP system 100 is connected to and obtains continuous tone image data, via lines 105 (containing lines $105_1, 105_2, \ldots, 105_n$), for an image from any one of a number of color electronic pre-press systems (CEPSs) $103_1, 103_2, \ldots, 103_n$ that collectively form CEPSs 103. In essence, DDCP system 100 processes the contone image data for each image and generates an accompanying color proof image therefor on, for example, a paper medium. The resulting proof image after being transferred to the paper medium is referred to as a "proof sheet". Continuous tone image data can also be previously recorded on magnetic tape and, through magnetic tape drive 107 and lead 106, provided to DDCP system 100 for proofing.

The data provided by each CEPS is in the form of a file of successive contone values which, for each successive pixel within an image, are formed of interleaved contone values for the individual separation colors, e.g. values for cyan, yellow, magenta, and black (C, Y, M and K), therefor. Each of CEPSs 103 can be any one of a number of current commercially available color electronic pre-press systems.

For any image to be proofed, DDCP system 100 digitally manipulates the contone separation values provided by any of the CEPSs by first de-interleaving these values into individual contone separation files, then digitally generates a halftone separation file for each of the individual contone separations by, for example, inter alia, electronic screening and dot gain compensation, and then directly writes a composite color proof image for all these halftone separations using an appropriate marking engine.

DDCP system 100 contains raster image processor (RIP) 200; marking engine 130; operator personal computer (PC) 120 and its associated peripherals: densitometer 124, remote diagnostics modem 125 and line printer 128; and laminator 150. Each of CEPSs $103_1$, $103_2$, ..., $103_n$ is connected within RIP 200 through an appropriate hardware interface $212_1$, $212_2$, ..., $212_n$, which collectively form interfaces 212, to CEPS bus 215 which, in turn, is connected to processor 230. This processor is a conventional microcomputer system. Hard disks 240 and 250 (also denoted as hard drives 1 and 2) are also connected to processor 230 and provide temporary storage of processed halftone image data generated by this processor. Each of these hard disks contains an image file, with both of these files collectively operating, as discussed in detail below, on a "ping-pong" basis such that processor 230 writes halftone image data for the next image to be proofed into one of these files, while it reads halftone image data for the current image being proofed from the other file and applies that data to the marking engine. The processor alternates the function of each of these files between reading and writing as data for successive images to be proofed is applied to the DDCP system RIP 200 is connected to marking engine 130 through serial message link 295 which carries status and error messages, commands and parameters between these units on a serial basis. Data interface 280, which is formed of sixteen-bit parallel (active high) image data bus 283 and image control bus 285, is used to transfer halftone image data in sixteen-bit parallel form (for transferring halftone data for sixteen successive pixels at a time) from the RIP to the marking engine. The RIP pads, as necessary, each micro-raster of the image to a sixteen-bit word boundary and, prior to the transfer of data across data bus 283, notifies the marking engine, via serial link 295, as to the number of halftone bytes existing on each line of the proof image. This number is a constant for each image. Image control bus 285 contains three separate lines (not specifically shown): data ready, data request and data acknowledge, which are collectively used by RIP 200 and marking engine 130 to implement a simple interlocked handshake protocol to transfer each successive sixteen-bit data word between these components. In particular, to transfer a sixteen-bit data word, RIP 200 asserts a signal (active low) on the data ready line (the "data ready signal") to inform the marking engine that data transfer is to begin. Thereafter, to obtain this data word, the marking engine asserts a signal (active low) on the data request line (the "data request signal"). Once this latter assertion is detected by the RIP, the RIP places the sixteen-bit data word onto image data bus 283 and then asserts a signal (also active low) on the data acknowledge line (the "data acknowledge signal") Once the marking engine reads this data word and then, in response to the asserted data acknowledge signal, the engine de-asserts the data request signal. In response to this, the RIP de-asserts the data acknowledge signal thereby completing an interlocked handshake operation and the accompanying successful data transfer. On the rising edge of the data acknowledge signal, the marking engine loads the incoming sixteen-bit data value into an internal holding first-in first-out (FIFO) circuit (not shown). These steps are then repeated in seriatim for each successive sixteen-bit data word that is to be transferred from RIP 200 to the marking engine for the current image to be printed. After all the halftone data has been transferred for a given proof image, the RIP will de-assert the data ready line. For each proof that is to be printed, the RIP successively transfers to the marking engine the complete bit-mapped halftone image data, as a succession of sixteen-bit words, for each separate halftone separation image that is to form the proof.

Operator PC 120, containing display and keyboard 121 and processor 122, is a conventional personal computer that is interfaced through links 113 and 117 to both RIP 200, specifically processor 230 therein, and marking engine 130. This PC permits a DDCP system operator to, inter alia, produce and download a customized dot gain table into the RIP, monitor and interrogate the status of as well as control both RIP 200 and marking engine 130 and perform diagnostic and set-up operations thereon, as desired. Densitometer 124, under control of operator PC 120, is used to measure the density of various test patches generated by the RIP/marking engine imaging chain in order to calibrate its performance and/or to produce a source of "Benchmark" data, and/or to measure such densities associated with a desired image to provide the "Aim" data. Modem 125 provides a dial-up telephone link for use in remotely diagnosing any abnormalities that may occur within the DDCP system. Line printer 128 can be used by the DDCP system operator to provide a local printout of desired information.

Marking engine 130 is preferably a multi-laser sublimation dye transfer binary marking engine. In essence, to print a proof image by the marking engine, a receiver sheet (i.e. a film media with a transfer layer) of appropriate dimensions is automatically cut and wrapped onto a rotating drum (not shown) within the engine. Thereafter, to generate a particular C, Y, M or K separation, a respective C, Y, M or K dye donor sheet is first spooled off a supply reel within the engine and superimposed, in proper registration, onto the receiver sheet with an emulsion side of the donor sheet contacting the receiver sheet. Thereafter, a bit-mapped image for an appropriate halftone separation is written by the marking engine onto the donor sheet by selectively exposing that sheet, using a writing laser, at each location where a writing spot is to appear. At each such location, the exposure causes a controlled amount of dye to migrate (transfer) from the donor sheet to the top of the transfer layer of the receiver sheet. For each writing spot, the intensity of the light produced by the writing laser determines the amount of dye that transfers to the receiver sheet. The donor sheet is then removed from the receiver sheet. This process is then repeated using a differently colored donor sheet in conjunction with the same receiver sheet for each remaining separation. In addition, the marking engine can accommodate differently colored receiver sheets. Furthermore, the marking engine can also accommodate two specially colored donor sheets and write accompanying separations thereon for transfer to a receiver sheet. The special colors and accompanying separations are used to generate an exact shade of either of two desired colors, such as "KODAK" yellow, or of colors that are not within the color gamut defined by cyan, yellow, magenta and black, e.g. "Hot" pink, phosphorescent, pastels or gold colors. ("KODAK" and the specific color "KODAK yellow" are both registered trademarks of the Eastman Kodak Company of Rochester, N.Y. which is also the present assignee hereof.) Once marking engine 130 writes all the separations for a particular proof image onto a common receiver sheet, the engine ejects that sheet as intermediate sheet 140. At this point, the entire proof image is situated on the top of the transfer layer of the receiver sheet that forms intermediate sheet 140. In order to transfer the proof image from the intermediate sheet to paper media, in order to form a so-called "proof sheet", the DDCP system operator manually inserts intermediate sheet 140 along with a sheet of prelaminate material and a sheet of press stock into laminator 150. Laminator 150 is not electrically connected to any of the components within DDCP system 100. Once the operator feeds these sheets into the laminator, it first laminates the prelaminate material to the press stock and then laminates the transfer layer of the intermediate sheet to the prelaminated press stock. Once lamination is completed, a laminated page emerges from the laminator with the transfer layer containing the proof image fused to the press stock. The operator then peels off and discards intermediate layer 155, which is a backing layer, and then retains proof sheet 160 containing the proof image. For purposes of the present invention, any one of a number of other types of marking engines could also be used. Inasmuch as the marking engine itself and the laminator do not form part of the present invention, they will not be discussed in any further detail below.

In order to generate a proof image, an operator situated at any of CEPSs 103 formulates a proof request through a keyboard and an interactive menu based display provided thereat. The proof request, as defined below and shown in FIGS. 3A-3D, contains those parameter values and file name(s) that are necessary, when proofing resources are available, to set-up the DDCP system to generate a proof image. The parameter values define the manner through which the contone image data for the proof image is to be processed by the RIP, such as by defining screen rulings and angles, separation sequence, number of copies and the like, and then printed by the marking engine. The file name(s), which are defined by the CEPS operator, specify the names of the data file(s) that reside on the CEPS and contain the interleaved contone image data for that proof image. Note however, that the proof request does not however contain the image data itself but only an identification of the file(s) which stores that data. By eliminating image data from each proof request, the size of each proof request is substantially reduced from upwards of approximately 100 MBytes (for image containing both contone data and linework) to approximately 200 bytes.

After a proof request has been entered, the particular CEPS on which it is entered will transmit that request to DDCP system 100 and specifically to RIP 200. Proof requests can be entered either while the DDCP system is currently processing a prior proof request, printing a proof image or performing neither operation. RIP 200 maintains a proof request queue (not specifically shown) within one of the two hard disks, illustratively within hard disk 240 (see FIGS. 2A and 2B). This queue contains three separate queues: a "rush" queue, a "normal" queue and a "hold" queue. Based upon the priority accorded to the request by the operator, i.e. rush, normal or hold, RIP 200 places the incoming request at the bottom of the appropriate queue. Those requests that have been assigned a rush priority are sequentially processed first, again on a first-in first-out basis, by the RIP and, in turn, forwarded to the marking engine for printing ahead of any "normal" priority requests. A request with a "hold" priority is merely retained in the "hold" priority queue but is not processed until such time as its priority is changed or it is incorporated into a "scatter" proof request. A scatter proof is a proof that contains a number of non-overlapping images, here arising from separate proof requests, that are printed on a common proof sheet.

Through operator PC 120 and specifically through interactive menu based screen displays generated thereat, the DDCP system operator can edit the contents of each of the queues and each proof request therein. Because the image parameters that configure the marking engine for any proof image form part of the request for that proof, the operator can change, as desired, the condition(s) under which any individual proof will be generated, e.g. by changing screen angle for any individual halftone separation. In addition, the DDCP system operator can also re-prioritize the proof requests, re-arrange the order in which the proof images are successively generated, and even add or delete proof requests from each queue.

The RIP begins processing a particular proof request once that request reaches the top of its associated queue. To simplify matters for purposes of the ensuing discussion, the proof request queue will be assumed, on a simplistic basis, as containing only one queue. Specifically, after the most recently occurring request has been fully processed, the RIP reads the next proof request situated at the top of the queue. Once this request has been read, the RIP determines, based upon the parameter values specified in that request and current system resources, whether a proof image for that request can be currently printed or not. In this regard, for example, if the request specifies a particular media color, the RIP determines through querying marking engine 130 whether media for that color has been loaded into the engine and whether sufficient supplies of that media exist to generate the proof. Similarly, if a special color donor sheet is specified, the RIP inquires as to whether that donor sheet is available, and so forth for other consumable items.

Figure 2B:
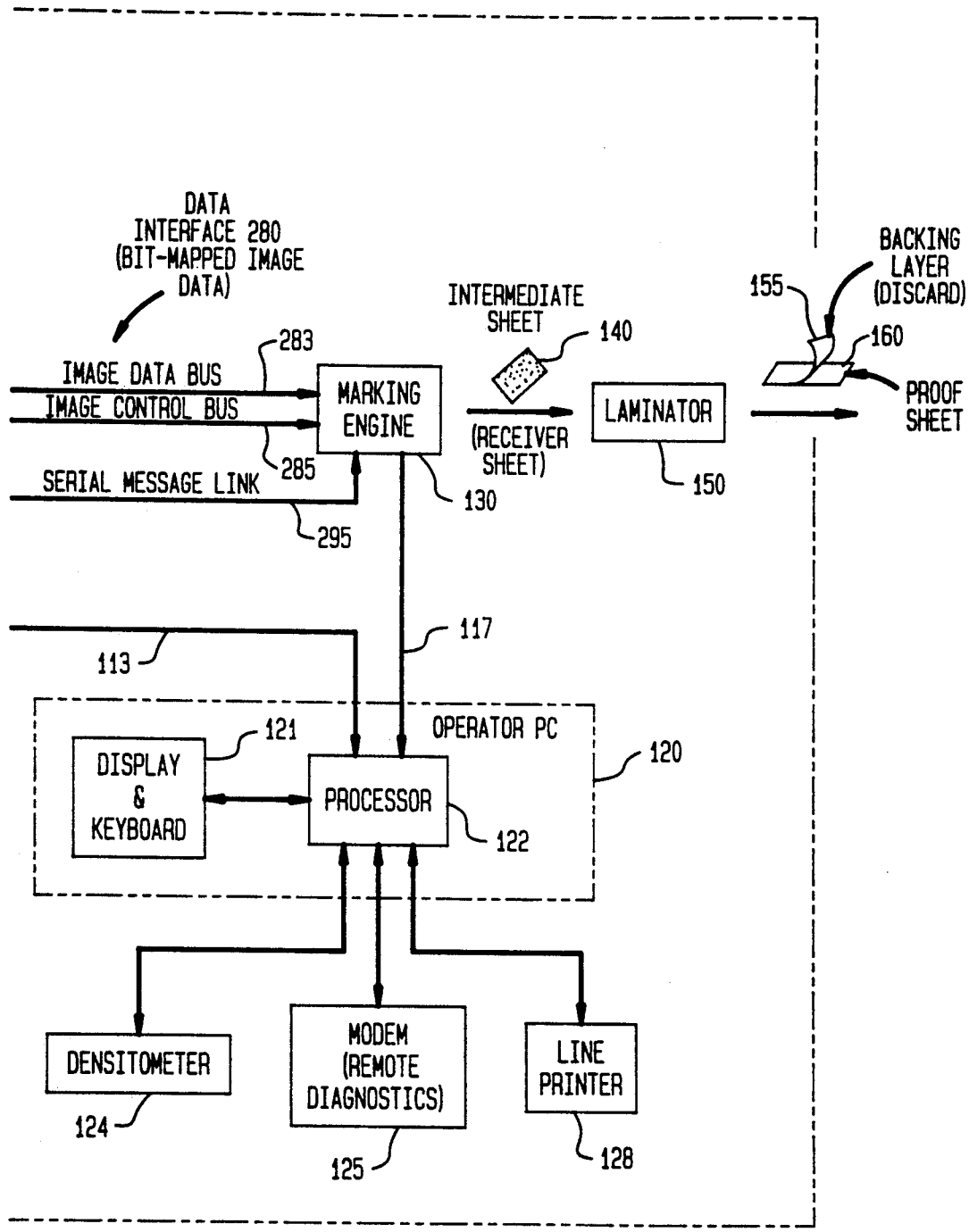

If the RIP determines that appropriate system resources exist to generate a proof image for this request, then the RIP obtains the appropriate contone data file(s) from the CEPS that generated this request The appropriate file name(s) and an identification (device name) of this CEPS are specified within the proof request. For example, for a proof request generated from CEPS 103$_2$, RIP 200, as shown in FIGS. 2A and 2B, sends an instruction containing the file name(s) specified in that request for the accompanying contone data to this CEPS. In response, this CEPS reads the file(s) and supplies the data over line 105$_2$ to RIP 200. This data will be routed through the appropriate interface circuitry, such as circuitry 212$_2$, which provides an appropriate hardware interface for this CEPS to the RIP. The data is then routed, via CEPS bus 215, to processor 230 situated within RIP 200. The processor will first translate this data, if necessary through an appropriate translation routine, into a form compatible with RIP programming. This may include, for example, inverting density values where on a particular CEPS a "0" eight-bit contone value may indicate full density, while on the DDCP system the same value would indicate no density. To provide compatibility across many different CEPSs, separate hardware interfaces and software translation routines, to the extent needed, will exist within the RIP for each different CEPS. As such, DDCP system 100 can function with a wide variety and nearly any number of different CEPSs that are interfaced to CEPS bus 215. After the contone data has been appropriately translated and modified into code values and for dot gain, RIP 200 will electronically screen the data for that separation to generate a halftone separation for each different color. Thereafter, the RIP will store all the data for the halftone separations for the current image being processed in either hard disks 240 or 250. At the same time, the RIP is reading halftone image data for the image that has most recently been processed and is applying that data over data interface 280 to marking engine 130 to generate a proof image therefor. To increase throughput, the RIP pipelines the image processing and printing functions. Specifically, while processed halftone image data is being read from one hard disk and printed, newly processed image data for the next image to be printed is being stored on the other hard disk. Under the control of RIP 200, each of the hard disks reverses its function with each successive image. Operating the hard disks in this fashion increases the throughput of proof images through the DDCP system and allows the system to produce a relatively steady stream of images at or near the throughput of the marking engine. Therefore, assuming that the RIP is currently reading halftone image data from hard disk 250 for printing, newly processed image data for the current image being processed will be stored on hard disk 240. Once all the data has been supplied from hard disk 250 to marking engine 130 in order to print the most recently processed image, then, shortly thereafter, RIP 200 will read the halftone image data stored on hard disk 240 and supply it to the marking engine for printing, with this process being repeated for successive images to be proofed. For a detailed explanation of the queue based manner in which proof requests are processed through RIP 200, including the use of hard disks operating on a "ping-pong" basis, the reader is referred to the co-pending United States patent application entitled "A Queue Based Technique for Handling Proof Requests in a Direct Digital Color Proofing System" from applicants S. Auer et al, U.S. patent application Ser. No. 07/749,024; filed Aug. 23, 1991 and which has been assigned to the present assignee hereof and which is incorporated by reference herein.

The proof requests that reach the top of either of the "rush" or "normal" priority queue but can not be processed by the RIP at the time they were read retain their place in their respective queue pending subsequent processing. Proof requests can also be entered by the DDCP system operator through operator PC 120 and specifically using menu driven interactive screen displays and keyboard entry through display and keyboard 121.

FIG. 3A depicts the data structure of a typical proof request. This request is stored within the proof request queue as proof request (queue element) 300. Request 300 contains a succession of fields, with their accompanying reference numbers, listed and described below in Table 1.

TABLE 1

| Item | Description |
| --- | --- |
| Proof Request Fields | |
| Pointer to next entry (305) | Pointer to next entry (proof request queue element - PRQE) in a linked list, that forms a queue, (rush, normal or hold) which holds this proof request; |
| Input file description (310) | Data structure which specifies: characteristics of the particular contone data to use in generating a proof image; file, device and page names for this data; and various image processing flags to enable/disable corresponding imaging features; |
| Output color order (325) | String defining the order of cyan, magenta, yellow, black, one film "special" color and/or two additional "special" separation colors for use in up to five successive halftoning passes for a common proof image; |
| Screen ruling (330) | Floating point value between 65-200 lines/inch continuous (approximately 26-79 lines/cm) which specifies the screen ruling to use for all the separations; |
| Dot font (335) | Byte specifying dot font, e.g. diamond, elliptical, square, round, gravure or composed; |
| Description (340) | Optional text for a data legend to be printed on the side of the proof image (string); |
| Number of proof copies (345) | Integer value from 1-50 designating number of copies of a proof image to print (byte); |
| Upper left hand corner x coordinate position (350) | Integer value (in mm) defining the x position of the upper left hand corner of an image to be proofed relative to the media sheet (commonly referred to as Expose Offset w) - only required for use in a scatter proof request; |
| Upper left hand corner y coordinate position (355) | Integer value (in mm) defining the y position of the upper left hand corner of an image to be proofed relative to the media sheet (commonly referred to as Expose Offset h) - only required for use in a scatter proof request; |
| Scatter proof enable (360) | Boolean value specifying whether this proof request can be part of a scatter proof request. If this enable is not set, then the associated request will not be included in a scatter proof request regardless of whether the associated request has been given a "hold" priority; |
| Priority (365) | Byte specifying rush, normal or hold; |

TABLE 1-continued

Proof Request Fields

| Item | Description |
| --- | --- |
| Extra Separation Names (370) | Strings (up to two) which specify the file names of up to two extra (additional) separations that are to be generated for the proof image; |
| Recipe Color Number (375) | Strings (up to two) which specify the number of a special color to be used for printing a halftone separation; and |
| Pass parameters (380) | Data structure specifying parameter values particular to each halftone printing (writing) pass that is to be undertaken by the marking engine. |

As indicated in FIG. 3B, image file description field 310 is itself a data structure that, among other things, contains a succession of names and parameter values pertinent to the particular contone data to use in generating a proof image for this request. Specifically, the constituent fields in field 310 are listed, with their accompanying reference numbers, and described in Table 2 below.

TABLE 2

Image File Description Fields

| Item | Description |
| --- | --- |
| CEPS Device Name (311) | String that specifies the name of the CEPS (or other device) on which the contone data file(s) reside; |
| Job Name (312) | String that defines a job name for the current proof request. Fields 311 and 312 are automatically established for this proof request once the CEPS (or DDCP system) operator establishes a pathname at the CEPS (or the Operator PC) for the contone file(s); |
| Page Name (313) | String which identifies the name of the particular page in the artwork to be proofed through this request; |
| Image Name (314) | String which identifies the name of the particular image in an artwork to be proofed through this request; |
| CT resolution (315) | Integer value that specifies the resolution of the contone image file(s) to be proofed through this request; |
| LW resolution (316) | Integer value that specifies the resolution of the accompanying linework (LW) file(s) to be proofed through this request; |
| Image Height (317) | Integer value (in mm) that specifies image height; |
| Image Width (318) | Integer value (in mm) that specifies image width; and |
| Image Processing Flags (319) | Byte containing various boolean flags to control various image processing and printing functions. |

Image processing flags 319, as specifically shown in FIG. 3C, contain separate boolean fields for the functions of, inter alia: image scaling, rotation, mirror orientation, control strip enable and data legend enable. Specifically, the scaling ("Scale to Fit") flag, if set, permits the RIP to scale the size of the image, if needed, to fit the dimensions of a proof image area that has been defined on the media on which the proof will be generated. Similarly, the rotation ("Rotate Image") flag, if set, permits the RIP to rotate the image by 90°, if needed, to fit the proof image area. The mirror ("Mirror Image") flag instructs the marking engine, through the RIP, to change the orientation of the image, in a fast scan direction, based on whether the contone data was stored in a so-called "mirrored" format by a CEPS which generated this request. The control strip enable flag, if set, instructs the RIP to print a control strip on the edge of the proofed image as it is being printed. The control strip consists of a series of single color test patches for use in subsequent densitometric measurements of the proofing process. Lastly, the data legend enable flag, if set, instructs the RIP to print a data legend, as specified in description field 340 shown in FIG. 3A, on the edge of the proofed image as it is being printed.

As indicated in FIG. 3D, pass parameters field 380 is itself a data structure that is replicated up to five times and contains parameter values pertinent for each successive halftoning pass that is to be performed by the marking engine to generate a proof image for the associated request. Inasmuch as four separate passes can occur for the four different donor sheet colors and a separate pass can occur for a special colored media sheet, five separate halftoning passes can be specified in a proof request. Although the marking engine can accommodate a different specially colored media as well as a normal media, only one such media can be used generate any one proof image. The order of these passes is that specified in output color order field 325 shown in FIG. 3A. Therefore, the first occurrence of field 380 is for the first halftoning pass specified in output order field 325, the second occurrence of field 380 is for the next successive halftoning pass and so on for each of the remaining passes. Specifically, the constituent fields that form each one of pass parameter fields 380 are listed, with their accompanying reference numbers, and described below in Table 3.

TABLE 3

Pass Parameters Fields

| Item | Description |
| --- | --- |
| Screen angle (381) | Floating point value between ±180° continuous specifying the screen angle for a corresponding pass. |
| Dot gain table (383) | String which identifies a dot gain table to use in this pass. During job entry, as discussed below, RIP processor 230, as necessary, issues an instruction to operator PC 120, as shown in FIGS. 2A and 2B, to download this dot gain table from this PC into this processor. |
| Solid area density (385) | A signed byte between the values ±22 for a halftoning pass for a donor sheet color, or between ±99 for a halftoning pass for a special media color. |

FIG. 4 graphically depicts set 400 of three typical "Aim" dot gain curves 410, 420 and 430. Each of these curves contains "Aim" setpoints, here represented by small circles and expressed in terms of dot gain, determined at illustratively 5%, 10%, 25%, 50%, 75%, 90% and 95% input dot areas, with the dot gains at both 0% and 100% input dot areas being zero. These curves typify the range of output dot gain that might be requested for "Aim" dot gain curves. As can be seen, the desired dot gain for such a 50% input dot in this separation ranges from 10–30%.

In general, FIGS. 5A–5F graphically illustrate typical changes in process intrinsic dot gain for the DDCP imaging chain in DDCP system 100 and particularly due to variations in the process dot gain attributable to an exemplary variation solely in ruling at each of two particular solid area densities, solely in solid area density at each of two particular rulings, simultaneously in both ruling and solid area density, and in font shape. Changes in dot size, attributable to unwanted process dot gain variations (whether intrinsic or otherwise) on the order of even as small as 1–2% can be noticeable and quite objectionable.

Figure 5A:
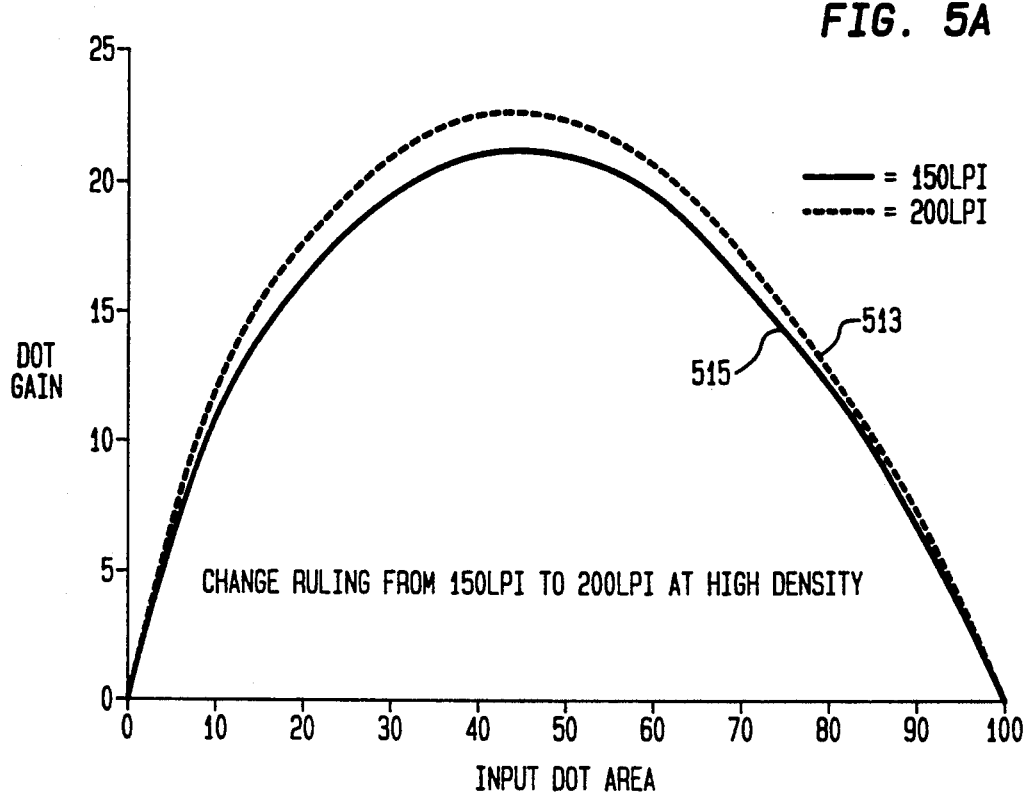
FIG. 5A graphically depicts intrinsic process dot gain that typically occurs for cyan dots printed through DDCP system 100 (shown in FIGS. 2A and 2B), at a relatively high solid area density and at screen rulings of both 150 and 200 1 pi.
Figure 5B:
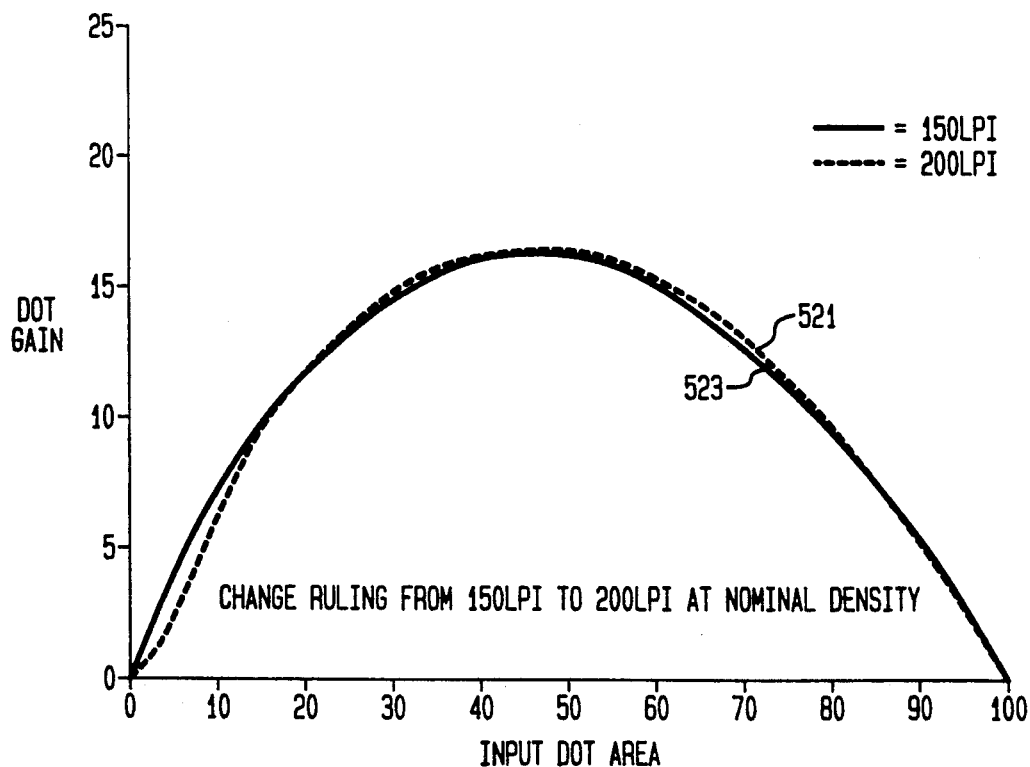
FIG. 5B graphically depicts intrinsic process dot gain that typically occurs for cyan dots printed through DDCP system 100, at a nominal solid area density and at screen rulings of both 150 and 200 1 pi.

Specifically, FIG. 5A graphically depicts intrinsic process dot gain that typically occurs for cyan dots printed through the imaging chain in DDCP system 100, at a relatively high solid area density and at screen rulings of both 150 and 200 1 pi (approximately 59 and 79 lines/cm). Solid curve 515 represents the intrinsic process dot gain of the imaging chain associated with a high solid area density for a 150 1 pi screen ruling; dashed curve 513 represents the resulting intrinsic process dot gain that occurs after increasing the screen ruling to 200 1 pi. Thus, as can be seen, the change in the operating condition caused by increasing the screen ruling engendered an increase in the intrinsic process dot gain, reaching a maximum of approximately 2% at a 45% input dot area. FIG. 5B graphically depicts, through solid curve 523 and dashed curve 521, a similar change in the operating condition for cyan dots but at a nominal density. The change in dot gain shown by curves 521 and 523 is generally small throughout all input dot sizes. However, while the small amount of this ruling change at nominal density may seem to be inconsequential, a small change in dot size tends to be particularly noticeable at small dot sizes rather than at large dot sizes. Hence, a loss of 1.6%, as shown, at a 5% input dot size can be objectionable while such a loss at 70% dots may not be visually apparent. I have also observed that larger differences in dot gain do occur, such as at 50% input dot area, for ruling changes involving magenta or black dots. Nevertheless, the resulting change in intrinsic process dot gain, for any color, due to a change in screen ruling tends to be less at lower solid area densities.

Figure 5C:
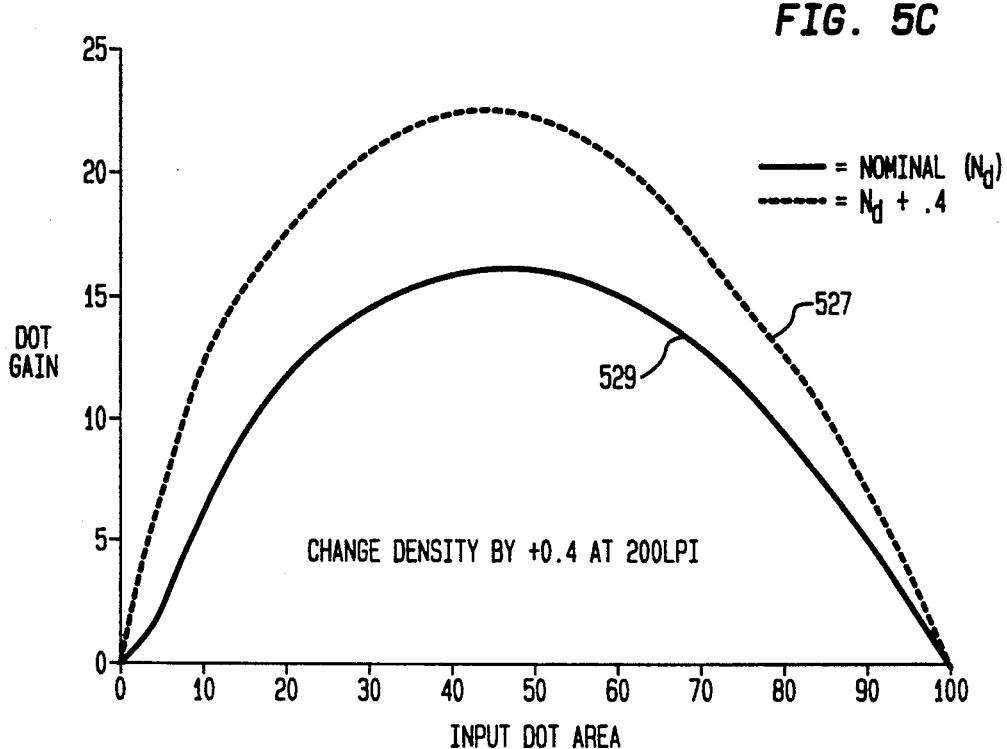
FIG. 5C graphically depicts intrinsic process dot gain that typically occurs for cyan dots printed through DDCP system 100, at a 200 1 pi screen ruling and at nominal (Nd) and Nd+0.4 solid area densities.
Figure 5D:
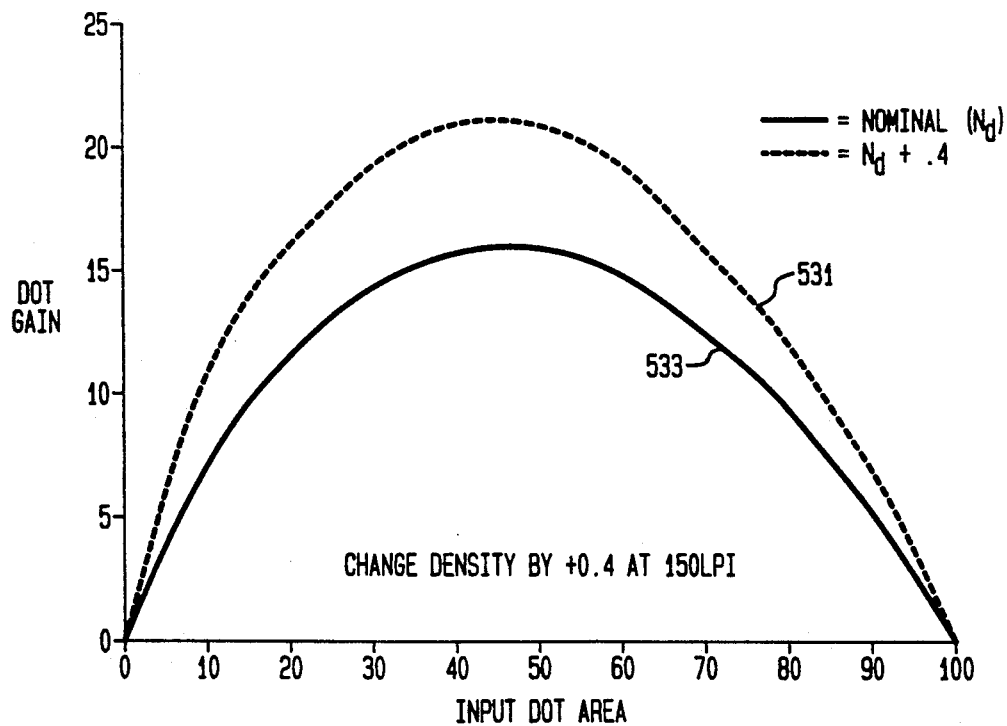
FIG. 5D graphically depicts intrinsic process dot gain that typically occurs for cyan dots printed through DDCP system 100, at a 150 1 pi screen ruling and $N_d$ and $N_d+0.4$ solid area densities.

As to variations in intrinsic process dot gain attributable to changes in solid area density given a fixed ruling, FIG. 5C graphically depicts solid curve 529, which represents intrinsic process dot gain for cyan dots printed through the DDCP imaging chain at a 200 1 pi screen ruling and a nominal ($N_d$) solid area density, and dashed curve 527 which represents the resulting intrinsic process dot gain that occurs after the solid area density has been increased to the value $N_d+0.4$. Similarly, FIG. 5D graphically depicts, through solid curve 533 and dashed curve 531, changes in intrinsic process dot gain for the same change in density but at a screen ruling of 150 1 pi. In both cases, the maximum intrinsic process dot gain changes due to a change in density are relatively large—approximately 6–7% for approximately 45% input dot area, noticeable and usually quite objectionable to a viewer. As illustrated in FIGS. 5A–5D; the process dot gain change attributable to density variations is considerably larger than that attributable to changes in screen ruling.

Figure 5E:
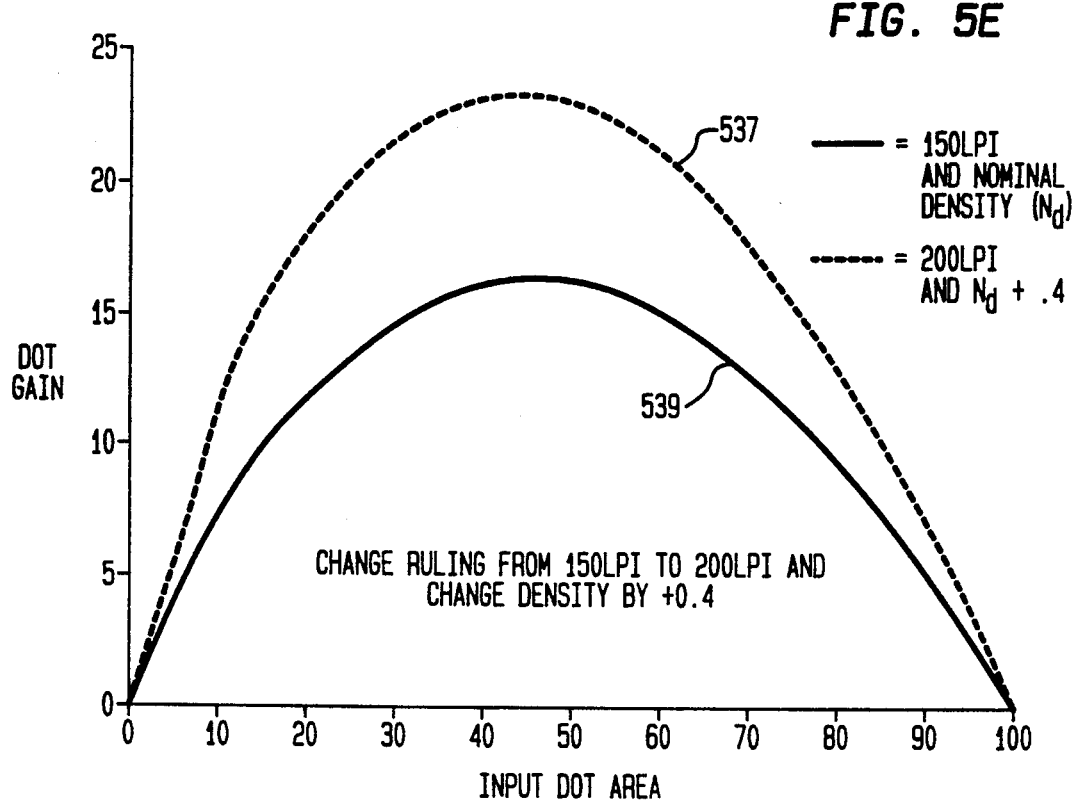
FIG. 5E graphically depicts intrinsic process dot gain that typically occurs for DDCP system 100 but operating at two different conditions: 150 1 pi screen ruling at density Nd, and at 200 1 pi screen ruling at density Nd+0.4.

FIG. 5E graphically depicts intrinsic process dot gain that typically occurs for the imaging chain in the DDCP system but with two simultaneous changes being made in its operating condition. Specifically, solid curve 539 depicts the intrinsic process dot gain that occurs at a 150 1 pi screen ruling and at nominal solid area density $N_d$. Dashed curve 537 depicts the intrinsic process dot gain that occurs at a 200 1 pi screen ruling and at solid area density $N_d+0.4$. As evident, the change in intrinsic process dot gain reaches a maximum of approximately 6–7% for approximately 45% input dot area and is predominantly attributable to density-induced intrinsic process dot gain variations.

Figure 5F:
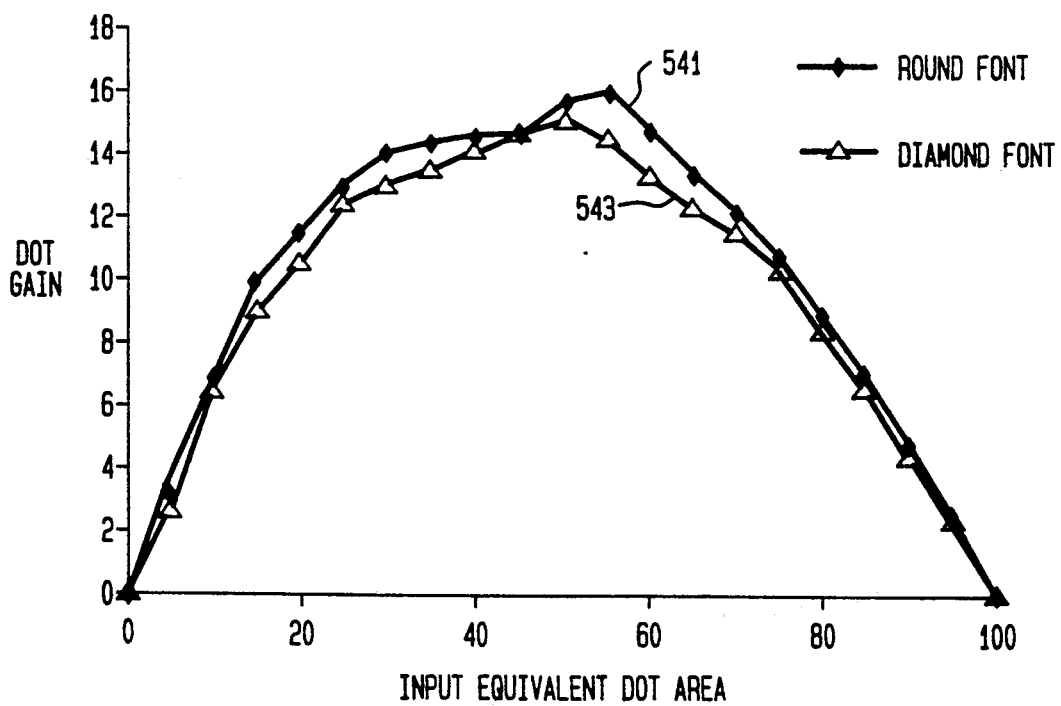
FIG. 5F graphically depicts intrinsic process dot gain differences, produced by DDCP system 100, attributable to use of a round font and a diamond font for a common density and screen ruling.

As to changes in intrinsic process dot gain attributable to changes in font shape, FIG. 5F graphically depicts typical intrinsic process dot gain of the DDCP imaging chain for a proof image produced with two different fonts but with a common screen ruling and a common solid area density. Specifically, curves 541 and 543 depict the intrinsic process dot gain for round and diamond shaped fonts, respectively. As shown, a maximum difference in intrinsic process dot gain of approximately 2% occurs due to this font change. Similarly shaped curves to those shown in FIGS. 5A–5F occur for yellow, magenta and black.

Thus, it is quite clear from considering "Aim" curves 400 shown in FIG. 4 and all the intrinsic process curves shown in FIGS. 5A–5F that the DDCP imaging chain formed of RIP 200 (particularly screening process 460 occurring therein and described below) and marking engine 130 will not by themselves, due to their intrinsic process dot gain characteristic at any desired operating condition, produce the desired "Aim" dot gain at that particular condition.

Now, with the above in mind, the remaining discussion will specifically address the implementation of a preferred embodiment of my invention within operator PC 120 (located within DDCP system 100 shown in FIGS. 2A and 2B) and particularly the software executing thereon for producing a proof image, through RIP 200 and marking engine 130, that will accurately exhibit a desired "Aim" tone reproduction curve at a desired operating condition of the DDCP imaging chain.

Figure 6A:
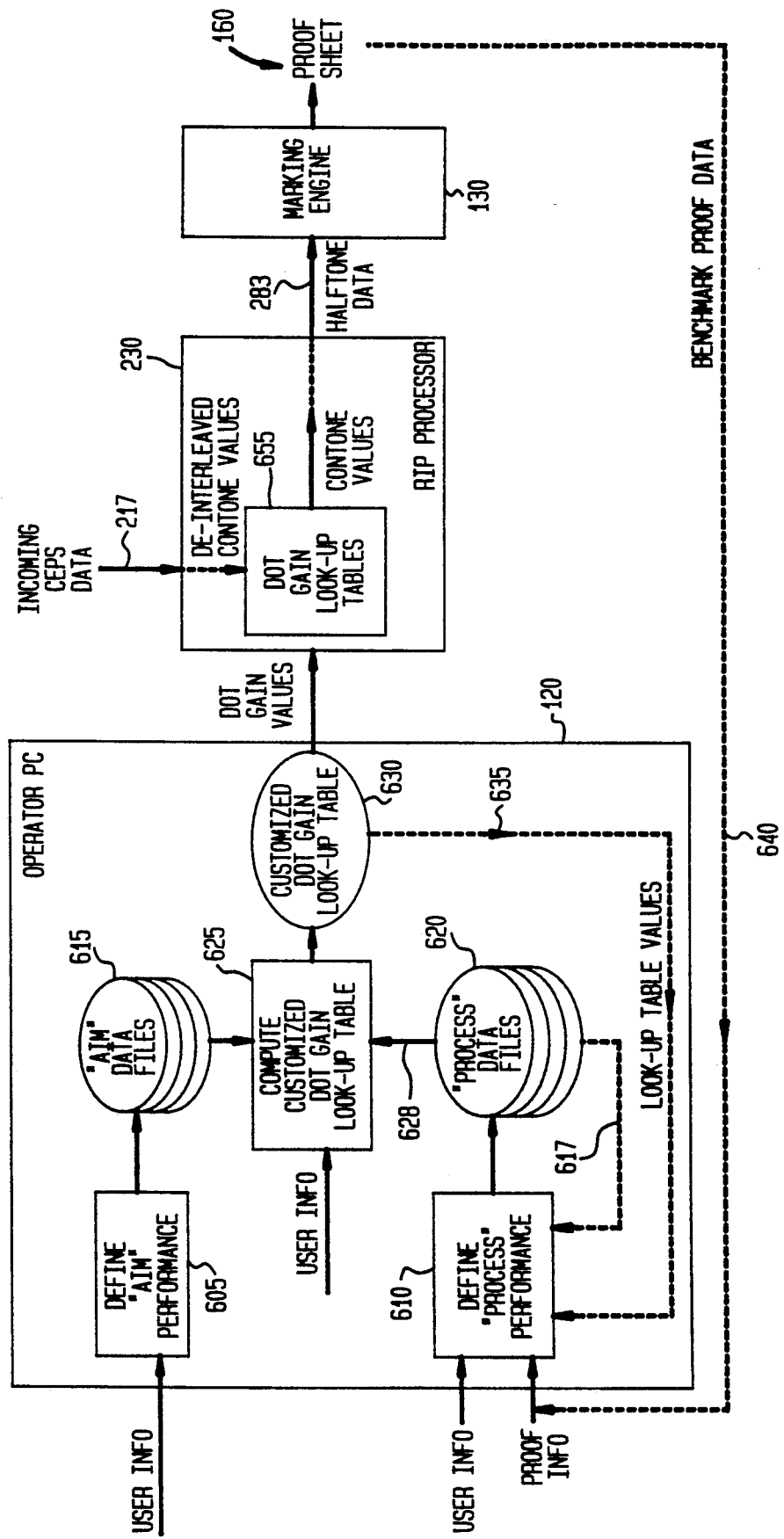
FIG. 6A depicts a high level block diagram of a process which is performed within operator PC (personal computer) 120 shown in FIGS. 2A and 2B for generating a customized dot gain look-up table in accordance with the teachings of my present invention.

Specifically, FIG. 6A depicts a high level block diagram of the present inventive process which is performed within operator PC 120 for generating a customized dot gain look-up table. To utilize this process, an "Aim" dot gain curve is first defined, as represented by block 605. The "Aim" curve (typified by the dot gain curves shown in FIG. 4 and discussed above) specifies the tone reproduction quality (here in terms of dot in vs. dot out) inherent in a desired printing process and hence that tone reproduction which a user wants accurately exhibited in a proof image. As to the "Aim" curve itself, desired output dot area or density values are obtained for at least three user defined input dot areas. Illustratively, these input dot areas may be 25%, 50% and 75% dot area. If density values are provided by a user, these values are then converted, through a well known equation as discussed in detail below (specifically equation (6)), into equivalent dot areas. The desired output values can originate through illustratively user input—as shown, optical densitometric measurements of, for example, a press sheet, or by reading and/or modifying an existing data file of "Aim" values. For ease of reference and to distinguish these values from other dot area values, the discrete specified dot area values, whether "Aim" or "Benchmark", that are supplied to the processes indicated by blocks 605 and 610 (for convenience, the latter is also referred to herein as process 610) are hereinafter referred to as "entry point data".

Once the "Aim" entry point data have been specified by whatever method is used, these values are then interpolated within block 605, shown in FIG. 6A, to determine, at a 12-bit resolution (i.e. the values "0" to "4095"), output "Aim" dot area values that exist for "all possible" input dot area values, which for 8-bit contone values correspond to 256 successive incremental input dot areas that span the complete range of 0–100% input dot area. To provide accurate interpolation, coefficients of illustratively a monotone piecewise cubic function that spans each pair of adjacent "Aim" setpoints are initially determined. This assures that all the "Aim" setpoints are smoothly joined by the monotonic interpolant functions. Once the coefficients have bee determined for every pair of adjacent "Aim" entry points, the interpolant function associated with that pair is evaluated for each of the "all possible" input dot area values which lie on the end of or within the interval which spans that pair of setpoints. This results in a list of 256 12-bit interpolated "Aim" values. This list is then stored, within "Aim" data files 615, in a user specified data file along with appropriate "set-up" information which defines the specific operating condition under which the values in this "Aim" list are associated.

Figure 6B:
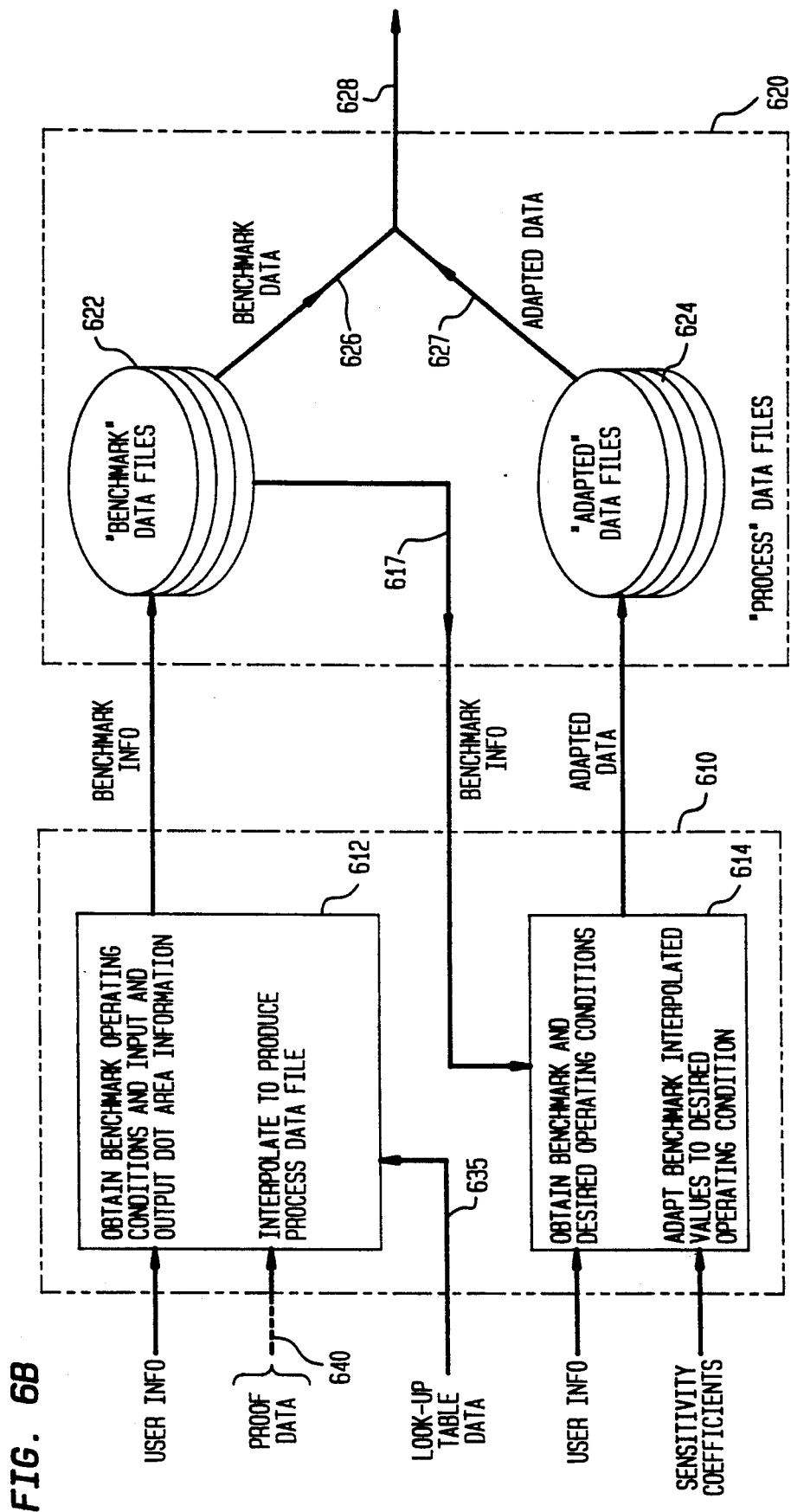
FIG. 6B depicts a high level block diagram of process 610, shown in FIG. 6A, for defining "Process" performance by establishing and adapting "Benchmark" and "Process" data files 620 values to a desired operating condition for the DDCP (RIP/marking engine) imaging chain in DDCP system 100.

In addition, in block 610, the expected performance of the DDCP imaging chain, at a specific operating condition under which a proof is to be generated, is determined. In my co-pending United States patent application, "A TECHNIQUE FOR USE IN CONJUNCTION WITH AN IMAGING SYSTEM FOR PROVIDING ACCURATE TONE REPRODUCTION IN AN OUTPUT IMAGE" filed Oct. 25, 1991, U.S. patent application Ser. No. 07/782,940 which has been assigned to the present assignee hereof, so-called "Benchmark" process performance is obtained by direct measurement and processing of output images. My current invention extends this technique by adapting such "Benchmark" process performance data for changes in operating position to obtain "Adapted" process performance data. The result of either benchmarking or benchmarking followed by subsequent adaptation in block 610, discussed in detail below in association with FIG. 6B, is a "Process" data file for use in block 625, to be discussed in detail below.

In block 610, when the user chooses to define a "Benchmark" data file, the user instructs the RIP/-marking engine imaging chain (through a path not shown) to write a test pattern with generally a null dot gain curve at the "Benchmark" operating position. Process output data are then obtained, as represented by dashed line 640, and supplied to process 610 through manual densitometric measurement of the proof image followed by keyboard entry or via direct entry to Operator PC 120 from densitometer 124. In the case when the test pattern is not written with a null dot gain curve, the customized dot gain table that is actually used within table 630 is specified by the user and provided to block 610, via path 635, to specify the actual input values used by the RIP marking engine. The entry point data for the benchmark condition are then monotonically interpolated, in the same fashion as the "Aim" entry point data, to obtain a list of output "Process" dot gain values at 12-bit resolution. The benchmark operating condition, entry point data and interpolated benchmark values are then saved in a user specified file in "Process" data files 620. In the discussion that follows, the interpolated values comprise 256 output dot gain values for all possible input values specified at 8-bit resolution, namely input values ranging from "0" to "255" representing incremental dot area values that cover the range from 0–100% dot area. If input values to the RIP/marking engine can be specified at a higher resolution, for example 10-bit (values from "0" to "1023"), a longer list representing all possible input values could be explicitly constructed or a shorter list could be generated for subsequent modification or interpolation.

In order to avoid any performance differences resulting from system transport to and installation at a user site, all "Benchmark" proof images are produced and measured at the user site once the DDCP system is fully operational rather than being produced during system manufacture. Such differences may result from, e.g., slight mis-alignment occurring among the writing lasers as well as other transport-related physical effects that would vary writing performance.

While any number of a wide variety of different interpolant functions, including linear, could be used in lieu of a piecewise cubic function for the "Aim" and "Benchmark" entry point data, I have found that the smooth curvature provided by a cubic function tends to accurately predict the performance of the RIP/marking engine imaging chain between adjacent entry points. I have also found that the interpolant must be monotonic, a property which certain piecewise cubic functions can provide, in order to permit the "Process" curve to be accurately inverted. As will be seen below, the values, based upon the interpolated "Aim" and "Process" values, that form the customized dot gain look-up table reflect the inversion of the expected intrinsic process tone reproduction curve (specifically, either "Benchmark" or "Adapted", depending upon which is used) of the DDCP imaging chain.

In block 610, when the user chooses to define "Process" performance by adapting data in an existing "Benchmark" data file, the user specifies the file in "Process" data files 620 to be adapted and the desired operating conditions for which the process output data in this file is to be adapted. The specified "Benchmark" data, including the operating conditions and the interpolated values, is then provided, via path 617, to block 610. The interpolated "Benchmark" values are adapted, based on illustratively a bi-linear model of the DDCP imaging chain and pre-defined sensitivity coefficients to yield "Adapted" dot gain values to define "Process" performance at the desired operating condition. In particular, the response of the DDCP imaging chain to changes in screen ruling and solid area density can be very accurately modeled by a truncated Taylor series expansion about any nominal operating position which takes the form of bi-linear equation (2) as follows:

$$DA = DA(D_o, LPI_o, \text{Font, Color, Machine, Dot\_in}) + \qquad (2)$$

$$\frac{\partial DA}{\partial D} \cdot \Delta D + \frac{\partial DA}{\partial f} \cdot \Delta f + \frac{\partial^2 DA}{\partial D \partial f} \cdot \Delta D \Delta f$$

where:
DA is dot area;
$D_o$ is a nominal output density;
$LPI_o$ is a nominal screen ruling;
Font is the particular font being written;

Color is the particular color being written;

Machine is the particular DDCP system being used to write a proof;

f is a variable representing screen ruling frequency;

$\Delta D$ and $\Delta f$ are the changes in solid area density and screen ruling, respectively, between the nominal and another operating condition;

$\partial DA/\partial D$ is a solid area density sensitivity term;

$\partial DA/\partial f$ is a ruling sensitivity term; and $\partial^2 Da/\partial D \partial f$ is a sensitivity term accounting for effects on dot area based on interactions between the ruling and density changes.

Though not explicitly stated, each term in this equation is also a function of input dot area and each sensitivity term is also a function of the nominal operating position at which the Taylor expansion is based. Through empirical studies of actual measured proof data, I have determined that the model in equation (2) can be significantly simplified, while still retaining a +1% prediction accuracy, by replacing the sensitivity terms with coefficients (Standard_density_sensitivity, Standard_ruling_sensitivity and Standard_interaction) wherein these sensitivities are based at a standard operating position (e.g., density setting "0" and screen ruling 150 1 pi), all as set forth in equation (3) below:

$$\begin{aligned}DA = &\, DA(D_s, LPI_s, \text{Font, Color, Machine, Dot\_in}) + \\ &\text{Standard\_density\_sensitivity}*(D - D_s) + \\ &\text{Standard\_ruling\_sensitivity}*(LPI - LPI_s) + \\ &\text{Standard\_interaction}*(D - D_s)*(LPI - LPI_s)\end{aligned} \quad (3)$$

where:

$(D-D_s)$ and $(LPI-LPI_s)$ are the change in density and ruling, respectively, between a particular operating position and the standard operating position.

By evaluating equation (3) at the desired operating position and the benchmark operating position and then forming the difference and solving for the adapted area, one obtains equation (4) below:

$$\begin{aligned}\text{adapted\_area} = &\, \text{Benchmark\_area} + \\ &\text{Standard\_density\_sensitivity}*\Delta\text{density} + \\ &\text{Standard\_ruling\_sensitivity}*\Delta\text{ruling} + \\ &\text{Standard\_interaction}*\Delta\text{interaction}\end{aligned} \quad (4)$$

where:

$\Delta$density = density_setting_adapted − density _setting_Benchmark $\Delta$delta_ruling = ruling_adapted − ruling_Benchmark $\Delta$interaction = density_setting_adapted*(ruling_adapted − 150) − density_setting_Benchmark*(ruling_Benchmark − 150).

The terms "density_setting_adapted" and "density_setting_Benchmark" represent the densities at the desired and "Benchmark" operating conditions, respectively. Likewise, the terms "ruling_adapted" and "ruling_Benchmark represent the screen rulings at the desired and Benchmark operating conditions, respectively. Furthermore, by explicitly re-computing the density sensitivity at the "Benchmark" screen ruling and the ruling sensitivity at the desired density, the interaction term in equation (4) can be eliminated resulting in modeling equation (5) as follows:

$$\begin{aligned}\text{adapted\_area} = &\, \text{Benchmark\_area} + \\ &\text{density\_sensitivity}*\Delta\text{density} + \text{ruling\_sensitivity}*\Delta\text{ruling}\end{aligned} \quad (5)$$

where:

density_sensitivity = Standard_density_sensitivity + (ruling_Benchmark − 150)*Standard_interaction; and ruling_sensitivity = Standard_ruling_sensitivity + density_setting_adapted*Standard_interaction Inasmuch as intrinsic process tone reproduction differences due to variations attributable to changes in color (C, Y, M, K) do not apparently lend themselves to simple linear modeling, i.e. inclusion into equations (3-5) above, separate sets of sensitivity coefficients are determined for each different color (C, Y, M, K) that will be used at each "Benchmark" condition as well as for each permissible variation from a "Benchmark" condition. In particular, in view of the complex variation in the sensitivity coefficients to changes in input dot area, a separate corresponding sensitivity coefficient is used for each possible one of the 256 different input dot areas ranging from 0–100% to form, at any given "Benchmark" condition, a set of 256 such "standard" coefficients. Empirical studies have shown, for the particular DDCP imaging chain used in the preferred embodiment, that the standard sensitivity coefficients need not be varied with font changes to obtain sufficient accuracy. All sets of standard sensitivity tables, comprising density, ruling and interaction sensitivities for each color, can be loaded in each machine during system manufacture, preferably in the form of a disk file for subsequent loading onto the operator PC for access thereby. In this manner, changes to any or all of these coefficients, for any Benchmark, can be made by simply editing and/or replacing the file. Though not preferred, these coefficient values can also be hardcoded into compute Adaptation Routine 1900 (see FIG. 19A and 19B discussed in detail below).

Figure 20A:
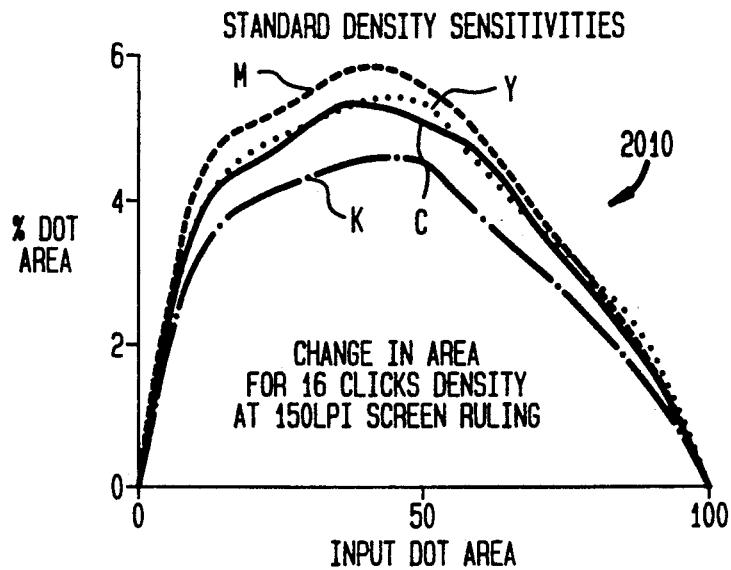
FIG. 20A graphically depicts empirically determined density sensitivity coefficient values, as a function of input dot size and color, at a 150 l pi screen ruling for a half scale density increase ("16 clicks")
Figure 20B:
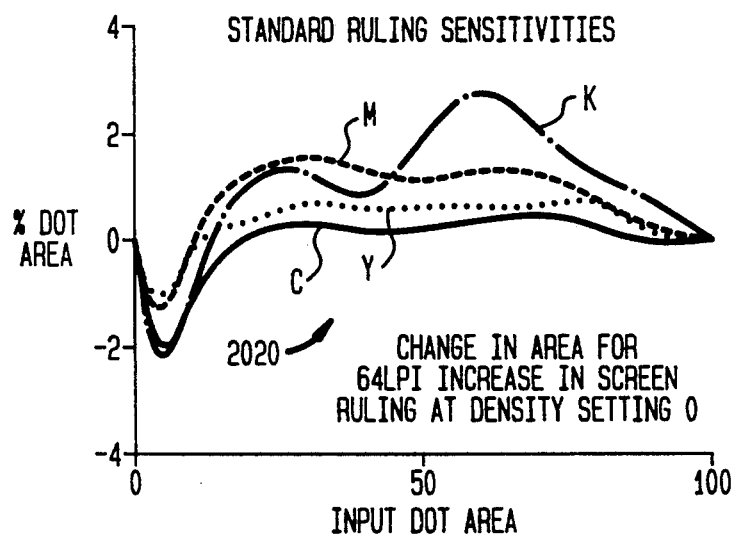
FIG. 20B graphically depicts empirically determined screen ruling sensitivity coefficient values, as a function of input dot size and color, at density setting "0" for a 64 l pi increase in screen ruling.
Figure 20C:
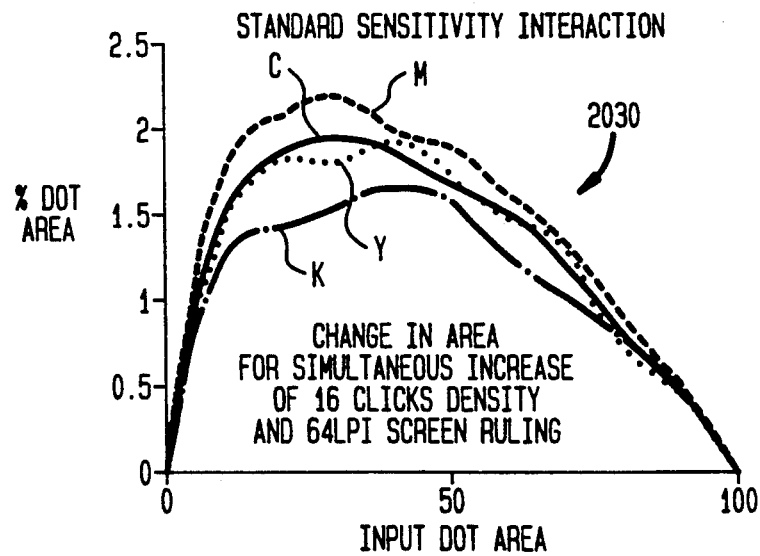
FIG. 20C graphically depicts empirically determined interaction sensitivity coefficient values, as a function of input dot size and color, for a simultaneous increase of 16 clicks in density and 64 l pi increase in screen ruling from an operating position of density setting "0" and 150 l pi screen ruling.

To aid understanding, FIGS. 20A–20C graphically depict coefficient sets for a exemplary "Benchmark" condition: standard web offset press (SWOP) density, i.e. a "0" density setting, and a 150 1 pi screen ruling.

Specifically, FIG. 20A graphically depicts four sets (curves 2010) of coefficient values (each for a separate color: C, Y, M and K), as a function of input dot size, at a screen ruling of 150 1 pi (the standard ruling) and for an increase in solid area density of "16 clicks" (equal to a variation of one half full scale; as measured in so-called "Status T" density units: +0.2 density units for Y or +0.4 density units for K, C or M) from the "Benchmark" condition. As can be seen, these coefficients, scaled in terms of % dot area, account for as much as a 6% variation in dot size for magenta (M) at approximately a 45% input dot. Similarly, FIG. 20B graphically depicts similar sets (curves 2020) of coefficient values, as a function of input dot size, at a density of "0" (the standard density setting) and for an increase from the standard operating position of 64 1 pi in screen ruling. As is readily apparent from FIGS. 20A and 20B, the sensitivity coefficient values, here also expressed in terms of % dot area, are smaller for a ruling change than those for a density change. The maximum ruling sensitivity coefficient value is approximately +2.5% for black (K) at an approximately 60% input dot area. Lastly, FIG. 20C graphically depicts four separate sets (curves 2030) of interaction sensitivity coefficient values, also as a function of input dot size, for a simultaneous increase, from the standard operating position, of 16 clicks (0.4 or 0.2) in solid area density and 64 1 pi in screen ruling. The maximum interaction sensitivity coefficient value is approximately 2.25% for magenta (M) at approximately a 30% input dot.

I have also empirically determined that the intrinsic process tone reproduction sensitivities exhibit essentially little, and certainly negligible, variation between one sublimation dye transfer DDCP system and another such system, of the same exact type, or between one donor sheet and another, of the exact same type. Hence, this permits the sensitivity coefficient values to be determined during system manufacture and subsequently used on-site in any particular such system with essentially no adverse affect. Moreover, to simplify the model, appropriate sensitivity terms for machine and donor variations have been omitted from equations (3–5) above with essentially no loss in overall accuracy.

Based upon the desired operating condition and the operating condition of the specified "Benchmark file, process 610 accesses the proper sensitivity coefficient set for the color and the present halftoning pass to be within and the "Benchmark" values stored in the specified file. Thereafter, process 61? computes equation (5), for the density and ruling changes between the desired and benchmark conditions, to appropriately adapt each of these "Benchmark" values into "Adapted" values. The resulting "Adapted" values collectively define the "Process" tone reproduction intrinsic performance that is expected to occur at the desired operating position (for a specified color and font). The desired operating condition information and "Adapted" values are then stored as an "Adapted" file in "Process" files 620.

Figure 6C:
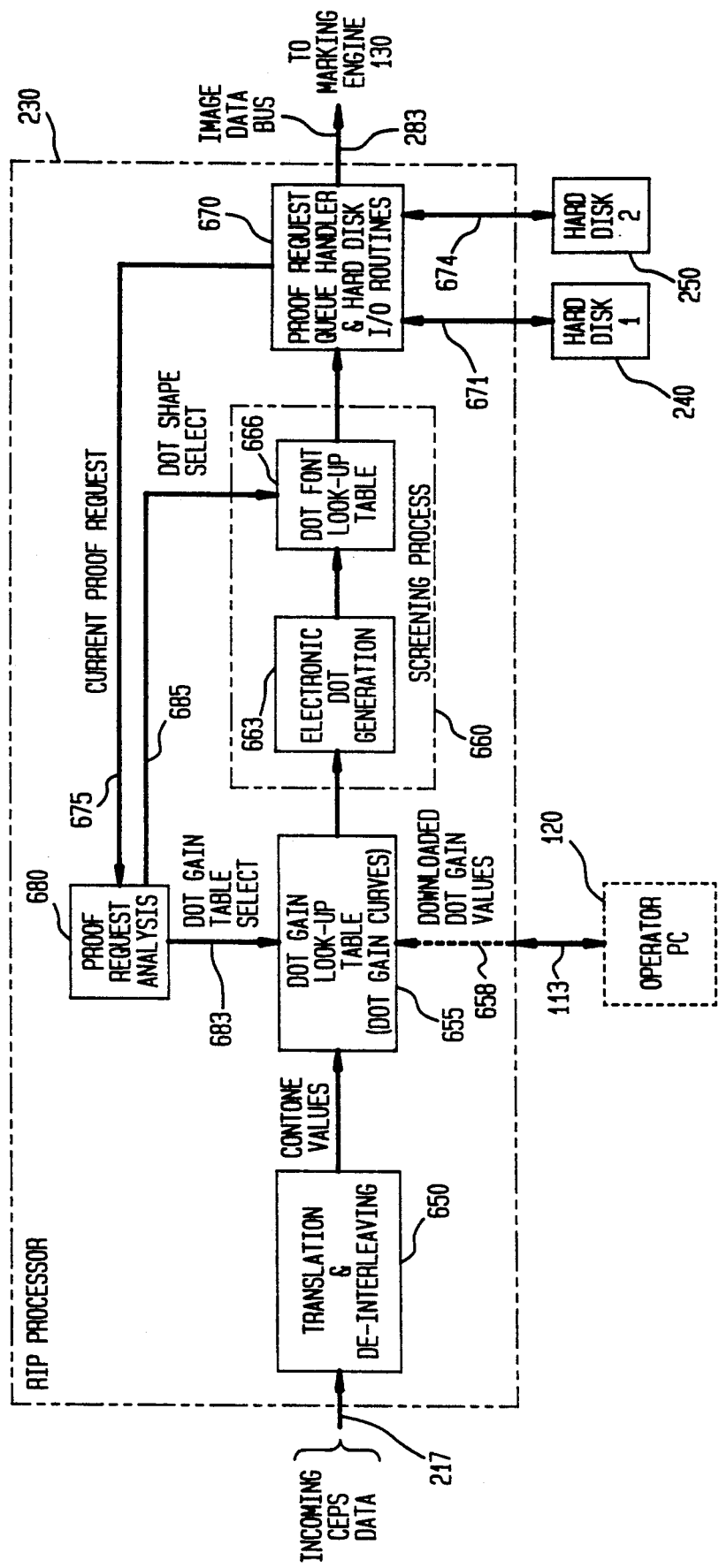
FIG. 6C depicts a simplified high level block diagram of a process through which CEPS (color electronic pre-press system) contone separation data is processed within RIP processor 230, shown in FIGS. 2A and 2B, to yield halftone image data for marking engine 130 and specifically including the processing occurring within this processor for modifying incoming contone values to achieve an "Aim" tone reproduction characteristic in a proof image.

Thereafter, upon user instruction and as symbolized by block 625, a customized dot gain look-up table is constructed from the lists of interpolated "Aim" and "Process" values, the latter being supplied via path 628, for a common specific operating condition. In particular, for each value in the interpolated "Aim" list, the index of the numerically closest value in the "Process" list is first determined. This index value specifies the associated input code value, scaled in terms of, e.g. the contone values "0" to "255" for 0–100% dot area, that the DDCP imaging chain requires to produce a dot having a density that is the closest match to the density specified by that particular "Aim" value. The code value specified for that interpolated "Process" index is then stored in a look-up table at the location defined by the index of the "Aim" value. The result is customized dot gain look-up table 630 of index code values, each of which specifies a particular output halftone pattern within screening process 660 (shown in FIG. 6C and discussed below) that is to be subsequently printed by the marking engine. The code values stored in the look-up table will reflect the desired ton reproduction modified by the inverse of the native (intrinsic) tone reproduction characteristic of the RIP/marking engine imaging chain that is expected to occur at the specific desired operating condition. Thereafter, the code values that form table 630, shown in FIG. 6A, are downloaded into RIP processor 230 to form a specific table within dot gain look-up tables 655. A separate individual dot gain table will be generated for each different color used to form a common proof image; all these tables will be collectively downloaded into and reside within tables 655 for any single proof image. To generate a proof image at that condition and exhibiting the desired "Aim" curve, all the incoming contone values, for a given color, that are to be screened and printed for a corresponding separation are routed through a corresponding table for that color within look-up tables 655 to yield resulting code values which, through screening process 660 shown in FIG. 6C, are then appropriately converted into halftone bits which, in turn, are eventually applied to marking engine 130 and printed thereby. The incoming contone values, after modification by the look-up tables, will all have a component derived from the inverse of the native tone reproduction characteristic of the RIP/marking engine imaging chain and thereby cause that chain to produce a proof image that exhibits the desired "Aim" tone reproduction without substantially any corruption, if at all, from the native tone reproduction characteristic of this DDCP imaging chain. By merely changing the contents of look-up tables 655 by processing other lists of corresponding interpolated "Process" and "Aim" data, for a common desired operating condition, and constructing a table therefrom, the RIP/marking engine imaging chain can produce a proof image that, within physical limits occurring at that operating condition, will accurately exhibit the desired "Aim" curve and hence depict the desired tone reproduction characteristic associated therewith. As symbolized by dashed lines within RIP processor 230, this processor appropriately processes, as shown in FIG. 6C and described below in conjunction therewith, both the incoming CEPSs data to yield de-interleaved contone values that are applied, as input, to look-up tables 655 and the resulting code values produced thereby to yield corresponding halftone bit patterns therefor FIG. 6B depicts a high level block diagram of process 610 and "Process" data files 620, shown in FIG. 6A, for obtaining "Benchmark" Process setpoint values and, when requested, adapting these setpoint values to a desired operating condition.

Specifically, when the user chooses to define "Process" performance within process 610 by definition of a "Benchmark" data file, benchmark operating conditions, proof output data (via path 640) and, optionally, if a null dot gain table was not used to generate the proof data, associated lookup table proof input data (via path 635) are all provided to block 612. Block 612 then interpolates the entry point data and evaluates the interpolant at illustratively 256 input values to obtain a list of 12-bit output dot area values that characterize the process intrinsic tone reproduction behavior at the benchmark operating position. The benchmark information, comprising operating position, entry point data and interpolated values, is then saved in a user specified file in "Benchmark" files 622 contained in "Process" data files 620 for subsequent use. The "Benchmark" files can be used directly and accessed, via paths 628 and 626, for use in dot gain customization (block 625) discussed above. Alternatively, "Benchmark" files can be accessed, via path 617, for use in block 614.

In block 610, when the user chooses to define "Process" performance by adapting data in block 614 in an existing "Benchmark" data file, the user specifies the file among the "Benchmark" data files 622 contained within "Process" data files 620 to be adapted and the desired operating conditions for which the process output data in this file is to be adapted. The specified "Benchmark" data, including the operating conditions and the interpolated values, is then provided, via path 617, to block 610. The interpolated benchmark values are adapted, through equation (5) above using the density and ruling differences between the benchmark and the desired operating conditions and pre-defined sensitivity coefficients to yield "Adapted" values to define "Process" performance at the desired operating condition. The adapted information, comprising operating position and "Adapted" values, is then saved in a user specified file in "Adapted" data files 624 contained in "Process" data files 620 for subsequent use. "Adapted" files are accessed, via paths 627 and 628, for use in dot gain customization (block 625—see FIG. 6A) discussed above.

FIG. 6C depicts a simplified high level block diagram of the process through which contone separation data is processed within processor 230 shown in FIGS. 2A and 2B to yield halftone image data for marking engine 130 and specifically including the contone value processing that occurs within RIP processor 230 for use in generating a proof image through marking engine 130 that accurately depicts a desired "Aim" tone reproduction characteristic.

To facilitate the explanation of FIG. 6C, assume for the moment that a proof request has reached the top of either the "rush" or "normal" queue. As such, proof request queue handler and hard disk input/output (I/O) routines 670 will have sent, through lines not shown, an instruction to a particular CEPS specified in this request to obtain corresponding interleaved separation data therefor. In response to this instruction and through an appropriate interface (any one of interfaces 212 shown in FIGS. 2A and 2B), the interleaved CEPS data appears on line 217 shown in FIG. 6C. Within RIP processor 230, this data is first translated and de-interleaved into different contone separation files by translation and de-interleaving process 650. In addition, the current proof request will have been applied, as symbolized by line 675, to proof request analysis process 680. This process, inter alia, accesses each accompanying pass parameter field delineated in that request. RIP processor 230 then determines whether the corresponding dot gain table specified in each pass parameters field has been previously downloaded thereto. If any of these tables does not exist among the data files available to the processor, then RIP processor 230 obtains from the operator PC, via link 113, a dot gain table by a process detailed in the discussion of FIG. 9 below. Thereafter, once all the necessary tables have been confirmed as existing within this processor or downloaded thereto, process 680 selects, as symbolized by line 683, the particular dot gain look-up table from those residing within tables 655 for use in processing the incoming contone values provided by process 650 for a corresponding contone separation. Accordingly, each contone value in that separation is then applied as input to this particular look-up table within tables 655 in order to impart the necessary amount of dot gain (either an increase or a decrease) to that value so as to produce a corresponding "Aim" value by marking engine 130. Each resulting code value produced by tables 655 is then applied to screening process 660 which converts this code value into an appropriate bit-mapped halftone dot pattern therefor. Process 660 can be simplistically viewed as containing electronic dot generation process 663, which generates appropriate bit-mapped values, followed by dot font look-up table 666 which, based upon these values, supplies a particularly sized halftone dot pattern in a selected dot font. The particular font to use (e.g. diamond, elliptical, square, round, gravure or composed) is selected by proof request analysis process 680 based upon the value of the byte contained within "Dot Font" field 335 (see FIG. 3A) contained in the current proof request. The resulting halftone bit-mapped image data is then applied, as shown in FIG. 6C, to proof request queue handler and hard disk I/O routines 670 for storage on that one of two hard disks 240 or 250 which is currently writing information for the current proof request. As noted above, the other hard disk is reading bit-mapped image data through process 670 for application, via image data bus 283, to marking engine 130 for printing. This same processing is repeated in seriatim to yield all the bit-mapped halftone dot patterns for the current proof request. A so-called recipe color can be formed through dot-on-dot printing of primary colored halftone dots of appropriate size. To implement recipe color generation in DDCP system 100, an additional set of tables of appropriate tone reproduction values would be situated between process 650 and tables 655 to generate an appropriate amount of dot area modulation for each overlaid primary color in a composite halftone dot. For further details regarding such an implementation, the reader is referred to co-pending United States patent application entitled "A Technique for Generating Additional Colors in a Halftone Color Image Through Use of Overlaid Primary Colored Halftone Dots of Varying Size" from applicants R. V. Barry et al, filed Sep. 18, 1991; U.S. patent application Ser. No. 07/761,597, which is also assigned to the present assignee hereof and which is incorporated by reference herein.

FIGS. 7A, 7B, 7C, 8 and 9 depict my inventive process split into five high level separately executable processes 700, 750, 770, 800 and 900, for execution within Operator PC 120 (shown in FIGS. 2A and 2B) by associated routines, as shown in FIGS. 10-12B and 14-19B and described in detail below, for implementation using a menu based user interface.

Figure 7A:
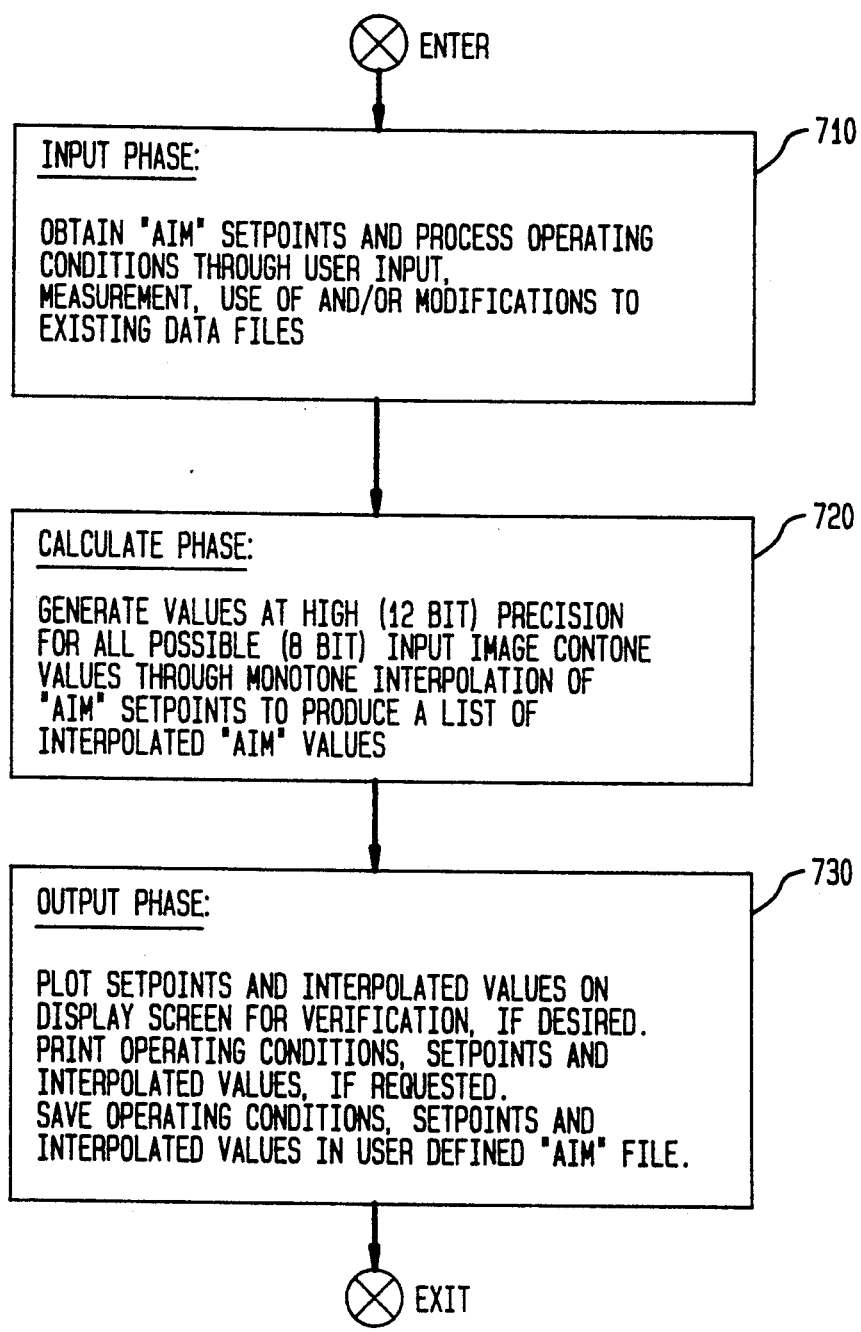
FIG. 7A depicts a high level flowchart of "Aim" Data Manipulation process 700.

Specifically, FIG. 7A depicts a high level flowchart of process 700 for manipulating "Aim" setpoint data. Upon entry into this process, block 710 is performed to obtain "Aim" entry point data at a specific operating condition for the RIP/marking engine imaging chain. This data, as noted above, is illustratively obtained through user input, measurement or through reading and/or modifying an existing file of data. Once the "Aim" entry point data has been obtained, block 720 is performed to generate, through piecewise cubic interpolation, a corresponding list of 256 12-bit interpolated "Aim" values. After this list has been generated, block 730 is performed to: plot the resulting list of interpolated "Aim" values, if desired, on a display screen for user verification; to print this list, if desired; and then save the interpolated list along with associated "set-up" information and entry point data in a user defined file. Once this file is saved, process 700 terminates.

Specifically, FIG. 7B depicts a high level flowchart of process 750 for manipulating "Benchmark" entry point data. Upon entry to this process, block 752 is performed to obtain "Benchmark" process operating conditions, input data and output data associated with a proof produced under these operating conditions. This data, as noted above is illustratively obtained through user input, measurement or through reading and/or modifying one or more existing files of data. Once "Benchmark" entry point data has been obtained, block 754 is performed to generate, through piecewise cubic monotone interpolation, a corresponding list of 256 interpolated "Benchmark" values at 12-bit resolution. After this list has been generated, block 756 is performed to: plot the entry point data and interpolated values for user verification, if desired; to print operating conditions, entry point data and interpolated values, if requested; and to save operating conditions, entry point data and interpolated values in user defined "Benchmark" file. Once this file is saved, process 750 terminates.

Specifically, FIG. 7C depicts a high level flowchart of process 770 for manipulating "Adaptation" data. Upon entry to this process, block 772 is performed to obtain "Benchmark" process operating conditions and interpolated values from a user specified data file and desired operating conditions for adaptation of the "Benchmark" values thereto. This information, as noted above is illustratively obtained through user input, measurement or through reading and/or modifying one or more existing files of data. Once the "Benchmark" process operating conditions and interpolated values from a user specified data file and desired operating conditions for adaptation have been obtained, block 774 is performed to modify these "Benchmark" values, through application of a model which uses operating condition differences and process sensitivities, to produce a corresponding list of 256 "Adapted" values at 12-bit resolution. After this list has been generated, block 776 is performed to: plot the "Benchmark" and "Adapted" values for user verification, if desired; to print operating conditions and "Adapted" values, if requested; and to save operating conditions and "Adapted" values in user defined "Adapted" file. Once this file is saved, process 770 terminates.

Figure 8:
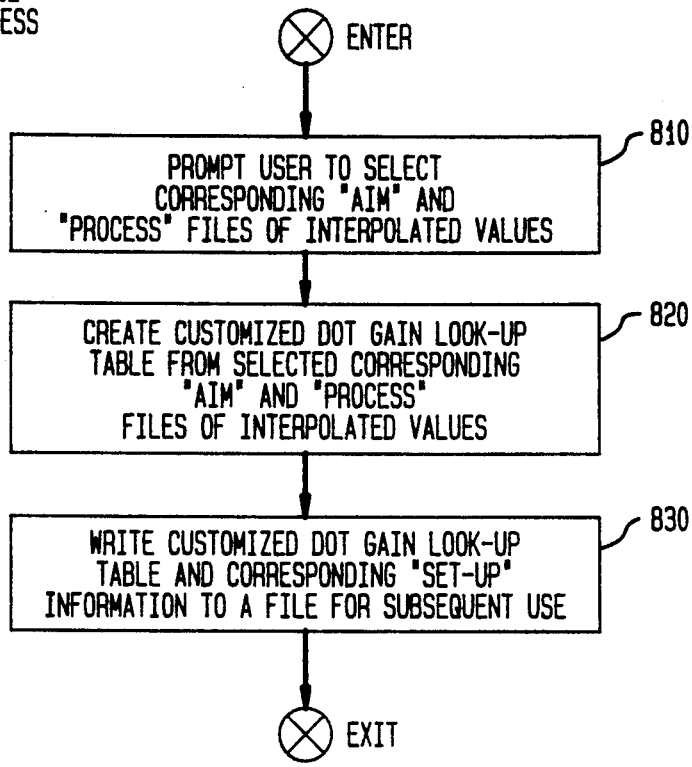
FIG. 8 depicts a high level flowchart of process 800 for creating a customized tone reproduction look-up table in accordance with my inventive teachings and based upon interpolated "Aim" values produced through process 700, shown in FIG. 7A, and either interpolated "Benchmark" values produced by process 750, shown in FIG. 7B, or "Adapted" values subsequently produced by process 770, shown in FIG. 7C.

FIG. 8 depicts a high level flowchart of process 800 for creating a customized dot gain look-up table based upon the interpolated "Aim" and "Process" values produced through processes 700 and 750 and/or 770, respectively, for a specific operating condition. Specifically, upon entry into process 800, block 810 is performed. This block prompts the user to select corresponding files of "Aim" and "Process" values that are currently stored within the Operator PC. Thereafter, block 820 is performed to create the customized dot gain look-up table, in the manner described above, based upon the values contained within the selected files. Once this table is fully created, block 830 is performed to write this table and its corresponding "set-up" information to a file for subsequent use and downloading to the RIP/marking engine. Once this file is written, process 800 terminates.

Figure 9:
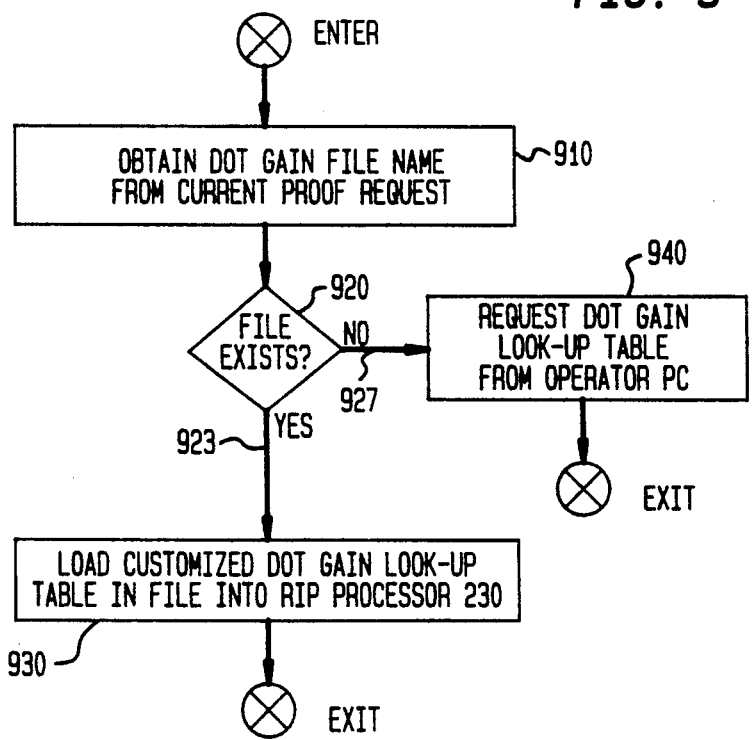
FIG. 9 depicts a flowchart of process 900 for loading a customized tone reproduction look-up table created by process 800 into RIP processor 230 in DDCP system 100 shown in FIGS. 2A and 2B.

FIG. 9 depicts a flowchart of process 900 for loading a customized dot gain look-up table, created by process 800, into RIP processor 230 in DDCP system 100 shown in FIGS. 2A and 2B. In particular, once a proof request has been entered into DDCP system 100, RIP 200, specifically processor 230 contained therein, in block 910 parses the proof request to obtain the names of the required dot gain table file names. As the reader will recall, a different tone reproduction table is typically employed for each separate halftoning pass. Hence, the filename of each such table is specified within the proof request as part of pass parameters field 380, shown in FIG. 3D and discussed in detail above, for that pass. Once the filenames are obtained, decision block 920 determines whether all these files exist among previously downloaded dot gain files on the RIP. If any such file does not exist, then execution proceeds, via NO path 927, to block 940. This latter block, when performed, issues a request to the operator, via the operator PC, to send the missing files. The proof request is then placed in the "hold" queue for later servicing so as to not hold up processing of any other proof requests. Upon placing the proof request in the "hold" queue, process 900 terminates. Alternatively, if all files exist, then decision block 920 routes execution, via path 923, to block 930. This latter block reads the files and loads the customized dot gain tables stored therein into RIP processor 230 for subsequent use during the corresponding halftoning pass. Once process 900 has fully executed to load all the tables specified in a proof request, process 900 terminates.

Figure 10:
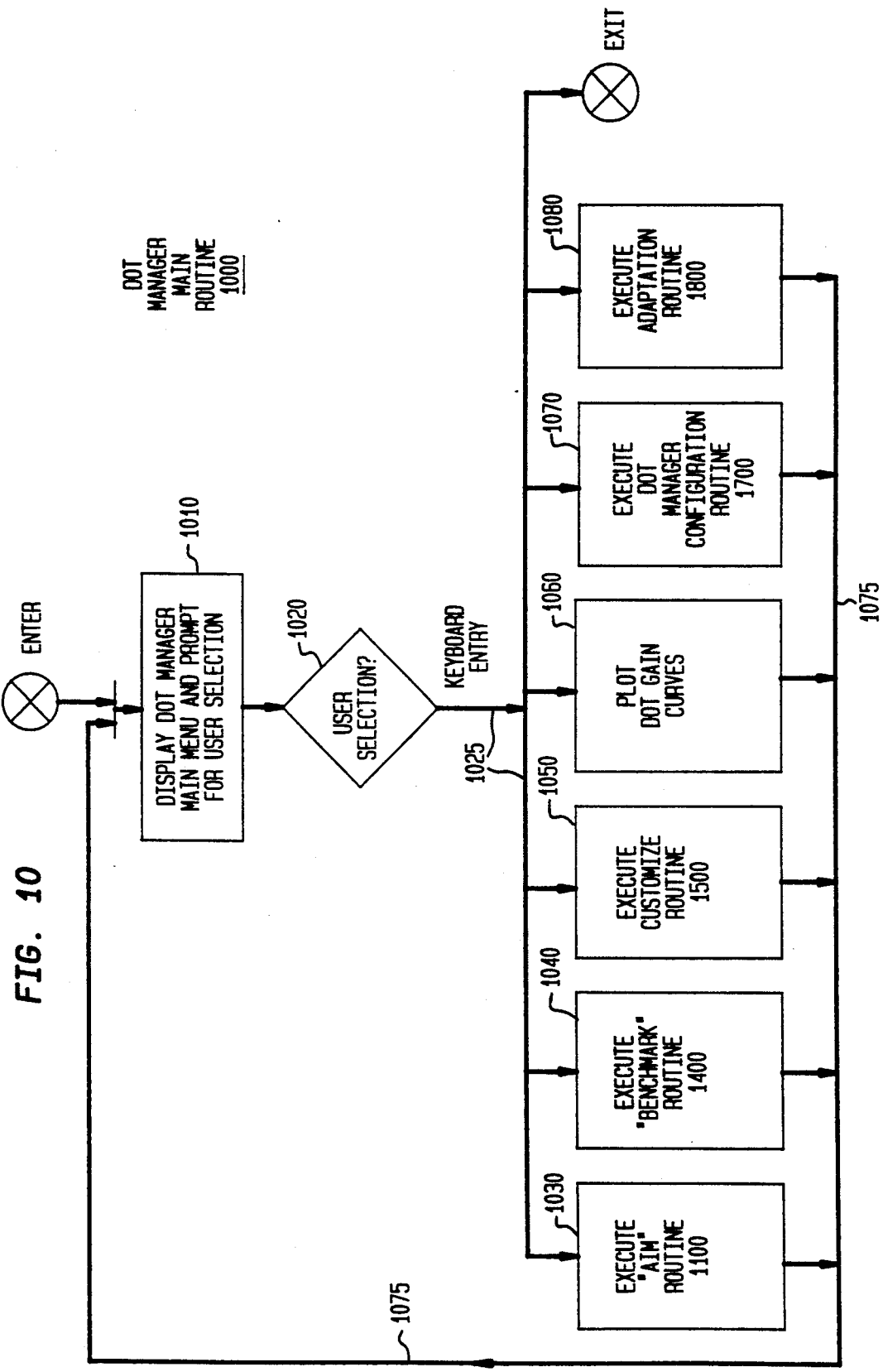
FIG. 10 depicts a flowchart of Dot Manager Main Routine 1000 for implementing a preferred embodiment of my present invention.

FIG. 10 depicts a flowchart of Dot Manager Main Routine 1000 for implementing a preferred embodiment of my present invention. This routine creates a high level menu on a display screen at the Operator PC and then initiates routines, based upon user selection, to perform desired portions of my inventive process.

Specifically, upon entry into routine 1000, execution proceeds to block 1010 which, when executed, displays a main menu on the display screen and prompts the user situated thereat to select an operation to be performed. Based upon a keyboard entry made by the user, decision block 1020 then routes execution to any of blocks 1030–1080 or causes execution to exit both from this routine and the entire interactive dot manager procedure and return to a higher level operating procedure. Once any of blocks 1030–1080 has fully executed, execution merely loops back, via path 1075, to block 1010 to prompt the user for the next operation, and so on.

When executed, block 1030 causes "Aim" Routine 1100 (shown in FIG. 11 and discussed in detail below) to: (a) obtain and process incoming "Aim" entry point data to generate a list of interpolated "Aim" values, (b) save a list of interpolated "Aim" values, (c) read a specified file of interpolated "Aim" values and/or (d) print a specified file of interpolated "Aim" values.

Block 1040, shown in FIG. 10, when executed, causes "Benchmark" Routine 1400 (shown in FIG. 14 and discussed in detail below) to: (a) process incoming "Benchmark" entry point data to generate a list of interpolated "Benchmark" values, (b) save a list of interpolated "Benchmark" values, (c) read a specified file of interpolated "Benchmark" values and/or (d) print a specified file of interpolated "Benchmark" values.

Block 1050, as shown in FIG. 10 and when executed, causes Customize Routine 1500 (shown in FIG. 15 and discussed in detail below) to: (a) produce a customized dot gain look-up table based upon lists of interpolated values contained in a pair of user specified "Aim" and "Process" files that contain matching "set-up" information, (b) save the contents of a customized dot gain look-up table (along with the corresponding "set-up" information) in a file specified by a user defined filename, (c) retrieve a customized dot gain look-up table from a user specified file, (d) display and/or edit a customized dot gain look-up table stored in a user specified file, or (e) print and/or (f) plot a customized dot gain look-up table.

Block 1060, when executed and as shown in FIG. 10, will plot all currently enabled dot gain curves with both entry points and interpolated points, on the display screen associated with the Operator PC.

Figure 17:
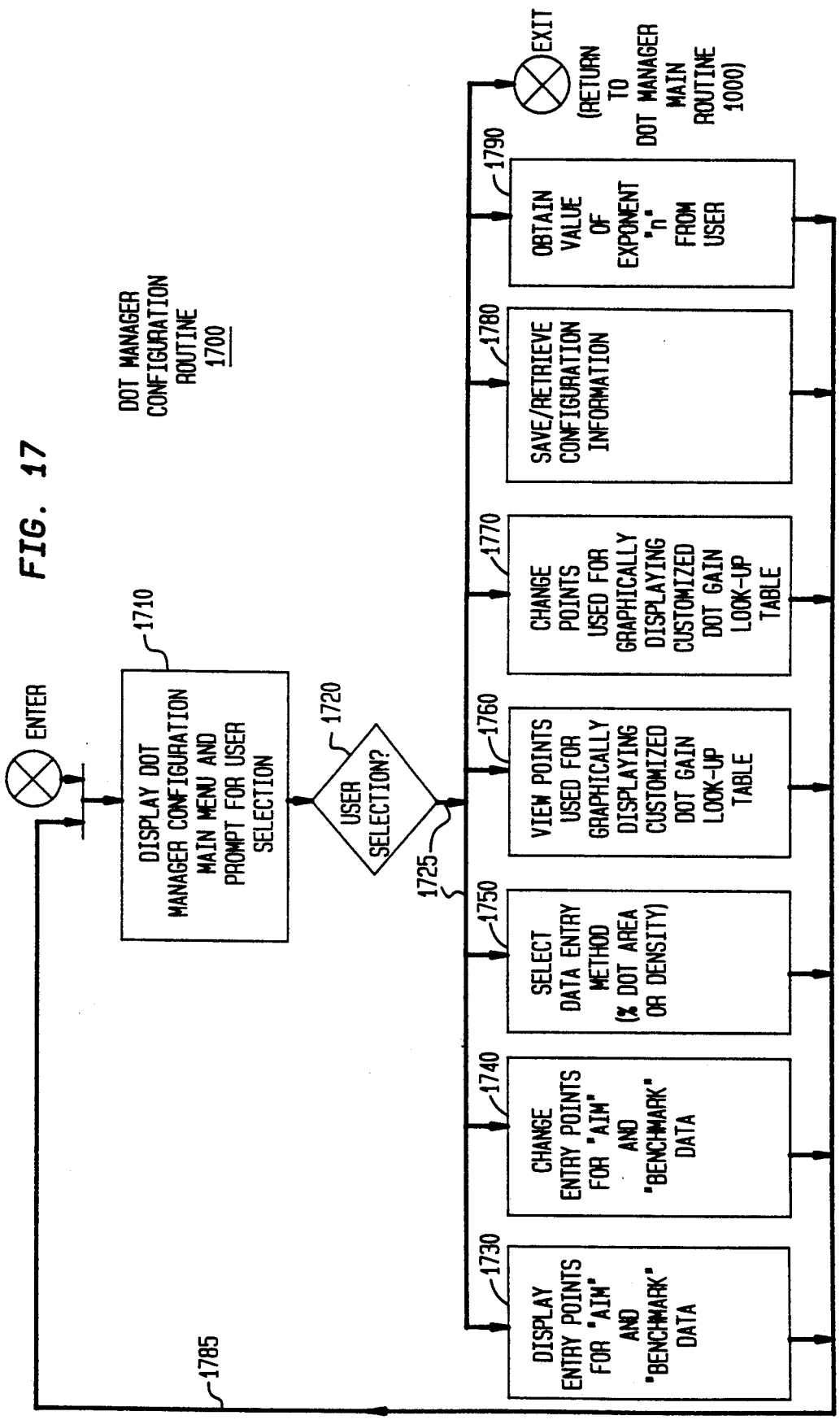
FIG. 17 depicts a flowchart of Dot Manager Configuration Routine 1700 that is executed within Dot Manager Main Routine 1000 shown in FIG. 10.

Block 1070, when executed and as shown in FIG. 17, causes Dot Manager Configuration Routine 1700 to allow the user to appropriately vary the configuration information by selecting the entry points, i.e. changing the input dot areas for entry of "Aim" and "Benchmark" data entry points, changing the "Aim" and "Benchmark" data entry points used for display purposes, selecting whether input data will be in the form of dot area or density and setting a value of exponent "n" in a density to dot area conversion equation (set forth below as equation (6)), viewing and/or changing points used to graphically display a customized dot gain look-up table, saving current configuration information for subsequent use, and retrieving previously saved configuration information and configuring the software accordingly.

Block 1080, when executed and as shown in FIG. 10, cause Adaptation Routine 1800 to: (a) obtain user information regarding the desired operating condition, (b) adaptively compute the "Adapted" values, (c) save the "Adapted" values in a user defined file, and/or (d) plot the "Benchmark" and "Adapted" dot gain curves on the display screen associated with the Operator PC.

Figure 11:
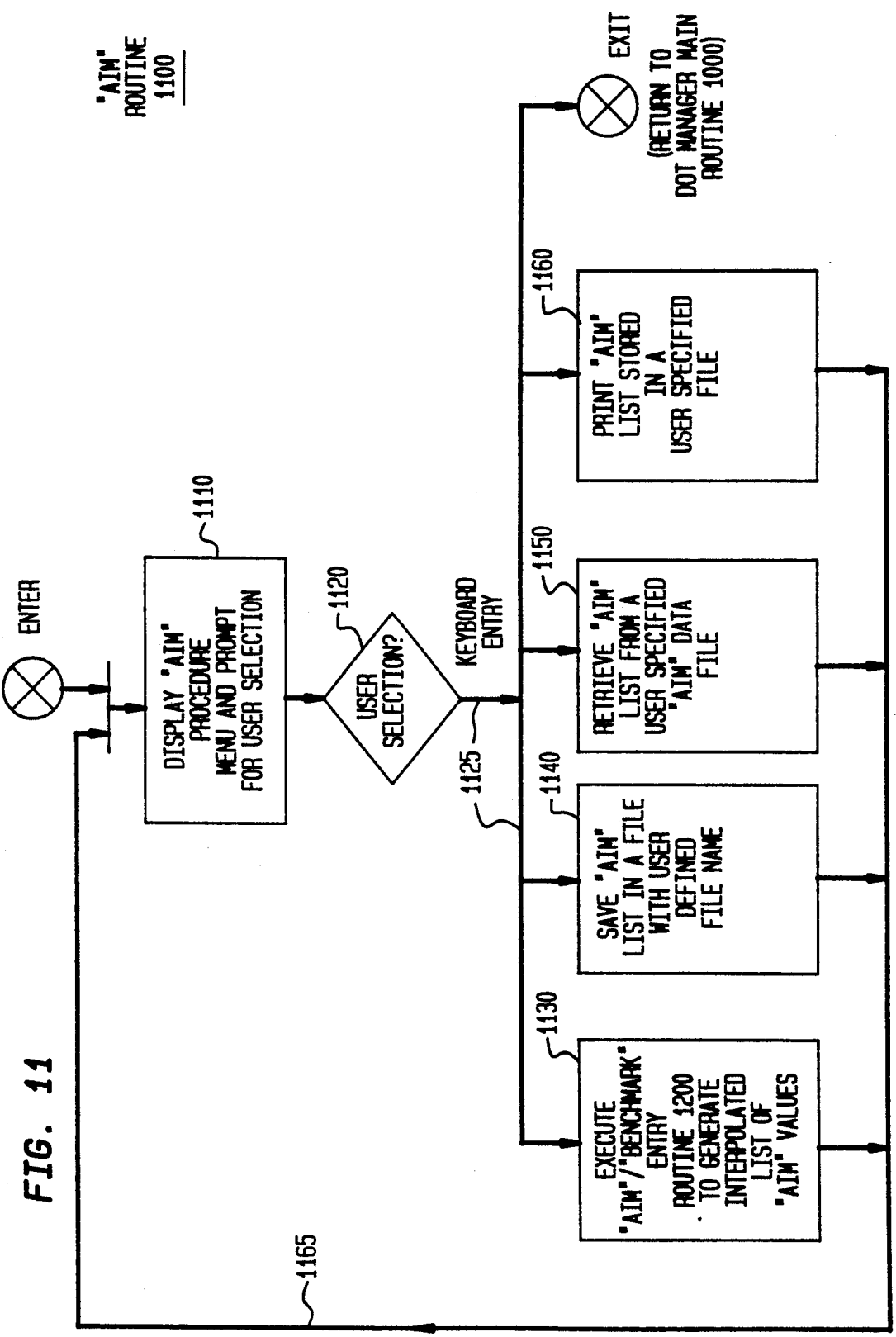
FIG. 11 depicts a flowchart of "Aim" Routine 1100 that is executed within Dot Manager Main Routine 1000 shown in FIG. 10.

FIG. 11 depicts a flowchart of "Aim" Routine 1100 that is executed within Dot Manager Main Routine 1000 shown in FIG. 10. As noted above, routine 1100 allows the user to instruct the Operator PC to perform various operations relating to "Aim" data.

Specifically, upon entry into routine 1100, execution proceeds to block 1110 which, when executed, displays an appropriate menu on the display screen and prompts the user situated thereat to select an operation to be performed on "Aim" data. Based upon a keyboard entry made by the user, decision block 1120 then routes execution, via paths 1125, to any of blocks 1130–1160 or causes execution to exit from this routine and return to Dot Manager Main Routine 1000. Once any of blocks 1130–1160 has fully executed, execution merely loops back to block 1110, via path 1165, to prompt the user to select the next "Aim" data operation to be performed, and so on.

When executed, block 1130 causes "Aim"/"Benchmark" Routine 1200 (shown in FIGS. 12A and 12B, and discussed in detail below) to obtain and process incoming "Aim" entry point data to generate a list of 256 interpolated "Aim" values.

When executed, block 1140 or block 1150, shown in FIG. 11, respectively saves a list of interpolated "Aim" values in a file with a user specified filename or retrieves a list stored in such a file. When executed, block 1160 prints a specified file of interpolated "Aim" values.

Figure 12A:
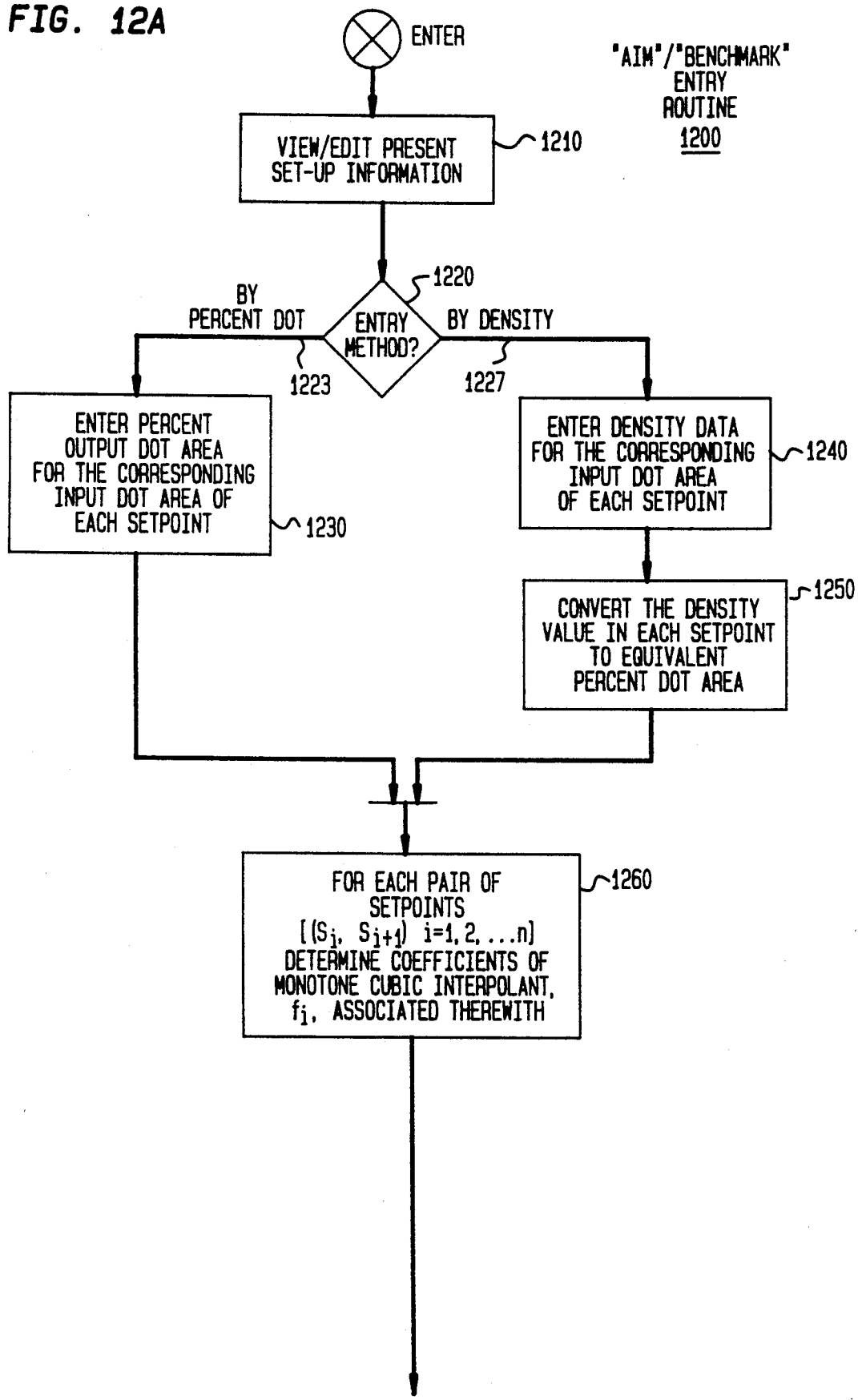
FIGS. 12A and 12B collectively depict a flowchart of "Aim"/"Benchmark" Entry Routine 1200 that is executed within "Aim" Routine 1100 shown in FIG. 11 and "Benchmark" Routine 1400 shown in FIG. 14.
Figure 12B:
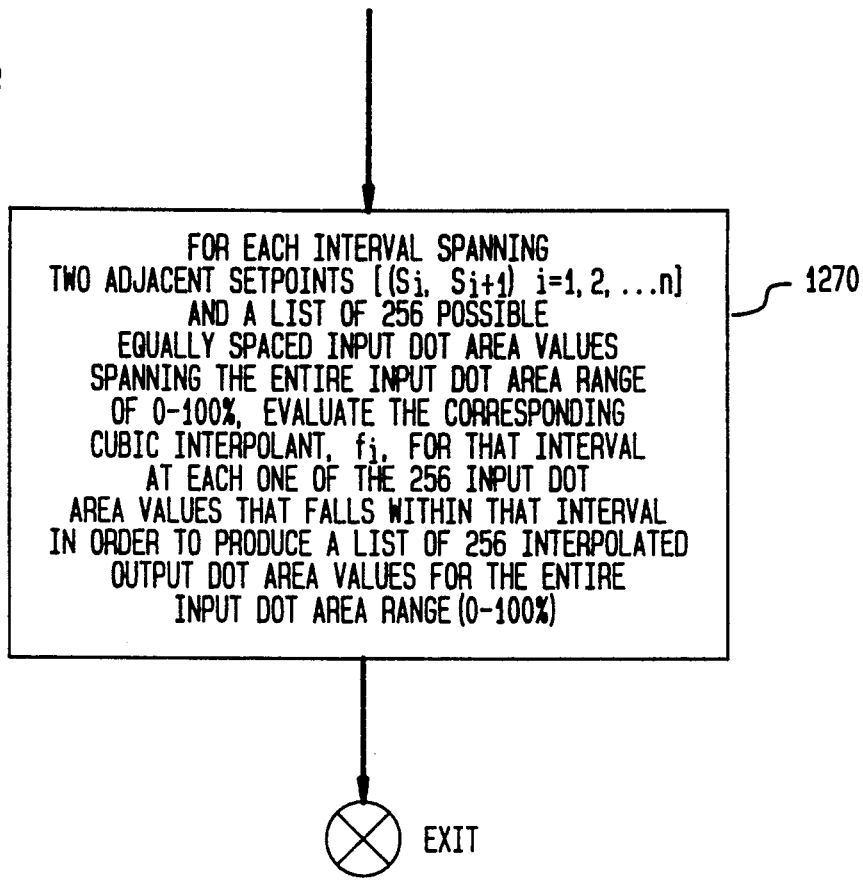
Figure 12:
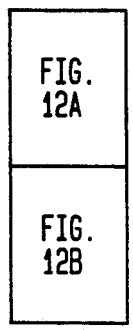
FIG. 12 depicts the correct alignment of the drawing sheets for FIGS. 12A and 12B.
Figure 14:
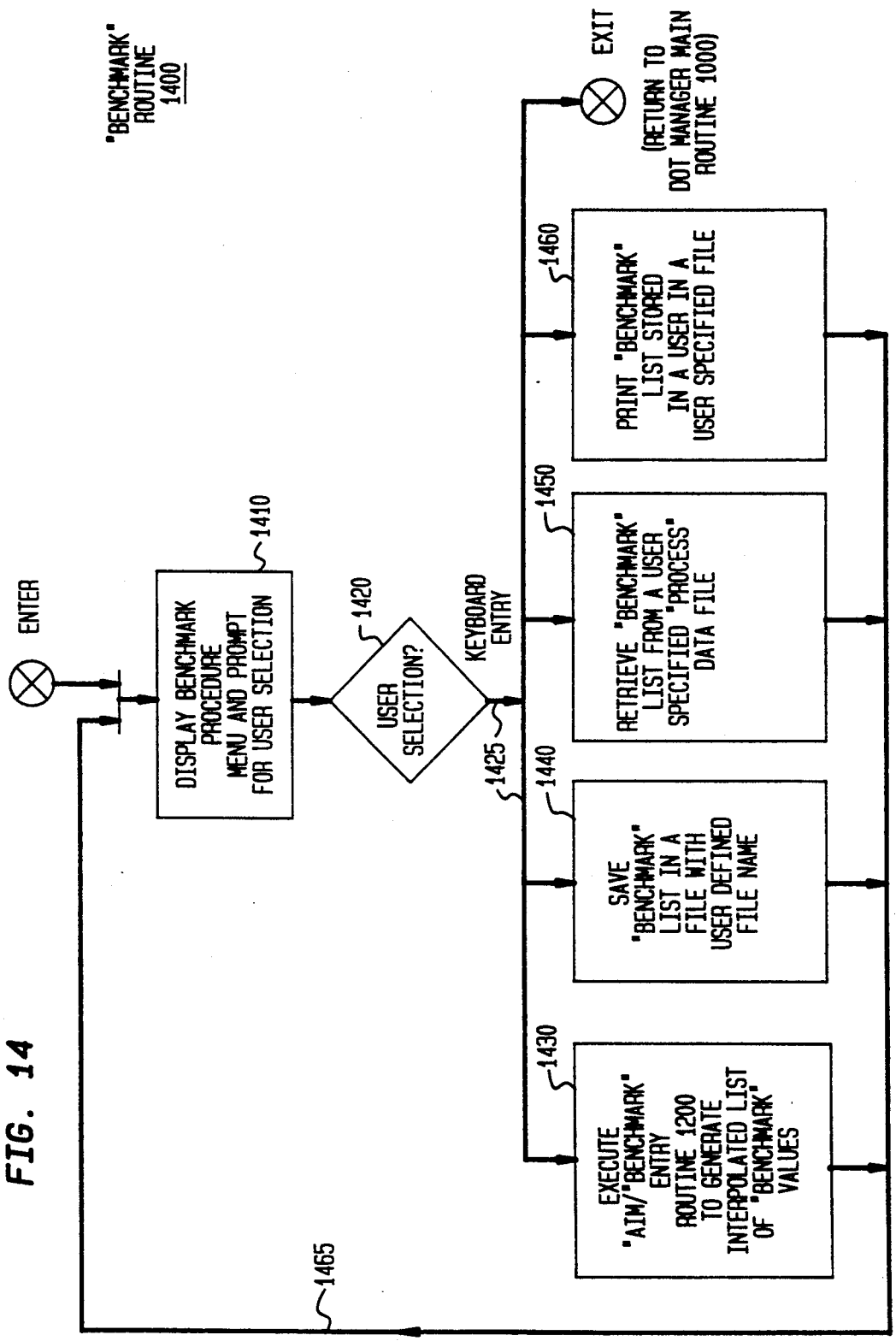
FIG. 14 depicts a flowchart of Benchmark Routine 1400 that is executed within Dot Manager Main Routine 1000 shown in FIG. 10.

A flowchart of "Aim"/"Benchmark" Entry Routine 1200 that is executed within "Aim" Routine 1100 shown in FIG. 11 and "Benchmark" Routine 1400 shown in FIG. 14 is collectively depicted in FIGS. 12A and 12B for which the correct alignment of the drawing sheets is shown in FIG. 12. As described above, routine 1200 obtains and processes incoming "Aim" or "Benchmark" entry point data to generate a corresponding list of 256 interpolated 12-bit "Aim" or "Process" values. This routine functions in an identical manner regardless of which type of entry point data it is processing. Hence, to simplify the following discussion, this routine will be specifically discussed in the context of processing "Aim" entry point data.

Upon entry into routine 1200, as shown in FIGS. 12A and 12B, execution first proceeds to block 1210. This block, when executed, provides the user with an opportunity to change the "set-up" information associated with the "Aim" entry point data that will next be obtained. This information, as noted above, comprises parameters that define color, desired solid area density, screen ruling and dot font shape. The inclusion of the "set-up" information in the "Aim" file enables the Operator PC, in generating a customized dot gain look-up table, to combine the interpolated values from only those "Aim" and "Process" files, through an internal audit function, that have identical "set-up" information and hence are associated with the same operating condition for the DDCP imaging chain. Once the user has signified his acceptance of the current "set-up" information for the "Aim" file, execution proceeds from block 1210 to decision block 1220.

Decision block 1220 routes execution to either blocks 1230 or 1240 based upon whether the user has selected, through Dot Manager Configuration Routine 1700 (discussed below in connection with FIG. 17), to enter data in terms of percent dot area or solid area density. In the event percent dot area has been selected, then, as shown in FIGS. 12A and 12B, execution proceeds, via path 1223, to block 1230. This latter block, when executed, prompts the user to enter the percent output dot area for the corresponding input dot area of each "Aim" entry point. Once all these values have been entered, execution then proceeds to block 1260 Alternatively, if density has been selected, then execution proceeds, via path 1227, to block 1240. This latter block, when executed, prompts the user to enter the density value for the corresponding input dot area of each "Aim" setpoint. Once the user has entered all the setpoint density data and block 1240 has fully executed, execution proceeds to block 1250 which converts each density value into an equivalent percent dot area. This conversion is performed using the well known "Yule-Nielsen" equation as follows:

$$\% \text{ DotArea} = 100\% \frac{1 - 10^{(D_{min} - D_{tint})/n}}{1 - 10^{(D_{min} - D_{max})/n}} \quad (6)$$

where:

$D_{max}$=the solid area density of the dot;

$D_{min}$=the base optical reflection density of the paper (or other media on which the proof image is to be printed);

$D_{tint}$=the optical density of a halftone pattern; and n=a user specified real exponent.

For further information regarding this equation, the reader is referred to, e.g., pages 205–216 and particularly page 215 of Chapter 8 "Additivity and Proportionality of Densities" of J. A. C. Yule, *Principles of Color Reproduction* (©1967: John Wiley & Sons, Inc., New York). Once all the density values have been converted to equivalent percent dot areas, execution proceeds to block 1260.

Block 1260, when executed, determines the coefficients of a monotone piecewise cubic interpolant function that passes through each pair of adjacent entry points, interpolates between each pair of entry points with a monotone cubic polynomial and preserves the continuity of derivative at each interior entry point. As noted above, the use of a monotone piecewise cubic function imparts a needed degree of curvature to the "Aim" (or "Benchmark") data that accurately predicts the actual physical performance of an imaging chain (e.g., press or RIP/marking engine) between entry points.

Figure 13A:
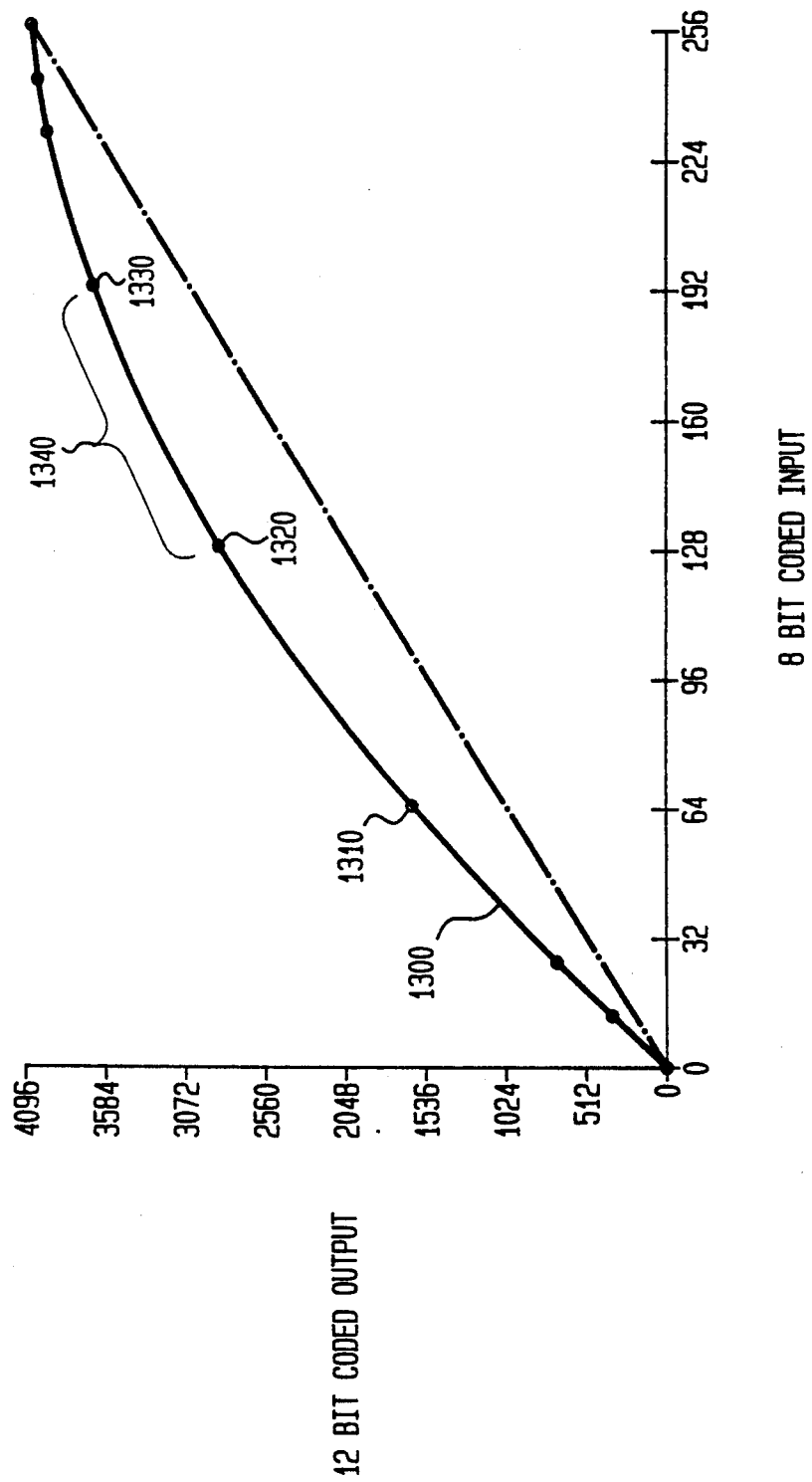
FIG. 13A graphically depicts typical monotone cubic interpolated "Aim" curve 1300 expressed in terms of 8-bit coded (contone) input values vs. 12-bit coded (contone) output values.

To facilitate understanding, FIG. 13A graphically depicts typical interpolated "Aim" curve 1300 expressed in terms of 8-bit coded (contone) input values vs. 12-bit coded (contone) output values, with "0" and "255" respectively representing 0% and 100% input dot area, and "0" and "4095" representing 0% and 100% output dot areas. Curve 1300 corresponds to "Aim" dot gain curve 410 shown in FIG. 4 and contains seven entry points (apart from "0" and "4095") including, as shown in FIG. 13A, setpoints 1310, 1320 and 1330. The coefficients of a monotone piecewise cubic interpolant function, fi, are determined for each interval i, such as interval 1340, that spans two adjacent entry points [($S_i$, $S_{i+1}$) where i=1, 2, ..., n], in this case entry points 1320 and 1330. This interpolation process is described in detail in, e.g., F. N. Fritsch et al, "Monotone Piecewise Cubic Interpolation", *SIAM Journal of Numerical Analysis*, Vol. 17, No. 2, April 1980, pages 238-246 (hereinafter referred to as the Fritsch et al paper), which is incorporated by reference herein. In utilizing the interpolation described in the Fritsch paper, I chose, as described on page 242 of this paper, to employ set 2 as a constraint on each interpolant function. Inasmuch as the detailed steps for undertaking monotone piecewise cubic interpolation in accordance with the method described in the Fritsch et al paper would be readily apparent to anyone skilled in the art, then, for the sake of brevity, I have omitted all such details from the following discussion.

Figure 13B:
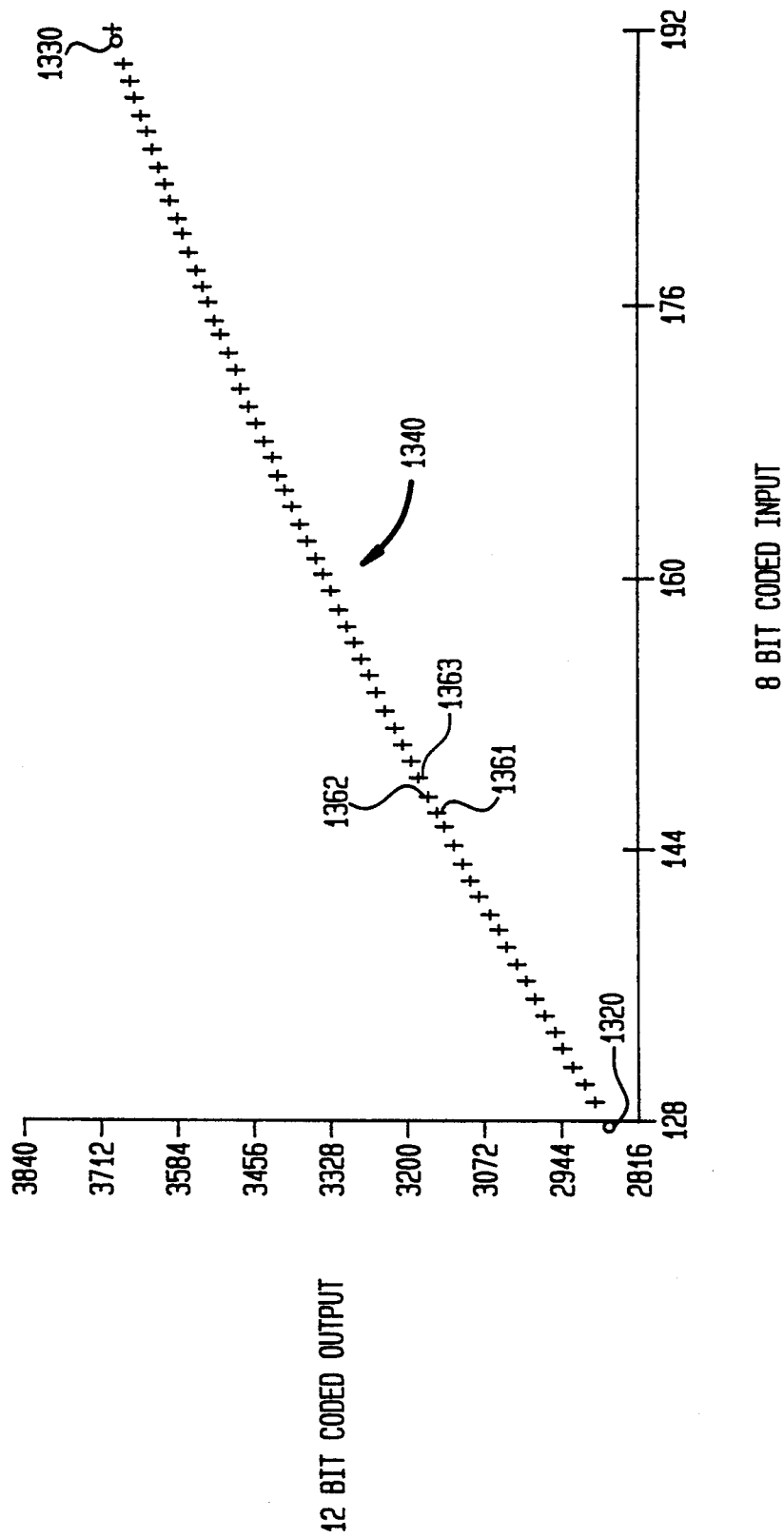
FIG. 13B depicts an expanded view of segment 1340 of monotone cubic interpolated "Aim" curve 1300 shown in FIG. 13A and the individual illustrative points at which the associated cubic interpolant function for this segment is separately evaluated.

Once all the coefficients of all the interpolant functions for the "Aim" entry points have been determined, then execution proceeds to block 1270 shown in FIG. 12B. This block, when executed, evaluates the interpolant function for each and every interval such that an interpolated "Aim" value will be generated for each possible incremental input dot area, or as shown each incremental 8-bit input value, i.e. from "0" to "255". Specifically, the interpolant function associated with each interval is successively evaluated at those particular eight-bit input values which fall on the end of or within that interval to yield corresponding output dot areas. In this regard, FIG. 13B depicts an expanded view of segment 1340 of monotone cubic interpolated "Aim" curve 1300 shown in FIG. 13A and the individual illustrative points at which the associated cubic interpolant function for this segment is separately evaluated. Selected representative 8-bit input values, that lie on or within interval 1340, spanned by setpoints 1320 and 1330, shown as hash marks on the abscissa The resulting evaluated (interpolated) values, of which values 1361, 1362 and 1363 are illustrative, are marked as "+". As a result of evaluating all the interpolants, a list of 256 12-bit interpolated "Aim" values is produced. At this point, block 1270, shown in FIG. 12B, has completed. Execution then exits from "Aim"/"Benchmark" Entry Routine 1200.

FIG. 14 depicts a flowchart of "Benchmark" Routine 1400 that is executed within Dot Manager Main Routine 1000 shown in FIG. 10. Routine 1400 provides the same functionality as "Aim" Routine 1100, shown in FIG. 11 and discussed above, but in connection with "Benchmark" data rather than "Aim" data.

Specifically, upon entry into routine 1400, shown in FIG. 14, execution proceeds to block 1410 which, when executed, displays an appropriate menu on the display screen at the Operator PC and prompts the user situated thereat to select an operation to be performed on "Benchmark" data. Based upon a keyboard entry made by the user, decision block 1420 then routes execution, via paths 1425, to any of blocks 1430-1460 or causes execution to exit from this routine and return to Dot Manager Main Routine 1000. Once any of blocks 1430-1460 has fully executed, execution merely loops back to block 1410, via path 1465, to prompt the user to select the next "Benchmark" data operation to be performed, and so on.

When executed, block 1430 causes "Aim"/"Benchmark" Entry Routine 1200 (shown in FIGS. 12A and 12B, and discussed in detail above) to obtain and process incoming "Benchmark" entry point data to generate a list of 256 interpolated 12-bit "Benchmark" values.

Blocks 1440 or 1450, when executed and shown in FIG. 14, respectively save a list of the interpolated "Benchmark" values in a file with a user specified filename or retrieve a list stored in such a file. When executed, block 1460 prints a specified file of interpolated "Benchmark" values.

FIG. 15 depicts a flowchart of Customize Routine 1500 that is executed within Dot Manager Main Routine 1000 shown in FIG. 10. Routine 1500, as described above, allows the user to instruct the Operator PC to perform various operations relating to customized dot gain data.

Specifically, upon entry into routine 1500, execution proceeds to block 1510 which, when executed, displays an appropriate menu on the display screen and prompts the user situated thereat to select an operation to be performed on customized dot gain data. Based upon a keyboard entry made by the user, decision block 1520 then routes execution, via paths 1525, to any of blocks 1530-1580 or causes execution to exit from this routine and return to Dot Manager Main Routine 1000. Once any of blocks 1530-1580 has fully executed, execution merely loops back to block 1510, via path 1585, to prompt the user to select the next customized dot gain data operation to be performed, and so on.

When executed, block 1530 causes Customized Dot Gain Look-Up Table Routine 1600 (shown in FIGS. 16A and 16B, and discussed in detail below) to process a pair of user specified files of interpolated "Aim" and "Benchmark" values, that have matching "set-up" information, to generate values for a customized dot gain look-up table.

Blocks 1540 or 1550, when executed and shown in FIG. 15, respectively save the values for a customized dot gain look-up table (along with the corresponding "set-up" information) in a file specified by a user defined filename or retrieve these values (and the corresponding "set-up" information) from such a file. When executed, block 1560 displays and permits a user to appropriately edit the values that form a customized dot gain table stored in a user specified file. Block 1570, when executed, prints a table of customized dot gain values (along with corresponding "set-up" information) stored in a user specified file. Lastly, block 1580, when executed, graphically plots the customized dot gain values that form a current table, such as that which was just produced through execution of any of blocks 1530-1570.

Figure 16B:
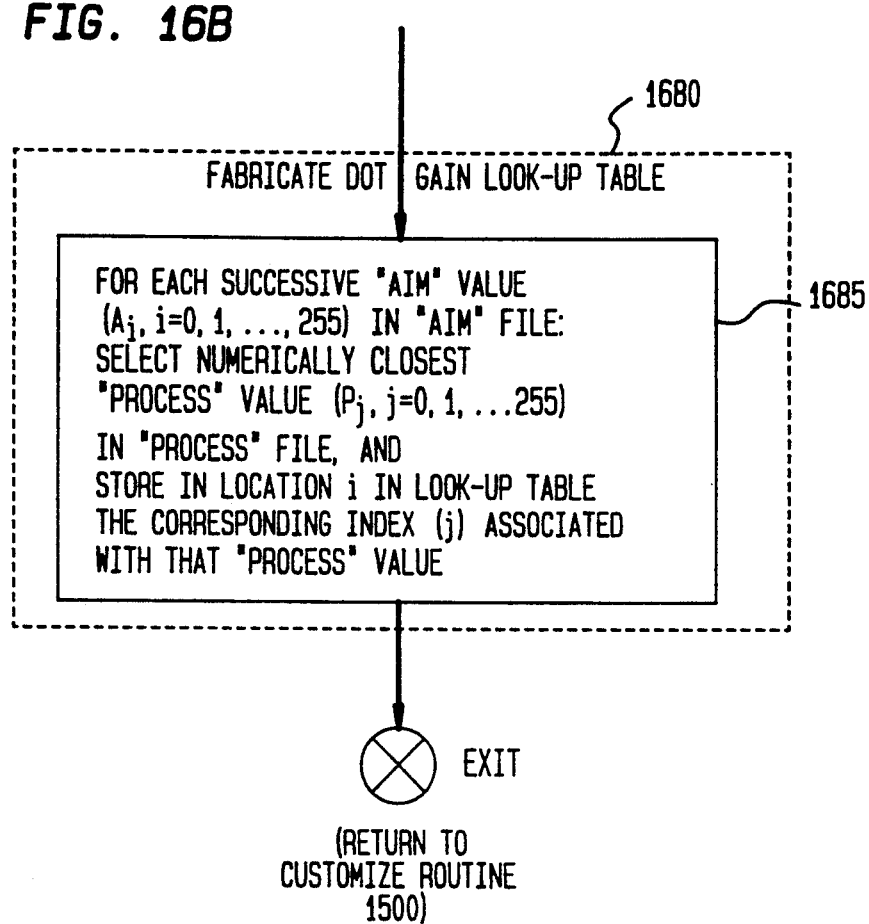
Figure 16:
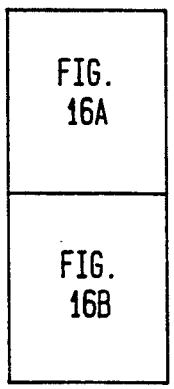
FIG. 16 depicts the correct alignment of the drawing sheets for FIGS. 16A and 16B.

A flowchart of Customized Dot Gain Look-up Table Routine 1600, that is executed within Customize Dot Gain Routine 1500 shown in FIG. 15, is collectively depicted in FIGS. 16A and 16B, for which the correct alignment of the drawing sheets for these latter figures is shown in FIG. 16. As described above, routine 1600 produces a customized dot gain look-up table based upon lists of interpolated values contained in a pair of user specified "Aim" and "Process" files that contain matching "set-up" information.

Specifically, upon entry into routine 1600, execution proceeds to block 1610. This block prompts the user to enter the file names of the desired "Aim" and "Process" files that contain interpolated "Aim" and "Process" values for use in generating a customized dot gain look-up table. Once this occurs, block 1620 is executed to read this "Aim" file. Once this file has been read or, if unsuccessful, an attempt has been made to do so, execution proceeds to decision block 1630. If this "Aim" file has not been successfully read, then an error condition has occurred. Hence, decision block 1630 routes execution, via NO path 1637, to block 1670. This latter block, when executed, displays an appropriate error message on the display screen of the Operator PC. Thereafter, execution exits from routine 1600 and returns to Customize Routine 1500 (shown in FIG. 15).

Alternatively, if this "Aim" file has been successfully read, then decision block 1630, shown in FIGS. 16A and 16B, routes execution, via YES path 1633, to block 1640. This latter block, when executed, reads the user specified "Process" file. Once this file has been read or, if unsuccessful, an attempt has been made to do so, execution proceeds to decision block 1650. If this "Process" file has not been successfully read, then an error condition has occurred. Hence, decision block 1650 routes execution, via NO path 1657, to block 1670. This latter block, when executed, displays an appropriate error message on the display screen of the Operator PC. Thereafter, execution exits from routine 1600 and returns to Customize Routine 1500 (shown in FIG. 15).

Now, if the "Process" file has been successfully read as well, decision block 1650, shown in FIGS. 16A and 16B, routes execution, via YES path 1653, to decision block 1660. This latter decision block determines whether the "set-up" information stored in both the user specified "Aim" and "Process" files that have just been read is identical. To be valid, a customized dot gain look-up table can only be constructed from interpolated "Aim" and "Process" values, respectively, which have been generated by the RIP/marking engine imaging chain under or are associated with the same operating condition (i.e. color, solid area density, screen ruling and dot font shape). If the "setup" information for these two files does not match, then an error condition occurs. In this case, decision block 1660 routes execution, via NO path 1667, to block 1670. This latter block, when executed, displays an appropriate error message on the display screen of the Operator PC. Thereafter, execution exits from routine 1600 and returns to Customize Routine 1500 (shown in FIG. 15).

In the event that the "set-up" information for the "Aim" and "Process" files matches, then decision block 1660, shown in FIGS. 16A and 16B, routes execution, via YES path 1663, to Fabricate Dot Gain Look-Up Table block 1680. This latter block, when executed, executes block 1685 which, for each successive interpolated value from the "Aim" file (Ai, i=0, 1, ..., 255), selects the numerically closest interpolated value, Pj (j=0, 1, ..., 255), from the "Process" file. The index, j, associated with the selected interpolated "Process" value, is then stored in location "i" in a 256 location table. ;Alternatively, if code values other than 8-bit integers are used for contone values within the RIP processor, either scaling or interpolation based on the index, j, of the closest match can be used here to compute the appropriate entry to store in location "i" in the "256" location table This table, once completely filled, forms a customized dot gain look-up table. Once all the values of the customized dot gain look-up table have been determined, execution exits from blocks 1685 and 1680, and then from routine 1600.

FIG. 17 depicts a flowchart of Dot Manager Configuration Routine 1700 that is executed within Dot Manager Main Routine 1000 shown in FIG. 10. As discussed above, routine 1700 allows the user, through the Operator PC, to appropriately vary, save and retrieve the configuration associated with processing "Aim" and "Benchmark" setpoints and displaying the values of a customized dot gain table.

Specifically, upon entry into routine 1700, execution proceeds to block 1710 which, when executed, displays an appropriate menu on the display screen associated with the Operator PC and prompts the user situated thereat to select an operation to be performed relating to configuration information. Based upon a keyboard entry made by the user, decision block 1720 then routes execution, via paths 1725, to any of blocks 1730–1790 or causes execution to exit from this routine and return to Dot Manager Main Routine 1000. Once any of blocks 1730–1790 has fully executed, execution merely loops back to block 1710, via path 1785, to prompt the user to select the next configuration operation to be performed, and so on.

When executed, block 1730 displays the input dot areas associated with the entry points for the "Aim" and "Benchmark" data. Block 1740, when executed, permits the user to change these input dot areas, as desired, for the "Aim" and "Benchmark" data. When executed, block 1750 prompts the user to select whether incoming "Aim" or "Benchmark" data is to be supplied in either percent dot area or density. As noted above, input "Aim" and "Benchmark" values that are provided in terms of density are converted into equivalent dot area (in this regard, see block 1250 in "Aim"/"Process" Entry Routine 1200 shown in FIGS. 12A and 12B and discussed in detail above). Block 1790, shown in FIG. 17, when executed, permits the user to enter a value for exponent "n" used in equation (6) above for converting input density values into equivalent input dot areas.

Blocks 1760 and 1770, when executed, respectively list the specific points that are to be used to graphically display a customized dot gain look-up table and permit the user to change these points, as desired. Block 1780, when executed, saves the current configuration information, which the user has just defined, for subsequent retrieval and use, or retrieves and loads previously saved configuration information as selected by the user and then appropriately configures the above described software accordingly.

Figure 18:
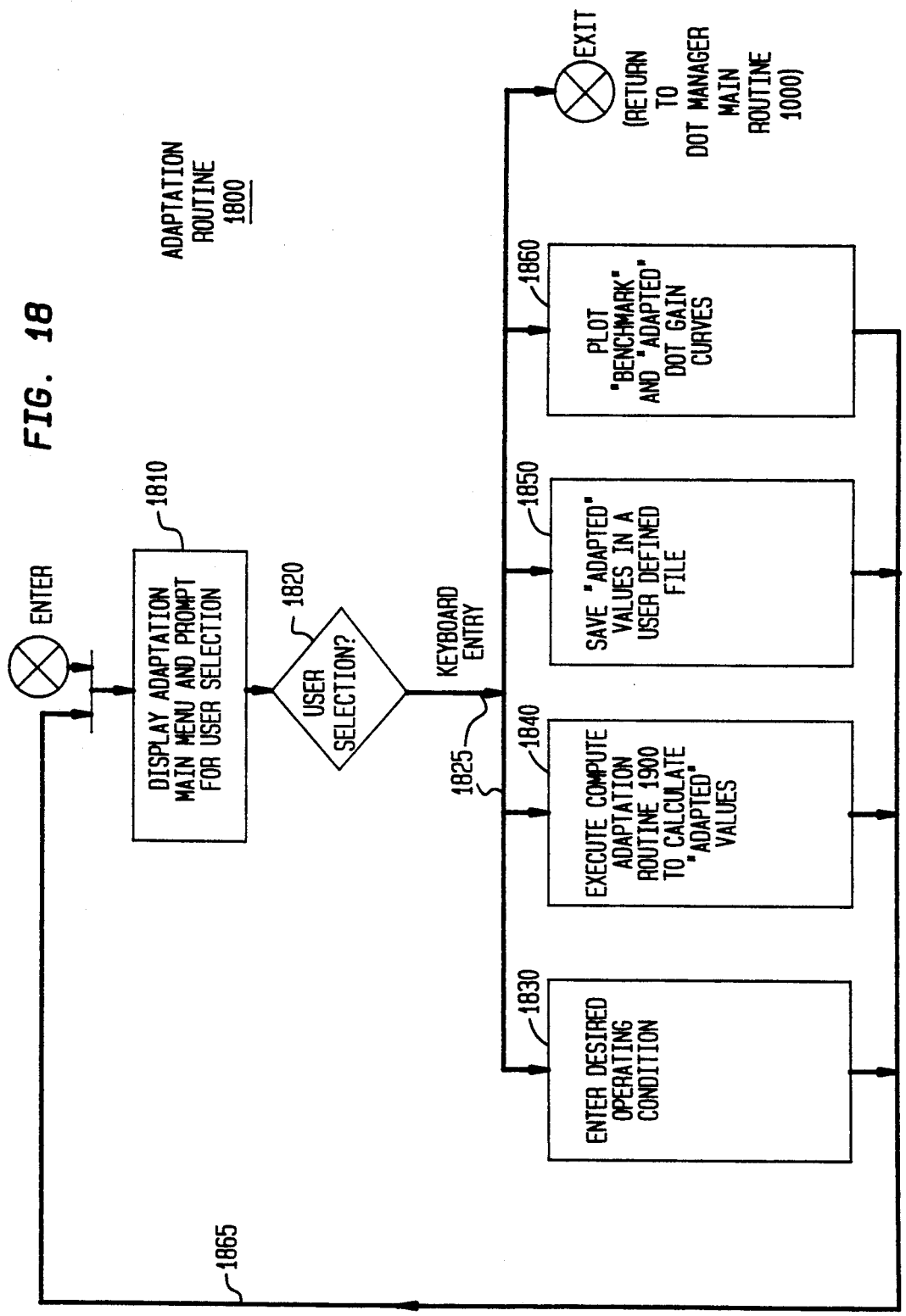
FIG. 18 depicts a flowchart of Adaptation Routine 1800 that is executed within Dot Manager Main Routine 1000 shown in FIG. 10.

FIG. 18 depicts a flowchart of Adaptation Dot Gain Routine 1800 that is executed within Dot Manager Main Routine 1000 shown in FIG. 10. This routine, as noted above: (a) obtains user information regarding the desired operating condition, (b) adaptively computes the "Adapted" values, (c) saves the "Adapted" values in a user defined file, and/or (d) plots the "Benchmark" and "Adapted" process dot gain curves on the display screen associated with the Operator PC.

Specifically, upon entry into routine 1800, execution proceeds to block 1810 which, when executed, displays an appropriate menu on the display screen and prompts the user situated thereat to select an operation to be performed relating to adaptation of "Benchmark". Based upon a keyboard entry made by the user, decision block 1820 then routes execution, via paths 1825, to any of blocks 1830–1860 or causes execution to exit from this routine and return to Dot Manager Main Routine 1000. Once any of blocks 1830-1860 has fully executed, execution merely loops back to block 1810, via path 1865, to prompt the user to select the next adaptation operation to be performed, and so on.

When executed, block 1830 queries the user to enter the desired operating condition.

Block 1840, when executed, initiates execution of Compute Adaptation Routine 1900 (see FIGS. 19A and 19B which are discussed in detail below) which calculates the "Adapted" values in view of the desired operating condition and the corresponding "Benchmark" condition, "Benchmark" values and associated sensitivity coefficients.

Block 1850, when executed, saves the "Adapted" values in a user defined file for subsequent retrieval and use. Block 1860, when executed, plots the associated "Adapted" and "Benchmark" dot gain curves on the display screen associated with the Operator PC.

Figure 19B:
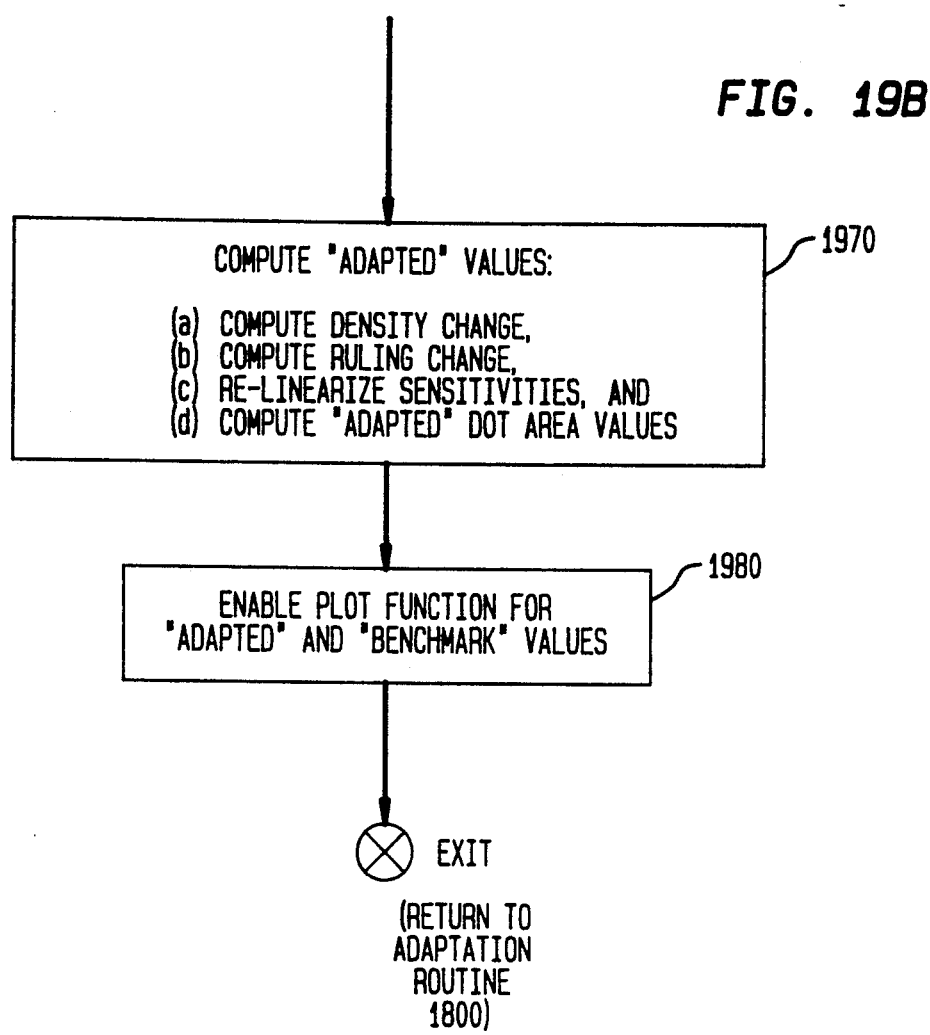
Figure 19:
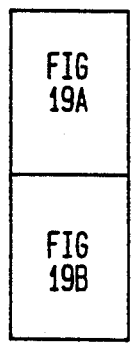
FIG. 19 depicts the correct alignment of the drawing sheets for FIGS. 19A and 19B.

FIGS. 19A and 19B collectively depict a flowchart of Compute Adaptation Routine 1900 that is executed within Adaptation Dot Gain Routine 1800 shown in FIG. 18; the correct alignment of the drawing sheets for FIGS. 19A and 19B is shown in FIG. 19.

Upon entry in routine 1900, execution proceeds to block 1910. This block, when executed, obtains the appropriate "Benchmark" file name from the user. Thereafter, execution proceeds to block 1920 which attempts to read this file. After the file has been successfully read, or, if the file can not be read, an attempt to read the file has been made, decision block 1930 is executed. In the event this "Benchmark" file could not be read, then an error condition has occurred. In this case, decision block 1930 routes execution, via NO path 1933, to block 1960 which, in turn, displays an appropriate error message on the display screen at the Operator PC. Thereafter, execution exits from routine 1900 and returns to Adaptation Routine 1800 (see FIG. 18).

Alternatively, in the event that this "Benchmark" file has been successfully read, then decision block 1930, shown in FIGS. 19A and 19B, routes execution, via YES path 1937, to decision block 1940. This latter decision block determines whether both the color and font information contained in the set-up information within this "Benchmark" file matches the corresponding information most recently entered by the user, through execution of block 1830 in Adaptation Dot Gain Routine 1800 (see FIG. 18). If a mis-match occurs in either the color or font information, then an error condition has occurred. In this case, decision block 1940 routes execution, via NO path 1943, to block 1960 which, in turn, displays an appropriate error message on the display screen at the Operator PC. Thereafter, execution exits from routine 1900 and returns to Adaptation Dot Gain Routine 1800 (see FIG. 18).

Now, if the color and font information in the "Benchmark" file matches that which has been entered by the user, then decision block 1940 routes execution, via YES path 1947, to block 1950. This latter block reads the values of the proper stored sensitivity coefficient values for the "Benchmark" condition for the specific color that is to be used therewith. Once these coefficient values are obtained, execution proceeds to block 1970. This block computes the "Adapted" values. This computation basically consists of four separate steps: (a) computing a density change between the "Benchmark" and desired operating conditions, (b) computing a ruling change between the "Benchmark" and desired operating conditions, (c) linearizing each of the sensitivity coefficient values, and (d) computing all the adapted dot areas, i.e. the "Adapted" values, through modeling equation (5) above. The pseudo-code representation of block 1970 is given in Table 4 below. Inasmuch as the operation of this code, particularly in view of the above discussion of the modeling equations, is readily apparent to anyone skilled in the art, this code will not be discussed in any further detail herein.

TABLE 4

Pseudocode For Calculating "Adapted" Process Values (Block 1970)

```
/* Pseudocode for computing Adapted Benchmark Values */
  delta_density = density_setting_adapted −
                  density_setting_Benchmark;
  delta_ruling = ruling_adapted − ruling_Benchmark;
/* compute adapted dot areas */
adapted_area(0) = Benchmark_area(0);
for i = 1 to 254;
       /* re-linearize sensitivities */
       density_sensitivity =
            Standard_density_sensitivity(i) +
            (ruling_Benchmark − 150)*interaction(i);
       ruling_sensitivity = Standard_ruling_sensitivity(i) +
            density_setting_adapted*interaction(i);
       /* apply sensitivities to compute adapted dot area */
       adapted_area(i) = Benchmark_area(i) +
       density_sensitivity*delta_density +
       ruling_sensitivity*delta_ruling;
       /* ensure monotonicity */
       adapted_area(i) = max(1 + adapted_area(i − 1),
            adapted_area(i))
end;
adapted_area(255) = Benchmark_area(255);
```

Once block 1970 has fully executed to compute all the "Adapted" values, execution proceeds to block 1980. This latter block enables a flag to permit these values to be subsequently plotted, by user selection, through a plot function provided in block 1860 shown in FIG. 18. This flag is reset by block 1860 once a plot has been fully written to the display screen at the Operator PC. After the flag has been set, execution exits, as shown in FIGS. 19A and 19B, from routine 1900 and returns to Adaptation Routine 1800 (see FIG. 18).

By now, those skilled in the art should recognize that even though my invention has been described in terms of parsing the operating space of the DDCP imaging chain into rectangular areas and placing a "Benchmark" within each such area, these areas can be differently shaped and sized. In this regard, the contour and size of any such area is predicated on the accuracy with which a prediction based upon a pre-defined modeling equation will provide for changes in operating condition throughout that area. Of course, if a different form of a modeling equation, such one containing second order terms, were to be used in lieu of a relatively simple bi-linear model, such as embodied in equations (3-5) above, then the shape of each such area would change accordingly. For example, each area would likely change from a rectangular-shaped area to an elongated elliptically-shaped area if a quadratic model were to be used, and so forth for other forms of modeling equations. Each area can be viewed as a "confidence area" inasmuch as its size would be predicated by desired predication accuracy that is to be achieved throughout the entire area. While I have determined that a sublimation dye transfer DDCP imaging chain can be accurately modeled by a simple bi-linear equation, other such imaging systems may likely require more complex modeling to achieve sufficient prediction accuracy. This, in turn, would likely necessitate use of increasingly sophisticated methodologies for: (a) locating "Benchmark" condition(s) within each desired area of the operating space of the system, as well as (b) selecting which "Benchmark" condition to use in any given imaging situation, in order to achieve sufficiently accurate prediction. "Benchmark" location could be accomplished through use of pre-defined rules or criteria.

Furthermore, "Benchmark" data can be stored within the imaging system, such as within the Operator PC, in such a manner as to form a library of "Benchmark" proof data files. Doing so will advantageously permit the imaging system to subsequently access the particular "Benchmark" data it needs for subsequent proofing applications rather than require the corresponding test proof image to be produced again and measured at a corresponding "Benchmark" condition.

While my invention has been described in terms of obtaining "Aim" and "Benchmark" data through any of three specific ways, such as user input, densitometric measurements of images or through reading and/or editing an existing file of data, use of my invention is independent of the specific manner in which this data is acquired. In that regard, my invention can be used in conjunction with any "Aim" and "Benchmark" data regardless of the specific manner through which that data has been obtained—i.e. whether that manner is one of the three described above or a different manner, provided the "Aim" and the resulting "Adapted" data that is to be used to form a customized tone reproduction look-up table applies to matching operating conditions of the DDCP imaging chain.

In addition, while my invention has been illustratively described in terms of use in conjunction with a DDCP imaging chain, this invention is clearly not so limited. In this regard, the broad teachings of my invention can certainly be used in nearly any imaging system, in which a marking engine or other output device has a native dot gain (or other tone reproduction) characteristic, in order to produce an output image, from digitized input values, that depicts a desired tone reproduction characteristic and is substantially free of any corruption attributable to that native characteristic. These digitized input values can represent contone values, as described above, or other image density based information.

Although one embodiment of the present invention has been shown and described in detail herein, many other varied embodiments that incorporate the teachings of my invention may be easily constructed by those skilled in the art.

INDUSTRIAL APPLICABILITY AND ADVANTAGES

The present invention is useful in connection with nearly any imaging system, and particularly with a direct digital color proofing (DDCP) imaging chain used in a DDCP system, for imparting very accurate tone reproduction in an output image, such as a color proof image. Advantageously, use of the invention drastically reduces the number of separate test proof images that needs to be produced and measured to accommodate any change, such as in screen ruling and solid area density, in the operating condition of the imaging chain throughout its entire operating space.

I claim:

1. An imaging system for generating an output image that exhibits a pre-defined tone reproduction characteristic and is substantially free of corruption attributable to a native tone reproduction characteristic of the system, said system comprising:

adaptation means, responsive to first values representing a pre-defined tone reproduction characteristic at a first pre-defined operating condition of the system and to second values representing a native tone reproduction characteristic of the system at a second pre-defined operating condition of said system, for varying said second values in a pre-defined manner and in response to an operational difference between said first and second pre-defined operating conditions so as to form third values and for modifying, in response to said first and third values, each one of a plurality of incoming digitized values that collectively represent an input image so as to form modified values, wherein said third values collectively represent the native tone reproduction characteristic of said system that is expected to occur at the first pre-defined operating condition; and means, responsive to said adaptation means, for generating an output image, at said first pre-defined operating condition, in response to said modified values; whereby said output image exhibits said pre-defined tone reproduction characteristic substantially free of corruption from the native tone reproduction characteristic of the imaging system at the first predefined operating condition.

2. The apparatus in claim 1 wherein said adaptation means comprises means, responsive to a numerical difference between said first and second operating conditions, for adaptively producing each one of said third values from a corresponding one of said second values in accordance with a pre-determined model relating changes from the first pre-defined operating condition to the second pre-defined operating condition of the imaging system to an expected change in the native tone reproduction characteristic of said imaging system from said first pre-defined operating condition to said second pre-defined operating condition.

3. The apparatus in claim 2 wherein said adaptation means comprises means, responsive to said first and third values, for generating a look-up table representing the first values modified by an inverse function of the third values; and wherein said output image generating means comprises means for routing the incoming digitized values through the look-up table so as to form a corresponding plurality of said modified values.

4. The apparatus in claim 3 wherein said first and second operating conditions are different from each other.

5. The apparatus in claim 4 wherein said adaptively producing means comprises: means for forming a plurality of numerical differences between associated pairs of corresponding first and second factors, said first and second factors being respectively associated with said first and second pre-defined operating conditions; and wherein said model comprises a pre-defined equation having pre-determined sensitivity coefficients which collectively relate said numerical differences into expected variations in the native tone reproduction characteristic of said imaging system.

6. The apparatus in claim 5 wherein, for each of a plurality of color halftone separations, said operating condition is defined by a color at which said separation is to be written by the marking engine, a value of solid area density and dot font shape that are to be written by the marking engine in said each separation, and a screen ruling that is to be used in generating said each separation.

7. The apparatus in claim 5 wherein said output image is a halftone image and the first and second pre-defined operating conditions each comprise a value of solid area density and screen ruling at which halftone dots in said output image are to be written by a marking engine.

8. The apparatus in claim wherein said tone reproduction characteristic is dot gain.

9. The apparatus in claim 8 wherein said imaging system comprises a processor and a marking engine connected to the processor.

10. The apparatus in claim 9 wherein said incoming digitized values are continuous tone (contone) values.

11. The apparatus in claim 10 wherein said output image is a color halftone proof image formed of properly registered color halftone separations.

12. The apparatus in claim 5 wherein said model is bi-linear and comprises corresponding terms and associated pre-determined sensitivity coefficients for relating, at said first pre-defined operating condition, changes in solid area density and screen ruling into expected changes in the native tone reproduction characteristic of the imaging system that will occur as a result of a change from said first pre-defined operating condition to said second pre-defined operating condition.

13. The apparatus in claim 12 wherein said model is given by the following equation:

$$\text{adapted\_area} = \text{benchmark\_area} + \text{density\_sensitivity} * \Delta \text{density} + \text{ruling\_sensitivity} * \Delta \text{ruling}$$

where:

adapted_area is a given halftone dot size at said second pre-defined operating condition; benchmark_area is output area associated with said given halftone dot size but at said first pre-defined operating condition;

density_sensitivity and ruling sensitivity are pre-determined sensitivity coefficients relating changes in density and screen ruling to halftone dot size; and $\Delta$density and $\Delta$ruling specify differences in solid area density and screen ruling between said first and second pre-defined operating conditions.

14. The apparatus in claim 13 wherein said table generating means comprises:

first means for accepting said first values at a plurality of first predetermined setpoints and for interpolating said first values to yield first interpolated values;

second means for accepting said second values at a plurality of second predetermined setpoints and for interpolating said second values to yield second interpolated values;

means, responsive to said numerical differences and said sensitivity coefficients, for determining through said equation a corresponding one of said third values for each one of said second values; and said equation a corresponding one of said third values for each one of said second values; and means, responsive to said first interpolated values and third values, for generating resulting values that form the look-up table.

15. The apparatus in claim 14 wherein said first and second value accepting and interpolating means comprises means for processing said first and second values, respectively, to yield interpolated values for all possible input dot areas associated with said first and second values.

16. The apparatus in claim 15 wherein said table value generating means comprises:

means for determining a location in a list of said third values of a corresponding one of said third values that is numerically closest of all of the third values to each one of the first interpolated values; and means for writing a code value based on said location of said corresponding one of the third values in a location in the table given by an index value associated with said one of the first interpolated values.

17. The apparatus in claim 15 wherein said processing means comprises:

means for determining coefficients of a monotone piecewise cubic function that spans an interval defined by each pair of adjacent ones of said first values and an interval defined by each pair of adjacent ones of said second values; and means for evaluating the monotone piecewise cubic function for each such interval for said first and second values at pre-defined incremental input dot areas that fall on the ends of or within that interval so as to collectively yield said first and second interpolated values, respectively.

18. In an imaging system, a method for generating an output image that exhibits a pre-defined tone reproduction characteristic and is substantially free of corruption attributable to a native tone reproduction characteristic of the system, said method comprising the steps of:

varying, in response to first values representing a pre-defined tone reproduction characteristic at a first pre-defined operating condition of the system and to second values representing a native tone reproduction characteristic of the system at a second pre-defined operating condition of said system, said second values in a pre-defined manner and in response to an operational difference between said first and second pre-defined operating conditions so as to form third values and modifying, in response to said first and third values, each one of a plurality of incoming digitized values that collectively represent an input image so as to form modified values, wherein said third values collectively represent the native tone reproduction characteristic of said system that is expected to occur at the first predefined operating condition; and generating, in response to said varying and modifying step, an output image, at said first pre-defined operating condition, in response to said modified values; whereby said output image exhibits said pre-defined tone reproduction characteristic substantially free of corruption from the native tone reproduction characteristic of the imaging system at the first pre-defined operating condition.

19. The method in claim 18 wherein said varying and modifying step comprises the step of adaptively producing, in response to a numerical difference between said first and second operating conditions, each one of said third values from a corresponding one of said second values in accordance with a pre-determined model relating changes from the first pre-defined operating condition to the second pre-defined operating condition of the imaging system to an expected change in the native tone reproduction characteristic of said imaging system from said first pre-defined operating condition to said second pre-defined operating condition.

20. The method in claim 19 wherein said varying and modifying step comprises the step of generating, in response to said first and third values, a look-up table representing the first values modified by an inverse function of the third values; and wherein said output image generating step comprises the step of routing the incoming digitized values through the look-up table so as to form a corresponding plurality of said modified values.

21. The method in claim 20 wherein said first and second operating conditions are different from each other.

22. The method in claim 21 wherein said adaptively producing step comprises the step of forming a plurality of numerical differences between associated pairs of corresponding first and second factors, said first and second factors being respectively associated with said first and second pre-defined operating conditions; and wherein said model comprises a pre-defined equation having pre-determined sensitivity coefficients which collectively relate said numerical differences into expected variations in the native tone reproduction characteristic of said imaging system.

23. The method in claim 22 wherein, for each of a plurality of color halftone separations, said operating condition is defined by a color at which said separation is to be written by the marking engine, a value of solid area density and dot font shape that are to be written by the marking engine in said each separation, and a screen ruling that is to be used in generating said each separation.

24. The method in claim 22 wherein said output image is a halftone image and the first and second pre-defined operating conditions each comprise a value of solid area density and screen ruling at which halftone dots in said output image are to be written by a marking engine.

25. The method in claim 23 wherein said tone reproduction characteristic is dot gain.

26. The method in claim 25 wherein said incoming digitized values are continuous tone (contone) values.

27. The method in claim 22 wherein said model is bi-linear and comprises corresponding terms and associated pre-determined sensitivity coefficients for relating, at said first pre-defined operating condition, changes in solid area density and screen ruling into expected changes in the native tone reproduction characteristic of the imaging system that will occur as a result of a change from said first pre-defined operating condition to said second pre-defined operating condition.

28. The method in claim 27 wherein said model is given by the following equation:

$$\text{adapted\_area} = \text{benchmark\_area} + \text{density\_sensitivity} * \Delta\text{density} + \text{ruling\_sensitivity} * \Delta\text{ruling}$$

where:
adapted_area is a given halftone dot size at said pre-defined operating condition; density_sensitivity and ruling sensitivity are pre-determined sensitivity coefficients relating changes in density and screen ruling to halftone dot size; and $\Delta$density and $\Delta$ruling specify differences in solid area density and screen ruling between said first and second pre-defined operating conditions.

29. The method in claim 28 wherein said table generating step comprises the steps of:

first accepting said first values at a plurality of first predetermined setpoints and for interpolating said first values to yield first interpolated values;

second accepting said second values at a plurality of second predetermined setpoints and for interpolating said second values to yield second interpolated values;

determining, in response to said numerical differences and said sensitivity coefficients and through said equation, a corresponding one of said third values for each one of said second values; and generating, in response to said first interpolated values and third values, resulting values that form the look-up table 30. The method in claim 29 wherein said first and second value accepting and interpolating step comprises the step of processing said first and second values, respectively, to yield interpolated values for all possible input dot areas associated with said first and second values.

31. The method in claim 30 wherein said table value generating step comprises the steps of:

determining a location in a list of said third values of a corresponding one of said third values that is numerically closest of all of the third values to each one of the first interpolated values; and determining a location in a list of said third values of a corresponding one of said third values that is numerically closest of all of the third values to each one of the first interpolated values; and writing a code value based on said location of said corresponding one of the third values in a location in the table given by an index value associated with said one of the first interpolated values.

32. The method in claim 30 wherein said processing step comprises the steps of:

determining coefficients of a monotone piecewise cubic function that spans an interval defined by each pair of adjacent ones of said first values and an interval defined by each pair of adjacent ones of said second values; and evaluating the monotone piecewise cubic function for each such interval for said first and second values at pre-defined incremental input dot areas that fall on the ends of or within that interval so as to collectively yield said first and second interpolated values, respectively.

* * * * *